(12) United States Patent
Au et al.

(10) Patent No.: US 12,259,640 B2
(45) Date of Patent: Mar. 25, 2025

(54) UNDERWATER SYSTEMS FOR DIGITAL IMAGE CAPTURING DEVICES

(71) Applicant: GoPro, Inc., San Mateo, CA (US)

(72) Inventors: Heman Au, San Mateo, CA (US); Daniel J. Coster, Oakura (NZ); Matthew David Thomas, Castro Valley, CA (US); Jesse Patterson, Pacifica, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/143,746

(22) Filed: May 5, 2023

(65) Prior Publication Data

US 2023/0305365 A1    Sep. 28, 2023

Related U.S. Application Data

(63) Continuation of application No. 16/734,706, filed on Jan. 6, 2020, now Pat. No. 11,668,997.
(Continued)

(51) Int. Cl.
| | | |
|---|---|---|
| G03B 17/08 | (2021.01) | |
| G03B 17/56 | (2021.01) | |
| H04N 23/50 | (2023.01) | |
| H04N 23/51 | (2023.01) | |
| H04N 23/55 | (2023.01) | |

(52) U.S. Cl.
CPC ............ *G03B 17/08* (2013.01); *G03B 17/56* (2013.01); *H04N 23/51* (2023.01); *H04N 23/55* (2023.01); *H04N 23/555* (2023.01)

(58) Field of Classification Search
None
See application file for complete search history.

(56) References Cited

U.S. PATENT DOCUMENTS 7,627,235 B2 * 12/2009 McCutchen ....... G02B 27/0006
  396/25
8,246,189 B2 *  8/2012 Muller .................. F21V 31/005
  362/267

(Continued)

FOREIGN PATENT DOCUMENTS

CN            107277331 A  * 10/2017  ............ G03B 17/08

*Primary Examiner* — Clayton E. LaBalle
*Assistant Examiner* — Diana Hancock
(74) *Attorney, Agent, or Firm* — Young Basile Hanlon & MacFarlane, P.C.

(57) ABSTRACT

An underwater system is disclosed for use with a digital image capturing device (DICD) in underwater environments. The underwater system includes a center band having first and second support bands; a first housing fixedly connected to the first support band and including an optically clear material; a second housing fixedly connected to the second support band and including an optically clear material; a cradle connected to the first support band and configured to receive the DICD; and a latching mechanism positioned between the cradle and the first support band. The second support band is pivotally connected to the first support band such that the underwater system is repositionable between an open position and a closed position, and the latching mechanism is repositionable between a locked position, in which the latching mechanism securely engages the DICD, and an unlocked position, in which the latching mechanism is disengaged from the DICD.

20 Claims, 49 Drawing Sheets

Related U.S. Application Data

(60) Provisional application No. 62/788,458, filed on Jan. 4, 2019.

(56) References Cited

U.S. PATENT DOCUMENTS

| | | | |
|---|---|---|---|
| 9,213,218 B1* | 12/2015 | Coons | G03B 17/08 |
| 2003/0128397 A1 | 7/2003 | Smith | |
| 2009/0317069 A1* | 12/2009 | Yim | G03B 17/08 |
| | | | 396/27 |
| 2017/0248835 A1 | 8/2017 | Freeman | |
| 2018/0067380 A1* | 3/2018 | Thomas | G03B 17/08 |
| 2018/0146122 A1 | 5/2018 | Campbell | |
| 2019/0215444 A1 | 7/2019 | Deng | |
| 2019/0300135 A1* | 10/2019 | Troy | G03B 17/48 |
| 2020/0218136 A1 | 7/2020 | Au | |

* cited by examiner

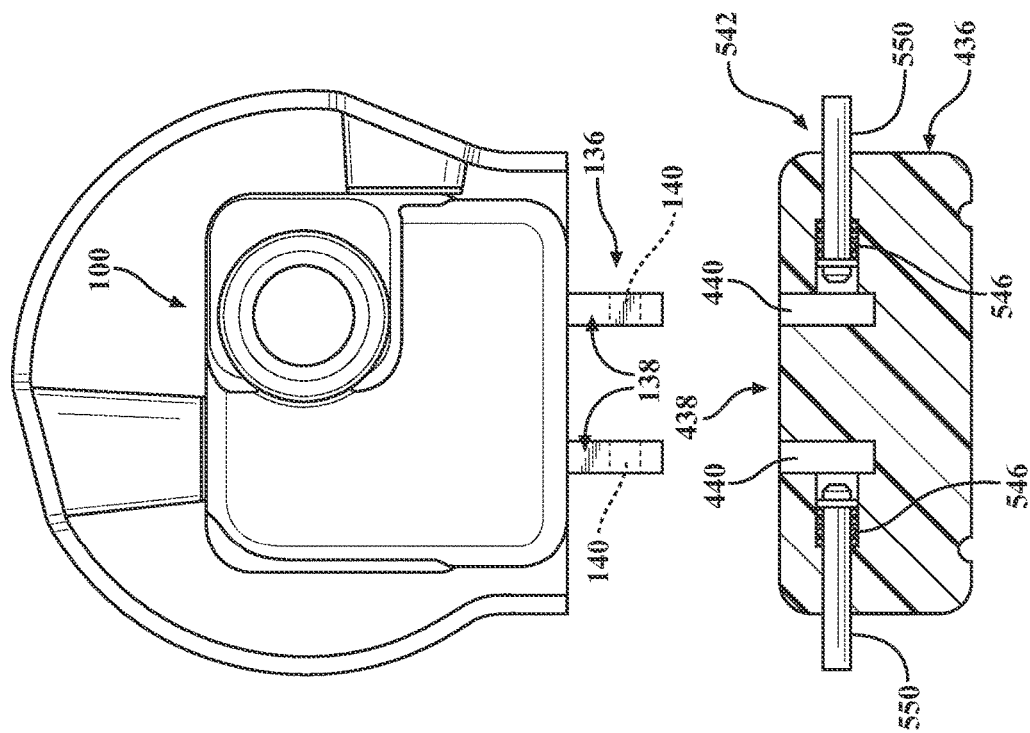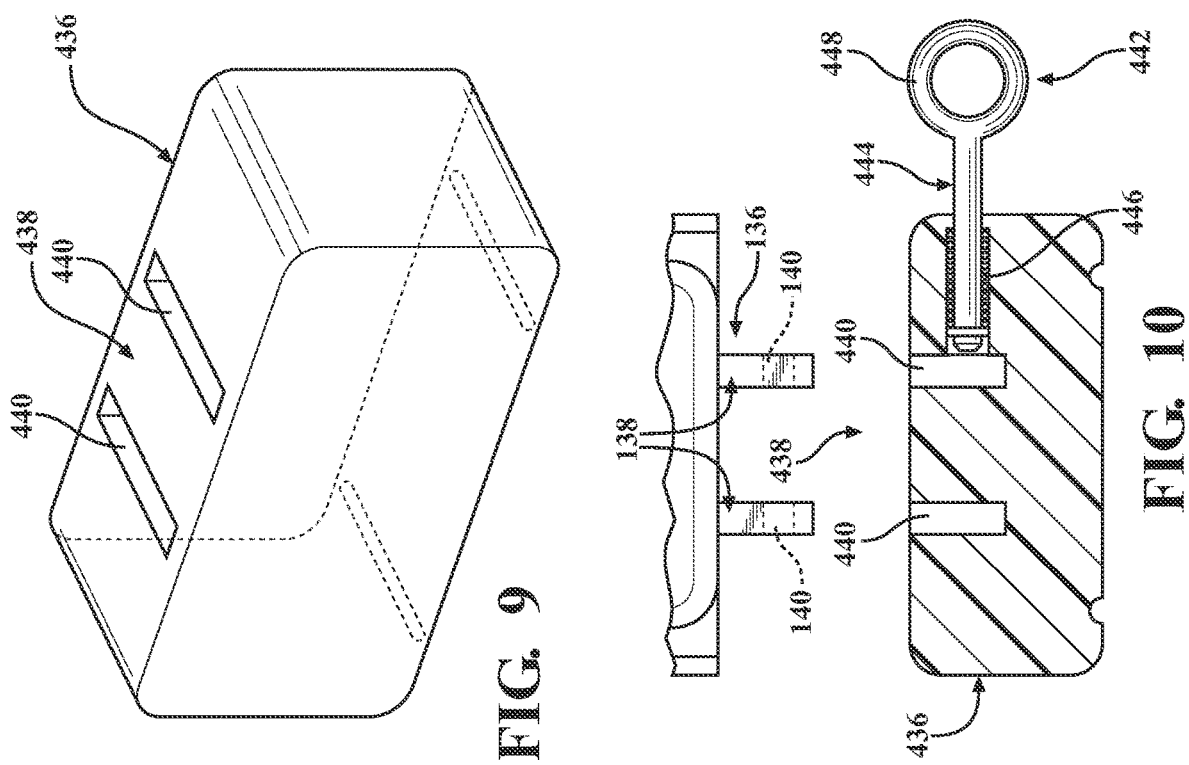

UNDERWATER SYSTEMS FOR DIGITAL IMAGE CAPTURING DEVICES

CROSS-REFERENCE TO RELATED APPLICATIONS

This application is a continuation of U.S. patent application Ser. No. 16/734,706, filed Jan. 6, 2020, which claims the benefit of and priority to U.S. Provisional Patent Application Ser. No. 62/788,458, filed on Jan. 4, 2019, the entire contents of which are hereby incorporated by reference.

TECHNICAL FIELD

The present disclosure relates generally to a system for use with digital image capturing devices (DICDs), and, more specifically, to an underwater system for housing such devices.

BACKGROUND

Operating a DICD in an underwater environment may be desirable in a variety of situations. However, contact between the lens(es) of the DICD and the water can create distortion and compromise image quality. To combat this issue, the present disclosure describes various waterproof, underwater systems that are configured to house (or otherwise accommodate) DICDs to not only prevent damage to the DICD, but also increase separation between the lens(es) of the DICD and the water to reduce distortion.

SUMMARY

In one aspect of the present disclosure, an underwater system is described for use with a digital image capturing device (DICD) in underwater environments. The underwater system includes a housing with first and second housing portions, and a base. The first housing portion includes a first dome, and the second housing portion includes a second dome. The second housing portion is directly connectable to the first housing portion such that the housing is reconfigurable between an open configuration, in which the DICD is insertable into and removable from the housing, and a closed configuration, in which the first and second housing portions collectively define a waterproof interior cavity. The base is positioned within the waterproof interior cavity and is configured to receive the DICD such that electrical communication is established between the base and the DICD.

The first and second domes define first and second centerpoints, respectively, that collectively define a first axis. In certain embodiments, the first and second housing portions may be connectable such that the base is separated from the first axis along a second axis that extends orthogonally in relation to the first axis.

In certain embodiments, the first and second housing portions may be pivotally connected to each other. For example, the housing may further include a pivot member that connects the first and second housing portions. In such embodiments, the pivot member may define a pivot axis that extends in orthogonal relation to the first axis (defined by the centerpoints of the first and second domes).

In certain embodiments, the housing may further include at least one closure member that is movable between a first position, in which the first and second housing portions are relatively movable, and a second position, in which the first and second housing portions are fixed in relation to each other.

In certain embodiments, the closure member may be slidable in relation to the first and second housing portions during movement between the first and second positions.

In certain embodiments, the closure member may be configured to approximate the first and second housing portions during movement from the first position to the second position.

In certain embodiments, the closure member may include a clamp.

In certain embodiments, the first housing portion may define a first planar surface and the second housing portion may define a second planar surface. In such embodiments, the first and second planar surfaces may face each other, and may correspond in configuration, such that the first and second planar surfaces form a seal upon movement of the housing into the closed configuration.

In certain embodiments, the housing may further include a sealing member that is positioned between the first and second housing portions to facilitate sealing of the housing, and establishment of the waterproof interior cavity, upon movement into the closed configuration.

In certain embodiments, the first and second domes may each define a diameter of approximately 4".

In certain embodiments, the base may include a power source. In such embodiments, the DICD may be electrically connectable to the power source upon connection to the base.

In certain embodiments, the base may include a locking mechanism that is configured to securely engage the DICD. In such embodiments, the locking mechanism may be movable between a locked (first) position, in which the locking mechanism securely engages the DICD, and an unlocked (second) position, in which the locking mechanism is disengaged from the DICD such that the DICD is removable from the base.

In certain embodiments, the release mechanism may include a biasing member such that the release mechanism is biased toward the locked position.

In certain embodiments, the housing may further include a first external actuator that is configured to actuate a first button on the DICD, and a second external actuator that is configured to actuate a second button on the DICD.

In certain embodiments, the first external actuator may include a first plunger that is configured for engagement with the first button on the DICD, and the second external actuator may include a second plunger that is configured for engagement with the second button on the DICD.

In certain embodiments, the housing may further include a plurality of fingers that are configured for engagement with an accessory.

In certain embodiments, the fingers may be movable between a first position, in which the fingers extend from the housing, and a second position, in which the fingers are concealed by (or within) the housing.

In another aspect of the present disclosure, an underwater system is described for use with a DICD in underwater environments. The underwater system includes a housing with first and second housing portions, and a base. The second housing portion is connectable to the first housing portion such that the housing is reconfigurable between an open configuration, in which the DICD is insertable into and removable from the housing, and a closed configuration, in which the first and second housing portions collectively define a waterproof interior cavity. The base is positioned within the waterproof interior cavity and is wirelessly connectable to the DICD to facilitate control over the DICD.

In certain embodiments, the base may include a power source (e.g., a replaceable and/or rechargeable battery).

In another aspect of the present disclosure, a housing is described for a digital image capturing device (DICD) including first and second lenses having respective first and second fields-of-view. The housing is configured to receive the DICD to facilitate use in underwater environments, and includes at least one optically clear component, and at least one optically unclear component (i.e., at least one component that is not optically clear). The housing is configured such that the at least one optically clear component is positioned within the first field-of-view and/or the second field-of-view, and the at least one optically unclear component is positioned outside of the first and second fields-of-view.

In certain embodiments, the at least one optically clear component may include at least one dome. For example, the optically clear component may include a first dome and a second dome. In such embodiments, the first and second domes may define diameters that are substantially within the range of approximately 2" to approximately 8" (e.g., 4"), and may each define centerpoints.

In certain embodiments, it is envisioned that the centerpoints may define a first axis that extends in generally parallel relation to optical axes defined by the first and second lenses.

In certain embodiments, the at least one optically unclear component may include at least one external actuator.

In certain embodiments, the at least one external actuator may be configured in correspondence with at least one button on the DICD. For example, the at least one external actuator may include a first actuator that is configured to actuate a shutter button on the DICD, and a second external actuator that is configured to actuate a mode button on the DICD.

In certain embodiments, the housing may be reconfigurable between an open configuration, in which the DICD is insertable into (and removable from) the housing, and a closed configuration, in which the housing establishes a watertight interior cavity.

In certain embodiments, the at least one optically unclear component may include at least one locking member that is configured to maintain the closed configuration of the housing.

In another aspect of the present disclosure, an underwater system is disclosed for use with a digital image capturing device (DICD) in underwater environments. The underwater system includes a center band having a first support band and a second support band; a first housing fixedly connected to the first support band and including an optically clear material; a second housing fixedly connected to the second support band and including an optically clear material; a cradle connected to the first support band and configured to receive the DICD; and a latching mechanism positioned between the cradle and the first support band. The second support band is pivotally connected to the first support band such that the underwater system is repositionable between an open position and a closed position, and the latching mechanism is repositionable between a locked position, in which the lock latching mechanism securely engages the DICD, and an unlocked position, in which the latching mechanism is disengaged from the DICD.

In certain embodiments, the latching mechanism may extend laterally from the cradle in the unlocked position such that the latching mechanism is positioned between the first support band and the second support band to inhibit closure of the underwater system.

In certain embodiments, the first housing may include a first dome and the second housing may include a second dome.

In certain embodiments, the first dome and the second dome may collectively defining define a spherocylindrical configuration such that each of the first dome and the second dome defines a field-of-view greater than 180°.

In certain embodiments, the first dome and the second dome may each be configured such that endpoints of the first dome and endpoints of the second dome are laterally offset from a geometrical midpoint of the DICD.

In certain embodiments, the underwater system may further include an actuation mechanism that is configured for engagement a button on the DICD to control operation of the DICD.

In certain embodiments, the actuation mechanism may be configured for movement between an inactive position, in which the actuation mechanism is spaced from the button on the DICD, an active position, in which the actuation mechanism engages the button on the DICD, and an intermediate position, in which the actuation mechanism is positioned between the inactive position and the active position.

In certain embodiments, the actuation mechanism may be configured for movement from the inactive position into the intermediate position upon closure of the underwater system.

BRIEF DESCRIPTION OF THE DRAWINGS

The disclosure is best understood from the following detailed description when read in conjunction with the accompanying drawings. It is emphasized that, according to common practice, the various features of the drawings may not be to scale, and the dimensions of the various components may be arbitrarily expanded or reduced for clarity.

FIG. 9 is a top, perspective view of a base for use with the underwater system according to one embodiment of the present disclosure.

FIG. 10 is a side, cross-sectional view of the base seen in FIG. 9 showing connection of the DICD to the base, and securement of the DICD to the base using one embodiment of a locking member.

FIG. 11 is a front, cross-sectional view of the underwater system and the DICD shown with an alternate embodiment of the locking member seen in FIG. 10.

FIGS. 52 and 59 are each upper, front, right perspective views thereof.

DETAILED DESCRIPTION

The present disclosure describes various embodiments of an underwater system that is configured to house (or otherwise accommodate) a variety of DICDs (e.g., DICDs having different configurations). The presently disclosed underwater systems includes a housing with a pair of optically clear domes, which may be configured as discrete structures, or integrally (e.g., monolithically formed), such as via molding. In one particular embodiment, the housing includes discrete housing portions that are relatively movable to transition the housing between an open configuration, in which the DICD is insertable into (and removable from) the housing, and a closed configuration, in which a watertight internal cavity is established within the housing.

In one embodiment, the presently disclosed housing includes a series of external actuators (e.g., buttons) that are configured in correspondence with buttons included on the DICD (e.g., the shutter button, the mode button, etc.) such that the external actuators are usable to control operation of the DICD. Additionally, or alternatively, it is envisioned that the underwater system may include a base in wireless communication with the DICD to allow the DICD to be controlled remotely. For example, by positioning both the DICD and the base within the watertight internal cavity, it is envisioned that wireless communication between the base and the DICD may be supported by Bluetooth or other such wireless communication protocols.

Figure 1A:
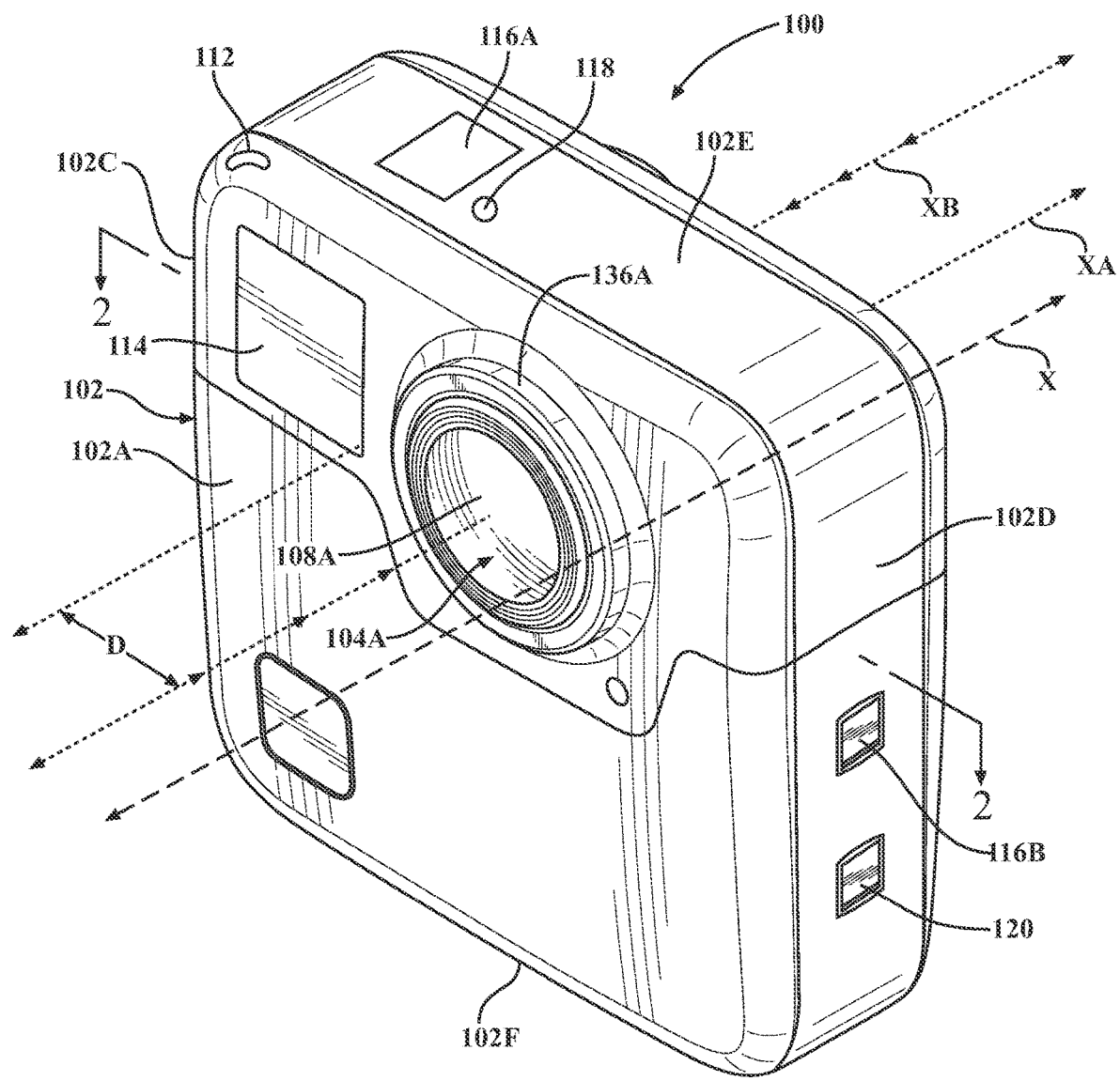
FIG. 1A is a front, perspective view of a DICD including a pair of image capture devices oriented in generally opposite directions in accordance with the principles of the present disclosure.
Figure 1B:
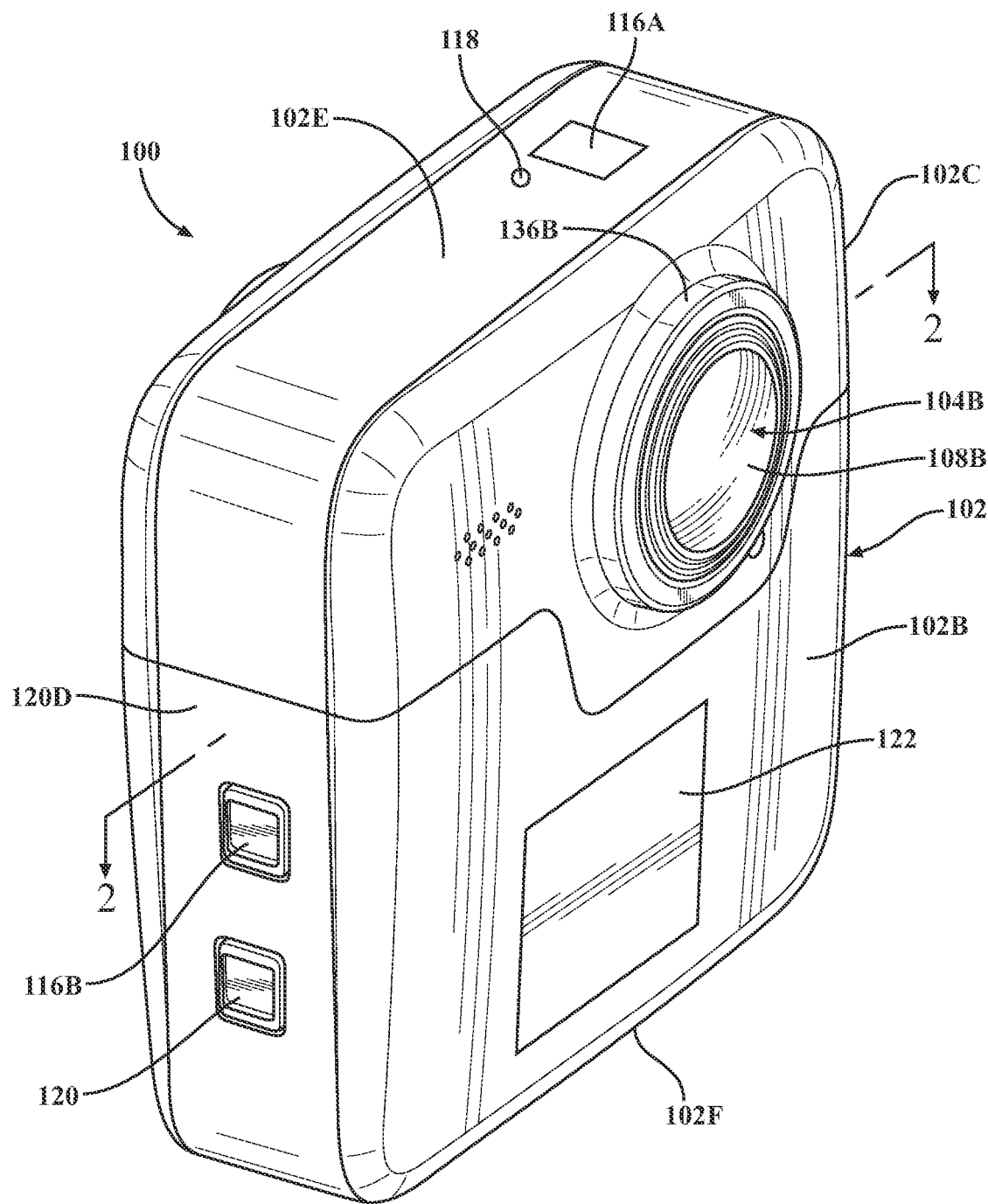
FIG. 1B is a rear, perspective view of the DICD seen in FIG. 1A.
Figure 2:
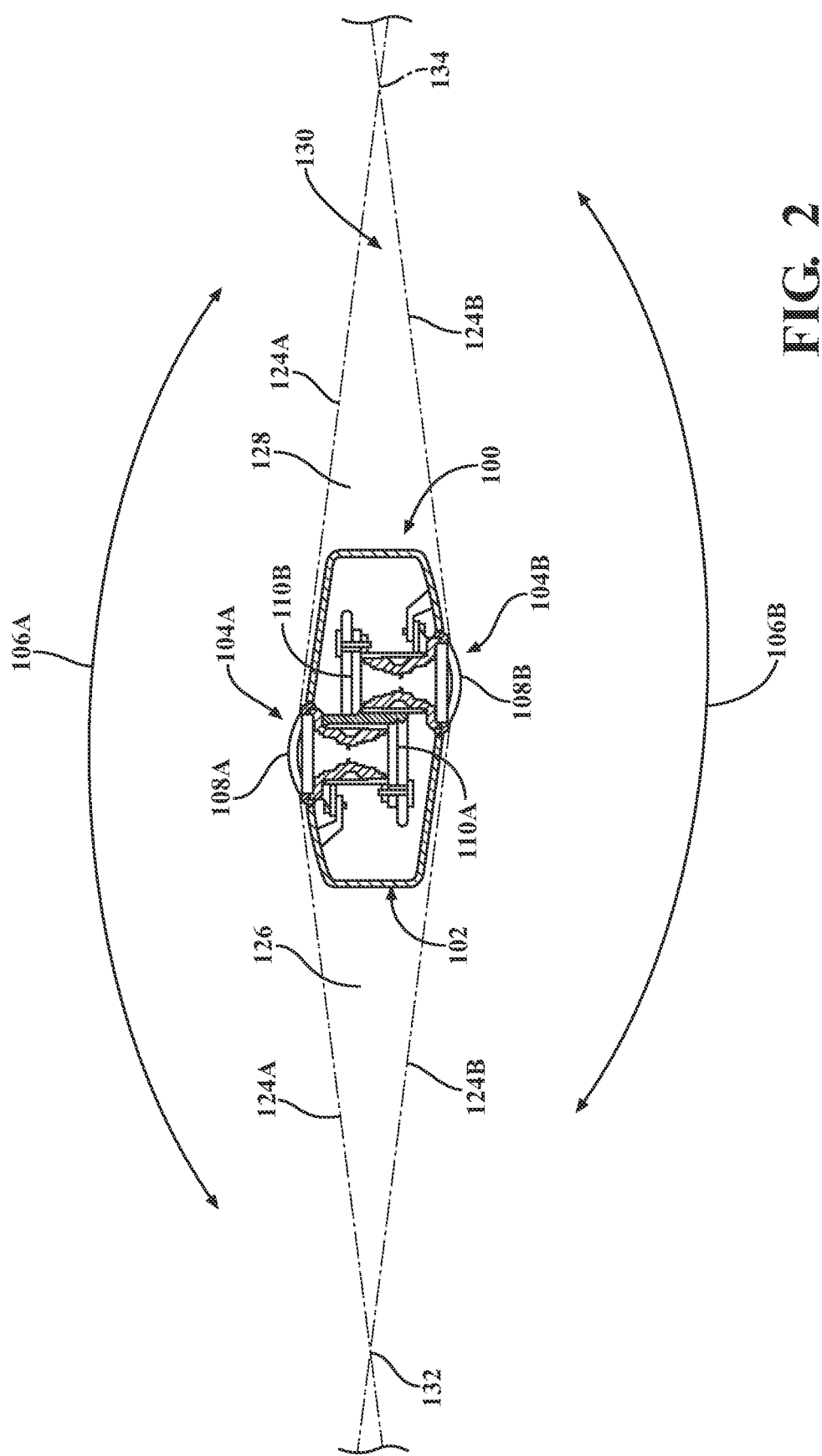
FIG. 2 is a cross-sectional view of the DICD taken through line 2-2 in FIGS. 1A and 1B.

FIGS. 1A-2 illustrate an example digital image capture device (DICD) 100. The DICD 100 may include a body 102 having various indicators (such as LEDs, displays, and the like), various input mechanisms (such as buttons, switches, and touchscreen mechanisms), and electronics (e.g., imaging electronics, power electronics, etc.) internal to the body 102 for capturing images and/or performing other functions. The DICD 100 may be configured to capture images and video and to store captured images and video for subsequent display or playback.

In the particular embodiment illustrated in FIGS. 1A-2, the DICD 100 is configured to capture spherical images, and accordingly, includes a first image capture device 104A and a second image capture device 104B. The first image capture device 104A defines a first field-of-view 106A (FIG. 2) and includes a first lens 108A that receives and directs light onto a first image sensor 110A. Similarly, the second image capture device 104B defines a second field-of-view 106B (FIG. 2) and includes a second lens 108B that receives and directs light onto a second image sensor 110B. To facilitate the capture of spherical images, the image capture devices 104A, 104B (and related components) may be arranged in a back-to-back (Janus) configuration such that the lenses 108A, 108B face in generally opposite directions.

The DICD 100 may include various indicators, including LED lights 112 an LED display 114. The DICD 100 may also include buttons 116 configured to allow a user of the DICD 100 to interact with the DICD 100, to turn the DICD 100 on, and to otherwise configure the operating mode of the DICD 100. In the particular embodiment seen in FIGS. 1A-2, for example, the DICD 100 includes a shutter button 116A and a mode button 116B. It should be appreciated, however, that, in alternate embodiments, the DICD 100 may include additional buttons 116 to support and/or control additional functionality. The DICD 100 may also include one or more microphones 118 configured to receive and record audio signals (e.g., voice or other audio commands) in conjunction with recording video. A side of the DICD 100 may include an I/O interface 120. The DICD 100 may also include an interactive display 122 that allows for interaction with the DICD 100 while simultaneously displaying information on a surface of the DICD 100.

The body 102 of the DICD 100 is configured to encompass and protect the internal electronics which are further described in later sections. In the present example, the body 102 exterior includes six surfaces (i.e., a front face 102A, a rear face 102B (FIG. 1B), a left face 102C (FIG. 1A), a right face 102D, a top face 102E, and a bottom face 102F). In the illustrated embodiment, the surfaces 102A-102F collectively impart a generally rectangular cuboid configuration to the body 102. Other configurations for the body 102, however, would not be beyond the scope of the present disclosure. The DICD 100 may be made of a rigid material such as plastic, aluminum, steel, or fiberglass. Additional features, such as the features described above, may be affixed to the exterior. In some embodiments, the DICD 100 described herein includes features other than those described below. For example, instead of a single I/O interface 120, the DICD 100 may include additional interfaces 120 or different interface features.

Although not expressly shown in FIGS. 1A-2, in some implementations, the DICD 100 may include one or more image sensors, such as a charge-coupled device (CCD) sensor, an active pixel sensor (APS), a complementary metal-oxide-semiconductor (CMOS) sensor, an N-type metal-oxide-semiconductor (NMOS) sensor, and/or any other image sensor or combination of image sensors. Although not illustrated, in various embodiments, the DICD 100 may include other additional electrical components (e.g., an image processor, camera SoC (system-on-chip), etc.), which may be included on one or more circuit boards within the camera body 102.

Although not expressly shown in FIGS. 1A-2, the DICD 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The DICD 100 may interface with or communicate with an external device, such as an external user interface device, via a wired or wireless computing communication link (not shown). The user interface device may, for example, be the personal computing device described below with respect to FIG. 3B. Any number of computing communication links may be used. The computing communication link may be a direct computing communication link or an indirect computing communication link, such as a link including another device or a network, such as the Internet. In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The DICD 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the DICD 100 via the computing communication link, or receive user input and communicate information with the DICD 100 via the computing communication link.

The user interface device may display, or otherwise present, content, such as images or video, acquired by the DICD 100. For example, a display of the user interface device may be a viewport into the three-dimensional space represented by the panoramic images or video captured or created by the DICD 100.

The user interface device may communicate information, such as metadata, to the DICD 100. For example, the user interface device may send orientation information of the user interface device with respect to a defined coordinate system to the DICD 100, such that the DICD 100 may determine an orientation of the user interface device relative to the DICD 100. Based on the determined orientation, the DICD 100 may identify a portion of the panoramic images or video captured by the DICD 100 for the DICD 100 to send to the user interface device for presentation as the viewport. In some implementations, based on the determined orientation, the DICD 100 may determine the location of the user interface device and/or the dimensions for viewing of a portion of the panoramic images or video.

The user interface device may implement or execute one or more applications to manage or control the DICD 100. For example, the user interface device may include an application for controlling camera configuration, video acquisition, video display, or any other configurable or controllable aspect of the DICD 100.

The user interface device, such as via an application, may generate and share, such as via a cloud-based or social media service, one or more images, or short video clips, such as in response to user input. In some implementations, the user interface device, such as via an application, may remotely control the DICD 100, such as in response to user input.

The user interface device, such as via an application, may display unprocessed or minimally processed images or video captured by the DICD 100 contemporaneously with capturing the images or video by the DICD 100, such as for shot framing, which may be referred to herein as a live preview, and which may be performed in response to user input. In some implementations, the user interface device, such as via an application, may mark one or more key moments contemporaneously with capturing the images or video by the DICD 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the DICD 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the DICD 100.

With reference now to FIG. 2 in particular, the fields-of-view 106A, 106B of the lenses 108A, 108B are shown above and below boundaries 124A, 124B, respectively. Behind the first lens 108A, the first image sensor 110A may capture a first hyper-hemispherical image plane from light entering the first lens 108A, and behind the second lens 108B, the second image sensor 110B may capture a second hyper-hemispherical image plane from light entering the second lens 108B. One or more areas, such as blind spots 126, 128, may be outside of the fields-of-view 106A, 106B of the lenses 108A, 108B so as to define a "dead zone" 130. In the dead zone 130, light may be obscured from the lenses 108A, 108B and the corresponding image sensors 110A, 110B, and content in the blind spots 126, 128 may be omitted from capture. In some implementations, the image capture devices 104A, 104B may be configured to minimize the blind spots 126, 128.

The fields-of-view 106A, 106B may overlap. Stitch points 132, 134, proximal to the DICD 100, at which the fields-of-view 106A, 106B overlap may be referred to herein as overlap points or stitch points. Content captured by the respective lenses 108A, 108B, distal to the stitch points 132, 134, may overlap.

Images contemporaneously captured by the respective image sensors 110A, 110B may be combined to form a combined image. Combining the respective images may include correlating the overlapping regions captured by the respective image sensors 110A, 110B, aligning the captured fields-of-view 106A, 106B, and stitching the images together to form a cohesive combined image.

A slight change in the alignment, such as position and/or tilt, of the lenses 108A, 108B, the image sensors 110A, 110B, or both, may change the relative positions of their respective fields-of-view 106A, 106B and the locations of the stitch points 132, 134. A change in alignment may affect the size of the blind spots 126, 128, which may include changing the size of the blind spots 126, 128 unequally.

Incomplete or inaccurate information indicating the alignment of the image capture devices 104A, 104B, such as the locations of the stitch points 132, 134, may decrease the accuracy, efficiency, or both of generating a combined image. In some implementations, the DICD 100 may maintain information indicating the location and orientation of the lenses 108A, 108B and the image sensors 110A, 110B such that the fields-of-view 106A, 106B, stitch points 132, 134, or both may be accurately determined, which may improve the accuracy, efficiency, or both of generating a combined image.

The lenses 108A, 108B define optical axes XA, XB (FIG. 1A), respectively, which may be substantially antiparallel to each other, such that the respective axes may be within a tolerance such as 1%, 3%, 5%, 10%, and/or other tolerances. In some implementations, the image sensors 110A, 110B may be substantially perpendicular to the optical axes XA, XB through their respective lenses 108A, 108B, such that the image sensors may be perpendicular to the respective optical axes XA, XB to within a tolerance such as 1%, 3%, 5%, 10%, and/or other tolerances.

The lenses 108A, 108B may be laterally offset from each other, may be off-center from a central axis of the DICD 100, or may be laterally offset and off-center from the central axis. As compared to DICDs with back-to-back lenses, such as lenses aligned along the same axis, DICDs including laterally offset lenses may include substantially reduced thickness relative to the lengths of the lens barrels securing the lenses. For example, the overall thickness of the DICD 100 may be close to the length of a single lens barrel as opposed to twice the length of a single lens barrel as in a back-to-back configuration. Reducing the lateral distance between the lenses 108A, 108B may improve the overlap in the fields-of-view 106A, 106B.

Images or frames captured by the image capture devices 104A, 104B may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.'

Figure 3:
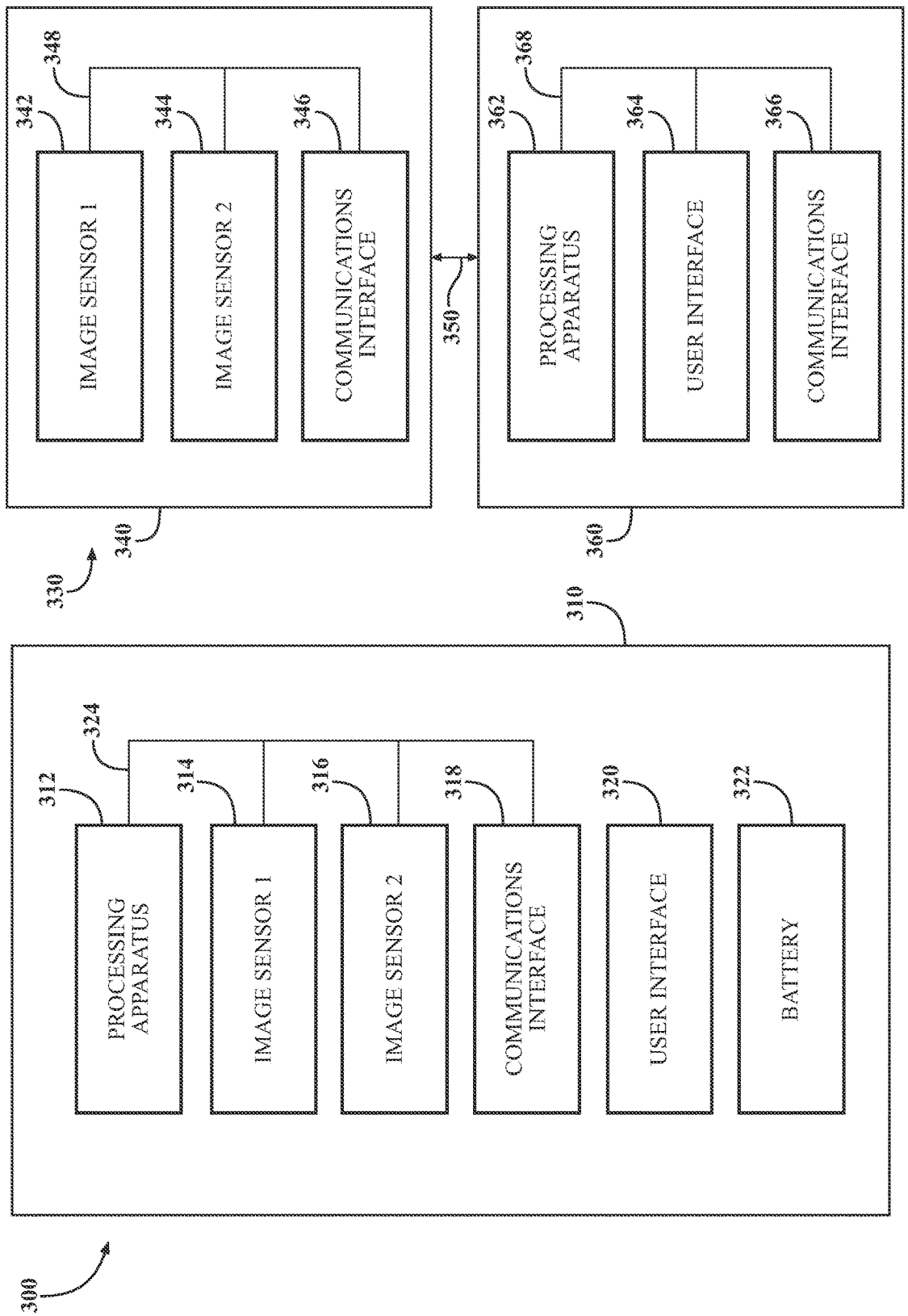
FIGS. 3A and 3B are block-diagram representations of various embodiments and/or implementations of DICDs according to the principles of the present disclosure.

FIGS. 3A and 3B are block diagrams of examples of image capture systems. Referring first to FIG. 3A, an image capture system 300 is shown. The image capture system 300 includes an image capture device 310 (e.g., a camera or a drone), which may, for example, be the DICD 100 shown in FIGS. 1A-2.

The image capture device 310 includes a processing apparatus 312 that is configured to receive a first image from a first image sensor 314 and receive a second image from a second image sensor 316. The processing apparatus 312 may be configured to perform image signal processing (e.g., filtering, tone mapping, stitching, and/or encoding) to generate output images based on image data from the image sensors 314, 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory (RAM) device, flash memory, or another suitable type of storage device, such as a non-transitory computer-readable memory. The memory of the processing apparatus 312 may include executable instructions and data that can be accessed by one or more processors of the processing apparatus 312. For example, the processing apparatus 312 may include one or more dynamic random-access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application-specific integrated circuit (ASIC). For example, the processing apparatus 312 may include a custom image signal processor.

The image sensors 314, 316 may be configured to detect light of a certain spectrum (e.g., the visible spectrum or the infrared spectrum) and convey information constituting an image as electrical signals (e.g., analog or digital signals). For example, the image sensors 314, 316 may include CCDs or active pixel sensors in a CMOS. The image sensors 314, 316 may detect light incident through a respective lens (e.g., a fisheye lens). In some implementations, the image sensors 314, 316 include digital-to-analog converters. In some implementations, the image sensors 314, 316 are held in a fixed orientation with respective fields-of-view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Referring next to FIG. 3B, another image capture system 330 is shown. The image capture system 330 includes an image capture device 340 and a personal computing device 360 that communicate via a communications link 350. The image capture device 340 may, for example, be the DICD 100 shown in FIGS. 1A-2. The personal computing device 360 may, for example, be the user interface device described above.

The image capture device 340 includes a first image sensor 342 and a second image sensor 344 that are configured to capture respective images. The image capture device 340 includes a communications interface 346 that is configured to transfer images via the communications link 350 to the personal computing device 360.

The personal computing device 360 includes a processing apparatus 362 that is configured to receive, using the communications interface 366, a first image from the first image sensor 342 and a second image from the second image sensor 344. The processing apparatus 362 may be configured to perform image signal processing (e.g., filtering, tone mapping, stitching, and/or encoding) to generate output images based on image data from the image sensors 342, 344.

The image sensors 342, 344 are configured to detect light of a certain spectrum (e.g., the visible spectrum or the infrared spectrum) and convey information constituting an image as electrical signals (e.g., analog or digital signals). For example, the image sensors 342, 344 may include CCDs or active pixel sensors in a CMOS. The image sensors 342, 344 may detect light incident through a respective lens (e.g., a fisheye lens). In some implementations, the image sensors 342, 344 include digital-to-analog converters. In some implementations, the image sensors 342, 344 are held in a fixed relative orientation with respective fields-of-view that overlap. Image signals from the image sensors 342, 344 may be passed to other components of the image capture device 340 via a bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342, 344.

The processing apparatus 362 may include one or more processors having single or multiple processing cores. The processing apparatus 362 may include memory, such as RAM, flash memory, or another suitable type of storage device, such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or snap photograph) received via the user interface 364 may be passed on to the image capture device 340 via the communications link 350.

With reference now to FIGS. 4-11, one embodiment of an underwater system for the DICD 100, which is identified by the reference character 400, will be discussed. The underwater system 400 is configured for use in underwater environments, and includes a housing 402 defining an internal, watertight cavity 404 (FIG. 5) that is configured to receive the DICD 100. The housing may include (e.g., may be formed partially or entirely from) any suitable optically clear material (i.e., any material that does not interfere with, or negatively impact, the capture or quality of digital images), and may be formed through any suitable manufacturing process (e.g., molding). For example, in one particular embodiment, it is envisioned that the housing 402 may include (e.g., may be formed partially or entirely from) polycarbonate.

Figure 4:
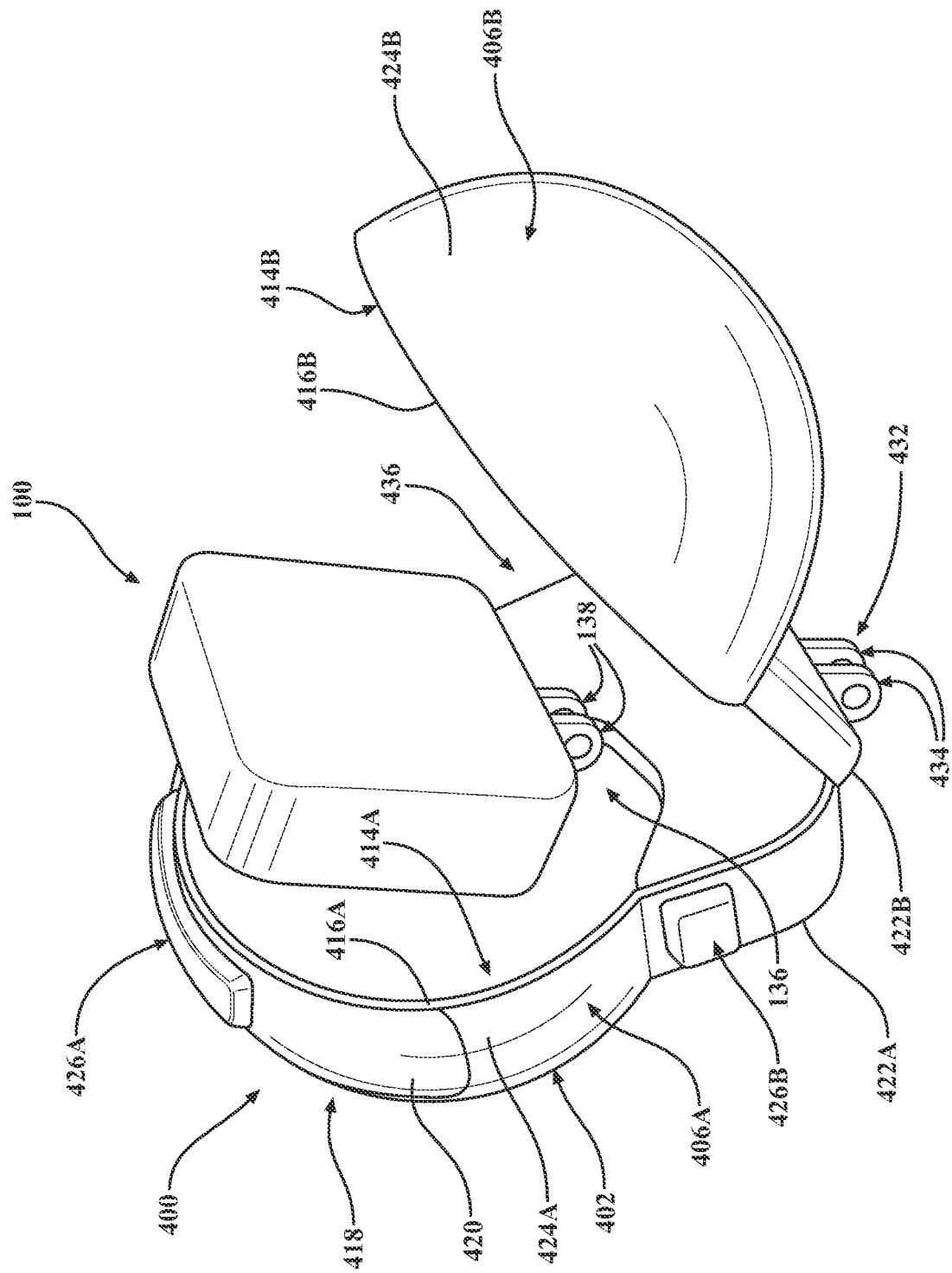
FIG. 4 is a side, perspective view of one embodiment of an underwater system including a housing with a pair of housing portions for use with the DICD seen in FIGS. 1A and 1B.
Figure 5:
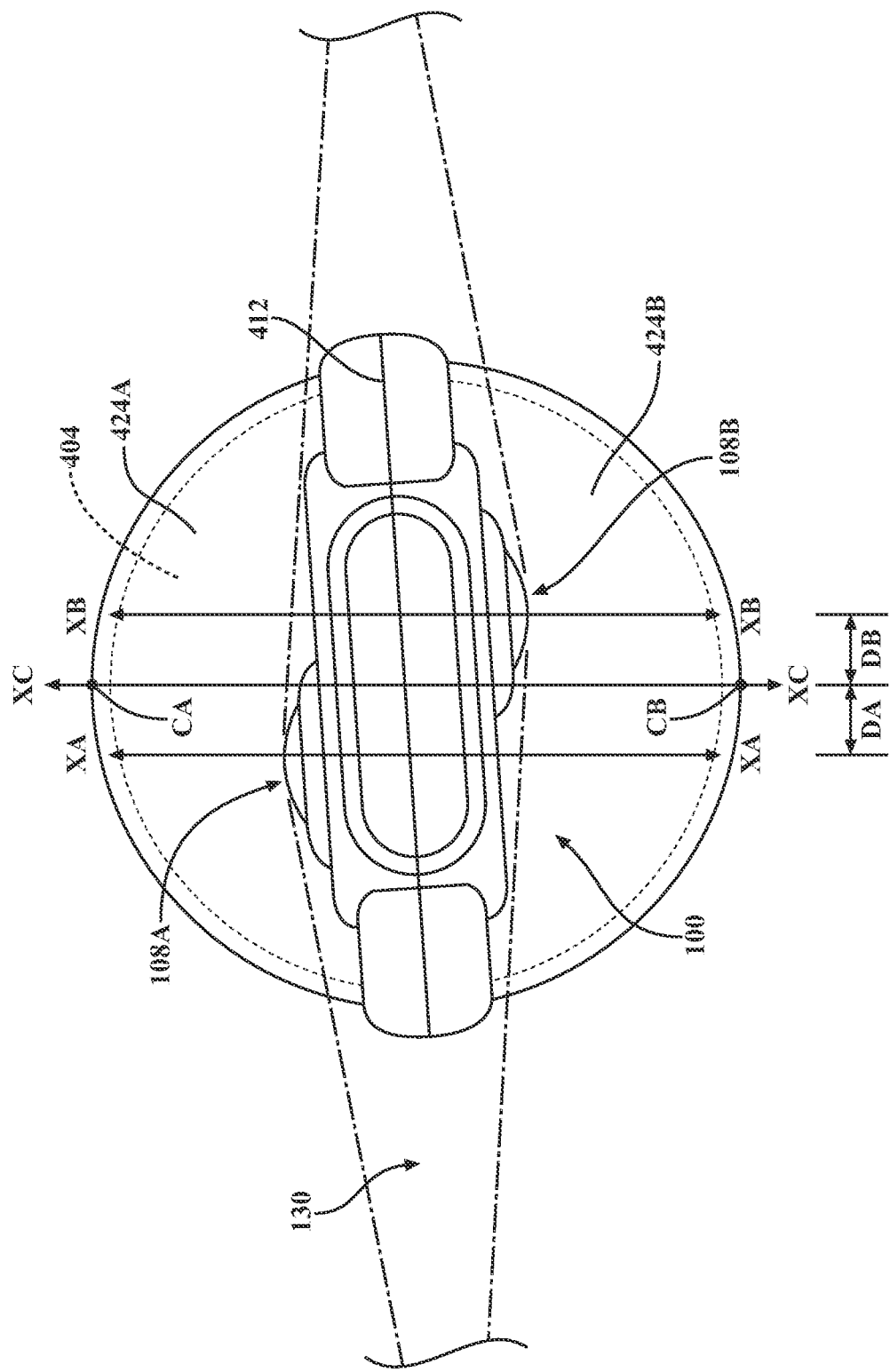
FIG. 5 is a top, plan view of the underwater system and the DICD seen in FIG. 4.

The housing 402 includes discrete (first and second) housing portions 406A, 406B that are connected via an engagement structure 408, which allows for reconfiguration of the housing 402 between open and closed configurations (e.g., for insertion, removal, and use of the DICD 100). In the illustrated embodiment, for example, the engagement structure 408 includes a hinge 410 that connects the housing portions 406A, 406B in a clamshell-style arrangement and allows for pivotable relative movement between the housing portions 406A, 406B. To establish the watertight cavity 404, and guard against the unwanted intrusion of moisture in the closed configuration, it is envisioned that the housing portions 406A, 406B may include corresponding structures and/or surfaces that are configured for engagement so as to define a sealed interface 412 (FIG. 5). For example, the housing portions 406A, 406B may include corresponding flanges 414A, 414B defining planar surfaces 416A, 416B, respectively, as seen in FIG. 4. Additionally, or alternatively, it is envisioned that the housing 402 may include a sealing member (e.g., a rubberized gasket, O-ring, etc.) at the interface 412.

To maintain the closed configuration, it is envisioned that the housing 402 may include one or more locking members 418. In the illustrated embodiment, for example, the housing 402 may include one or more sliders 420 that are slidably connected to the housing portion 406A (and/or the housing portion 406B) for movement between a locked position, in which the slider(s) 420 are configured and positioned to maintain the closed configuration, and an unlocked position, in which the slider(s) 420 are configured and positioned to allow for movement of the housing 402 into the open configuration. Additionally, or alternatively, it is envisioned that the locking member(s) 418 may include a latch, clamp (e.g., an over-center clamp), or other such mechanism, structure, or member to secure the housing portions 406A, 406B in relation to one another. It is further envisioned that the locking member(s) 418 may facilitate reconfiguration of the housing 402 between the open and closed configurations. For example, in the context of the slider(s) 420 (and/or the clamp), the slider(s) 420 (and/or the clamp) may be configured to approximate the housing portions 406A, 406B during movement from the unlocked position to the locked position, and to cause (or otherwise facilitate) separation of the housing portions 406A, 406B during movement from the locked position to the unlocked position.

To offset the buoyancy resulting from the capture of air within the watertight cavity 404, it is envisioned that the underwater system 400 (e.g., the housing 402) may be weighted, or, alternatively, that the underwater system 400 (e.g., the housing 402) may be configured to support a weighted accessory. Additionally, or alternatively, it is envisioned that the underwater system 400 (e.g., the housing 402) may include a tether (e.g., a wrist strap) to connect the housing 402 and the DICD 100 to the user in the underwater environment.

The housing portion 406A includes a pedestal 422A supporting a dome 424A, and the housing portion 406B includes a pedestal 422B supporting a dome 424B. In certain embodiments of the disclosure, it is envisioned that the housing portions 406A, 406B may be identical in configuration (e.g., to reduce costs and/or the complexity associated with manufacture and assembly of the housing 402).

The domes 424A, 424B define diameters that lie substantially within the range of approximately 2" to approximately 8" (e.g., 4"). During use of the DICD 100 in underwater environments, however, an increase in the distance between the lenses 108A, 108B (FIGS. 1A, 1B) of the DICD 100 and the water results in a corresponding increase in the quality of the digital data collected by reducing distortion that would otherwise be caused by the water, thus increasing the quality of the images generated by the DICD 100 (e.g., by stitching together the individual images captured by the image capture devices 104A, 104B). As such, larger diameter domes 424A, 424B would not be beyond the scope of the disclosure. The presently disclosed housing 402 thus functions not only to protect the DICD 100, but to increase the quality of the images captured and generated by the DICD 100 by reducing distortion.

In the illustrated embodiment, the domes 424A, 424B are generally hemispherical in configuration. In alternate embodiments of the disclosure, however, it is envisioned that the configuration of the domes 424A, 424B may be varied. For example, the domes 424A, 424B may be configured as quasi-hemispheres, raised hemispheres including hemispherical and cylindrical portions, shortened hemispheres including a less than 180° portion of a circular arc, or parabolic or other such convex (lens shaped) members.

Figure 6:
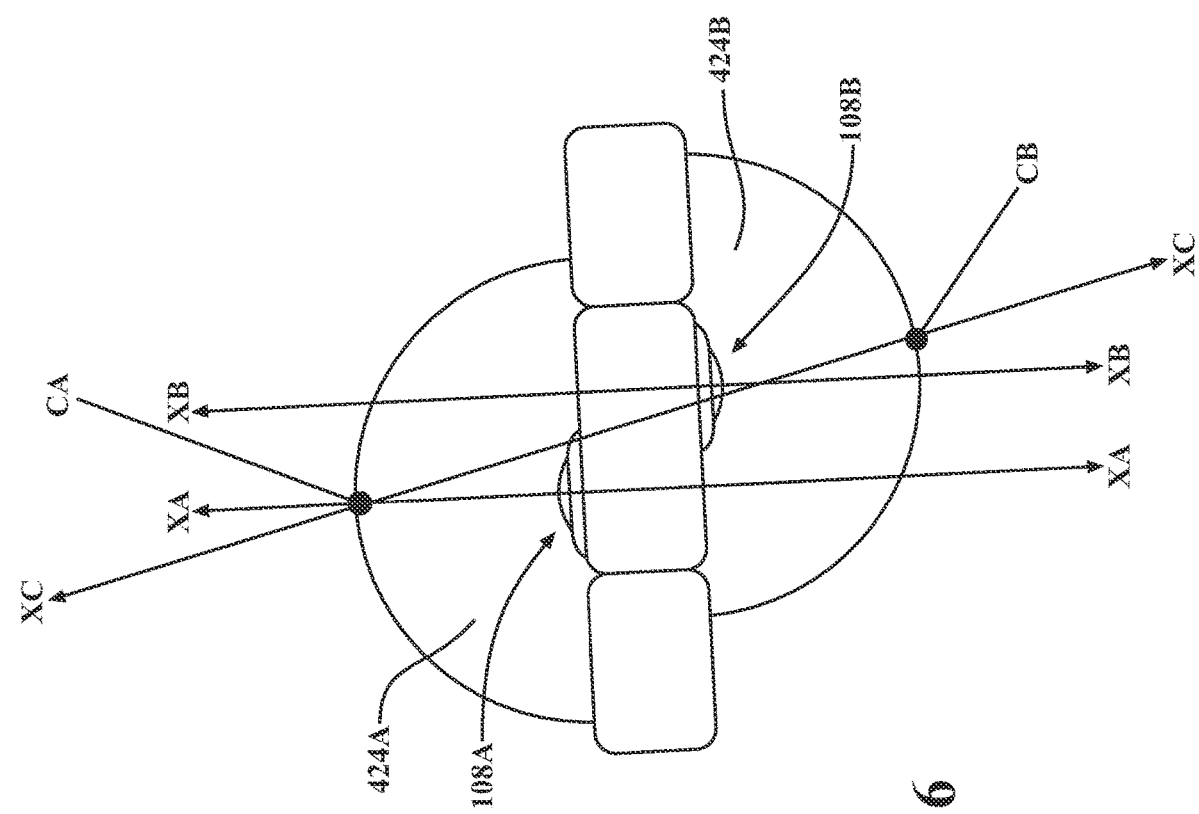
FIG. 6 is a top, plan view of an alternate embodiment of the underwater system seen in FIG. 4 including offset domes.

Although illustrated as being centrically aligned in the embodiment illustrated in FIGS. 4 and 5 (i.e., such that an axis XC extending between respective centerpoints CA, CB of the domes 424A, 424B is oriented in generally parallel relation to the optical axes XA, XB of the lenses 108A, 108B, respectively, in alternate embodiments of the disclosure, the domes 424A, 424B may be eccentrically positioned (i.e., the domes 424A, 424B may be offset such that the axis XC extends transversely in relation to the optical axes XA, XB), as seen in FIG. 6.

The housing 402 is configured such that, upon insertion of the DICD 100, the lenses 108A, 108B of the DICD 100 are generally aligned with midlines (e.g., equators) of the domes 424A, 424B, respectively. The lenses 108A, 108B, however, are laterally offset such that the optical axes XA, XB are misaligned, whereby the optical axes XA, XB are spaced distances DA, DB, respectively, from the axis XC. In various embodiments of the disclosure, it is envisioned that the distances DA, DB may be either equivalent or dissimilar.

To improve operability and/or extend the usable life of the housing 402, it is envisioned that the housing 402 may include one or more internal and/or external coatings (e.g., on inner and/or outer surfaces of the housing portions 406A, 406B). For example, the housing 402 may include an anti-fog coating and/or an anti-reflective coating to mitigate glare (e.g., from the various indicators, LEDs, or displays included on the DICD 100). It is also envisioned that the housing 402 may include an anti-scratch coating and/or a hydrophobic coating.

Figure 8:
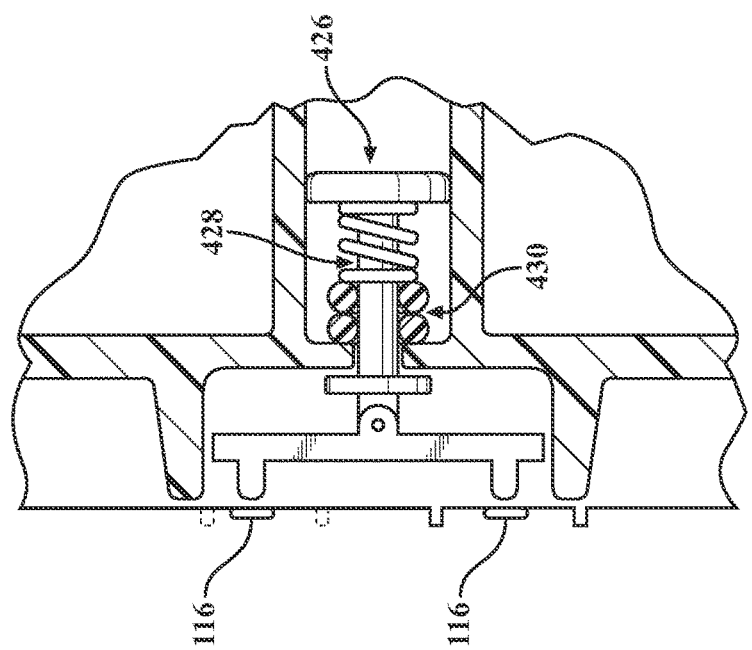
FIG. 8 is a partial, cross-sectional view illustrating an external actuator of the underwater system used to actuate a corresponding button on the DICD.
Figure 7:
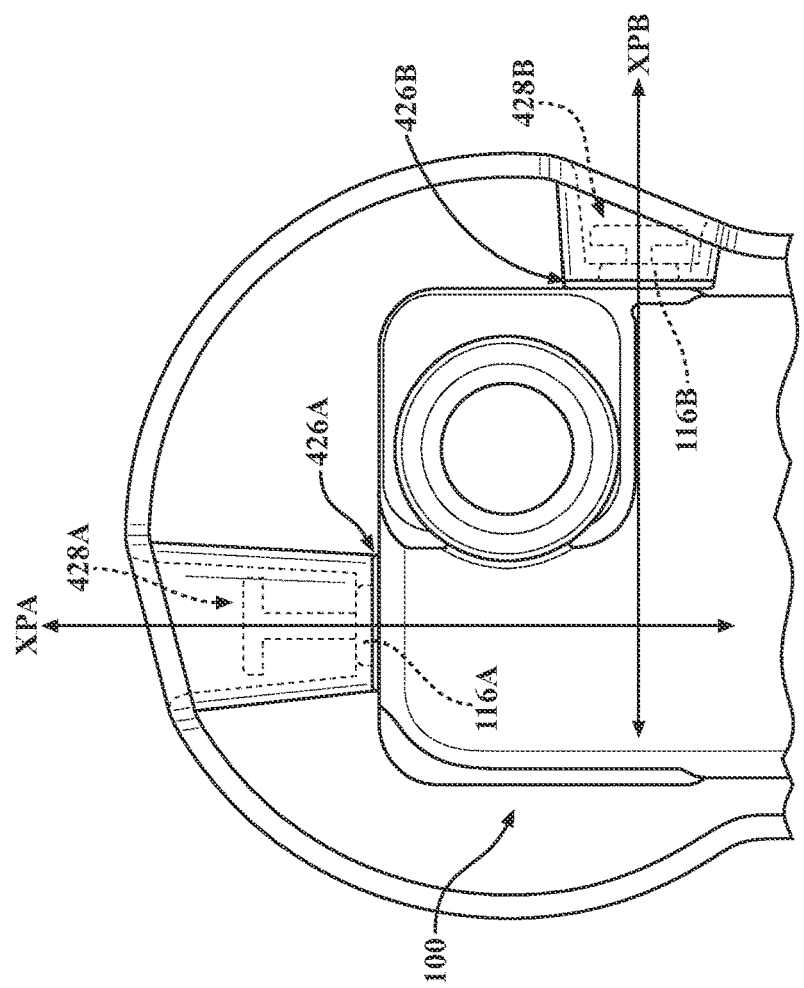
FIG. 7 is a partial, front view of the underwater system and the DICD seen in FIG. 4.

With reference now to FIGS. 4, 7, and 8, the housing 402 further includes one or more manually-accessible external buttons (actuators) 426 that are configured in correspondence (e.g., in dimensions and location) with the button(s) 116 included on the DICD 100 such that actuation of the external button(s) 426 causes corresponding actuation of the button(s) 116. In the particular embodiment seen in FIGS. 4, 7, and 8, for example, the housing 402 includes a first external button 426A that is configured to actuate the shutter button 116A, and a second external button 426B that is configured to actuate the mode button 116B. It should be appreciated, however, that, in alternate embodiments, the housing 402 may include additional external buttons 426 depending on the number of buttons 116 included on the DICD 100.

The external button(s) 426 are located within the dead zone 130 (FIGS. 2, 5) (i.e., outside of the respective fields-of-view 106A, 106B of the lenses 108A, 108B) so as not to interfere with image capture. It is envisioned that the external button(s) 426 may each be included on the same housing portion (e.g., the housing portion 406A or the housing portion 406B), or, alternatively, that the housing portion 406A may include the external button 426A and that the housing portion 406B may include the external button 426B.

It is envisioned that the external button(s) 426 may be in direct contact with the buttons 116 on the DICD 100 such that the user can depress (or otherwise actuate) the buttons 116 on the DICD 100 via depression or operation of the external button(s) 426. Alternatively, it is envisioned that the external button(s) 426 may facilitate depression/operation of the buttons 116 on the DICD via an intervening structure. For example, the external button(s) 426 may include plungers 428 (or other such structures) that are movable to depress (or otherwise actuate) the button(s) 116. More specifically, with reference to FIG. 7, the first external button 426A includes a first plunger 428A extending along an axis XPA, and the second external button 426B includes a second plunger 428B extending along an axis XPB. Depending upon the particular location of the buttons 116, it is envisioned that the axes XPA, XPB may extend in transverse (e.g., intersecting) relation, as seen in FIG. 7.

In various embodiments, it is envisioned that the external button(s) 426 (e.g., the plunger(s) 428) may be in direct alignment with the button(s) 116 on the DICD 100, as shown in FIGS. 4, 7, and 8, or, alternatively, that the external button(s) 426 (e.g., the plunger(s) 428) may be out of direct alignment with the button(s) 116 on the DICD 100. As shown in FIG. 8, for example, the plunger(s) 428 may be operatively connected to an actuation mechanism 430 that is movable via a rocking motion to actuate the buttons(s) 116 upon the application of force to the external button(s) 426.

As seen in FIG. 4, in certain embodiments, the housing 402 may also include a mount 432 (e.g., to facilitate use with and/or connection to an accessory, such as a stand or a tripod). The mount 432 may be movable between a retracted (first) position, in which the mount 432 is concealed within or by, or is flush with, an outermost external surface of the housing 402, and an extended (second) position, in which the mount 432 is deployed and extends from the housing 402 (e.g., to facilitate use with the aforementioned accessory). Although the mount 432 is illustrated as including a series of foldable fingers 434 (or other such structure(s)) in the particular embodiment seen in FIG. 4, it should be appreciated that the configuration of the mount 432 may be varied in alternate embodiments of the disclosure.

The system 400 is configured, and the various components thereof are oriented, such that optically clear components, such as the domes 424A, 424B (FIGS. 4, 5), are located within the respective fields-of-view 106A, 106B (FIG. 2) of the lenses 108A, 108B of the DICD 100, whereas optically unclear components (i.e., components that are not optically clear or would otherwise interfere with image capture, for example, semi-transparent components, opaque components, etc.), such as the locking member(s) 418 (FIG. 4), the external button(s) 426, the mount 432, etc., are outside of the fields-of-view 106A, 106B.

With reference now to FIGS. 4, 9, and 10, the underwater system 400 may further include a base 436 that is configured for removable connection to the DICD 100 when the DICD 100 is positioned within the housing 402. It is envisioned that the base 436 may include electronics and/or other circuitry to support functionality of the DICD 100. For example, the base 436 may support wireless connectivity of the DICD 100 to the housing 402, as discussed in further detail below, and/or may include a power source (e.g., one or more batteries).

To facilitate connection and disconnection of the DICD 100 and the base 436, the DICD 100 and the base 436 may include corresponding engagement structures 136, 438, respectively. For example, in the embodiment illustrated in FIGS. 4, 9, and 10, the DICD 100 includes a series of projections 138 (e.g., fingers) that are configured for receipt within corresponding openings 440 formed in the base 436. It is envisioned that the projections 138 may be either movably or fixedly connected to the DICD 100 and that the projections 138 may be configured to facilitate use with and/or connection to an accessory, such as a stand or a tripod. For example, the projections 138 may be pivotably connected to the bottom face 102F of the body 102 such that the projections 138 are repositionable between extended and retracted positions. It is envisioned that the openings 440 may be configured to receive the projections 138 in an interference (e.g., snap-fit) arrangement. Additionally, or alternatively, as seen in FIG. 10, it is envisioned that the base 436 may include a locking member 442 that is configured for engagement with the projections 138. More specifically, in the illustrated embodiment, the locking member 442 includes a key 444 that is configured for insertion into corresponding apertures 140 formed in the projections 138.

To connect the DICD 100 to the base 436, the locking member 442 is moved from a locked (first) position, in which the locking member 442 is positioned within the openings 440 such that the locking member 442 is insertable into the apertures 140, to an unlocked (second) position, in which the locking member 442 is withdrawn from the openings 440. Once the locking member 442 is in the unlocked position, the DICD 100 can be connected to the base 436 via insertion of the projections 138 into the openings 440, and the locking member 442 can be moved into the locked position such that the locking member 442 extends through the apertures 140 to thereby securely engage the DICD 100 and the base 436. To remove the DICD 100 from the base 436, the locking member 442 is moved into the unlocked position, during which move, the locking member (e.g., the key 444) is withdrawn from the apertures 140 and the openings 440 to disengage the locking member 442 from the DICD. The DICD 100 can then be separated from the base 436 by removing the projections 138 from the openings 440.

As illustrated in FIG. 10, it is envisioned that the locking member 442 may include a spring 446 (or other such biasing member) to bias the locking member 442 towards the locked position, and a tactile member 448 (e.g., a handle or ring) to facilitate manual manipulation of the locking member 442 between the locked and unlocked positions.

FIG. 11 illustrates a variation on the locking member 442 (identified by the reference character 542), which includes a pair of pins 550 that are configured for insertion into the apertures 140 formed in the projections 138. In such embodiments, to connect the DICD 100 to the base 436, the pins 550 are moved from a locked (first) position, in which the pins 550 are positioned within the openings 440 in the base 436 such that the pins 550 are insertable into the apertures 140, to an unlocked (second) position, in which the pins 550 are withdrawn from the openings 440. To guard against inadvertent disconnection of the DICD 100 from the base 436, it may be required to move the pins 550 in concert from the locked position to the unlocked position. Once the locking member 542 is in the unlocked position, the DICD 100 can be connected to the base 436 insertion of the projections 138 into the openings 440, and the locking member 542 can be moved into the locked position such that the pins 550 extend through the apertures 140 to thereby fixedly secure the DICD 100 to the base 436. As illustrated in FIG. 11, it is envisioned that the locking member 542 may include springs 546 (or other such biasing members) to bias the pins 550 towards the locked position. To remove the DICD 100 from the base 436, the locking member 542 is moved into the unlocked position, during which move, the pins 550 are withdrawn from the apertures 140 and the openings 440 to disengage the locking member 542 from the DICD. The DICD 100 can then be separated from the base 436 by removing the projections 138 from the openings 440.

As mentioned above, it is envisioned that the base 436 may include electronics (or other such circuitry) that supports wireless connectivity between the DICD 100 and the base 436 (e.g., Wi-Fi, Bluetooth, 4G data, and the like). In such embodiments, the sealed, watertight cavity 404 defined within the housing 402 allows for wireless communication between the base 436 and the DICD 100 such that the base 436 may be utilized to control operation of the DICD 100 (e.g., shutter and mode operation), thereby obviating the need for the external buttons 426 discussed above.

In certain embodiments, it is envisioned that the DICD 100 and/or the base 436 may recognize when the DICD 100 is connected to the base 436, and, thus, when the DICD 100 is positioned within the housing 402 (e.g., via the incorporation of one or more sensors or other such detection means). In such embodiments, operability of the DICD 100 may be automatically altered. For example, external lights or indicators may be dimmed or turned off to reduce or eliminate glare and/or reflections off the domes 424A, 424B. To signal to a user that operation of the DICD 100 has been altered, it is envisioned that the housing 402 may include a suitable indicator (e.g., an LED light).

Figure 13:
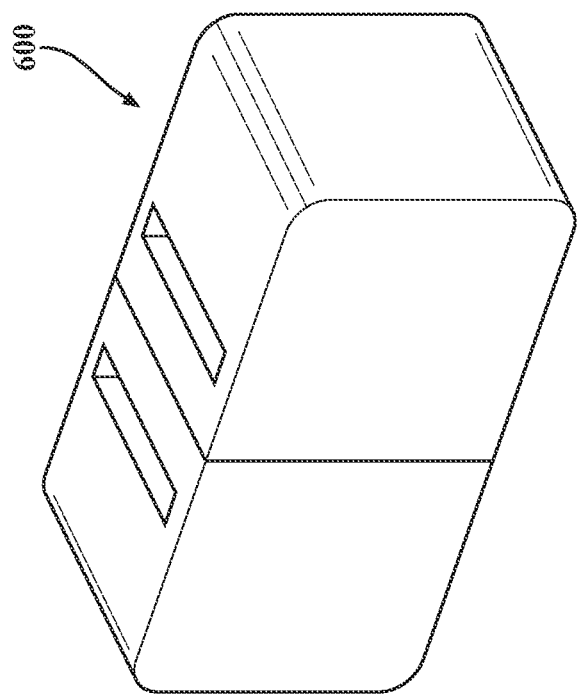
FIG. 13 is a top, perspective view of the adapter seen in FIG. 12.
Figure 12:
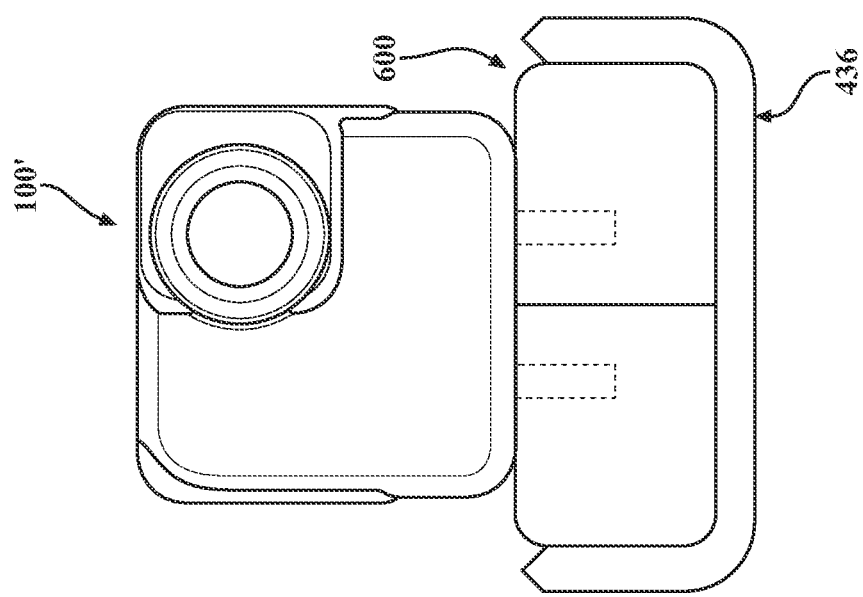
FIG. 12 is a partial, front view showing an alternate embodiment of the DICD connected to the base of the underwater system via an adapter.

Referring now to FIGS. 12 and 13, to support use with a variety of DICDs (e.g., a DICD 100' having a configuration different from that of the aforementioned DICD 100), it is envisioned that the base 436 may be connectable to an adapter 600. For example, the adapter 600 may be configured to ensure that the DICD 100' is properly positioned within the housing 402 (FIG. 4) so as not to distort (or otherwise compromise) the quality of the images and/or data captured by the DICD 100' (e.g., the adapter 600 may be configured to support the DICD 100' such that the DICD 100' is properly aligned with the midlines (e.g., equators) of the domes 424A, 424B in the manner discussed above).

With reference now to FIGS. 14-25, alternate configurations for the underwater system 400 and the housing 402 will be discussed. The systems and housings discussed below are similar to the aforedescribed underwater system 400 and housing 402, and accordingly, will be discussed only with respect to differences therefrom.

Figure 14:
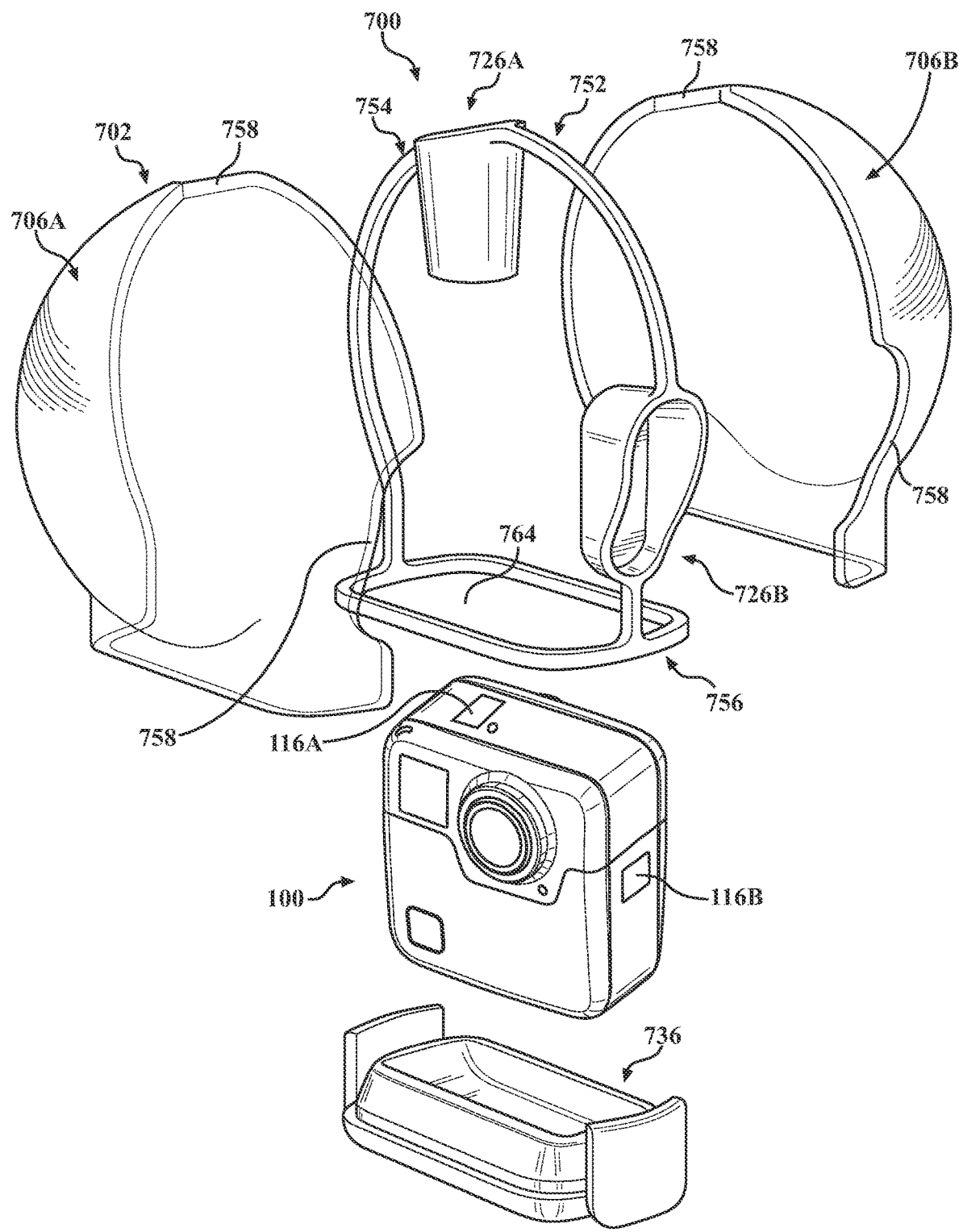
FIG. 14 is a side, perspective view of an alternate embodiment of the underwater system including an internal frame shown with parts separated.
Figure 15:
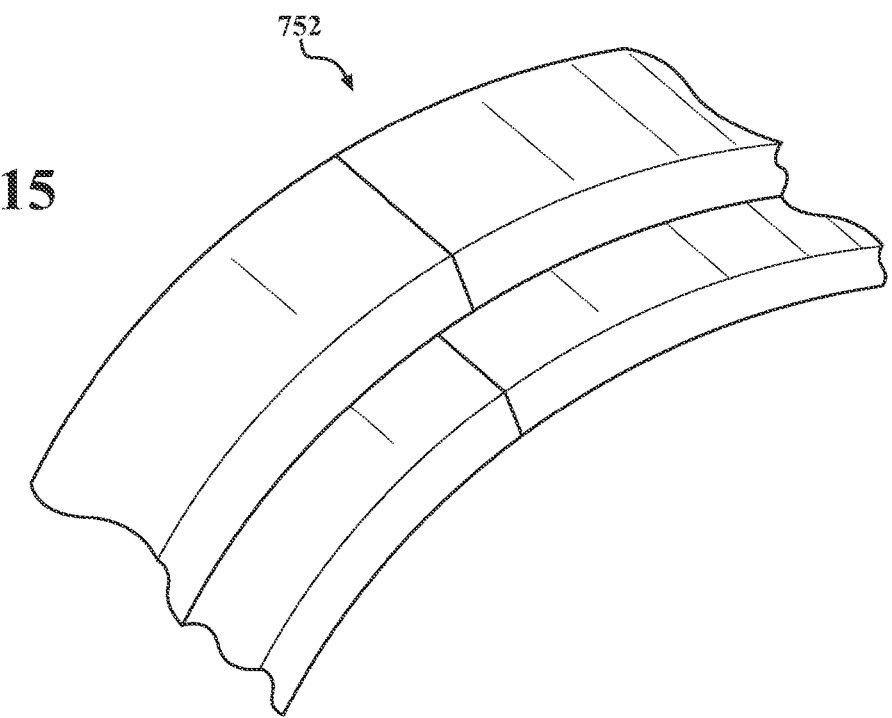
FIG. 15 is a partial, side, perspective view of the frame seen in FIG. 14.
Figure 16:
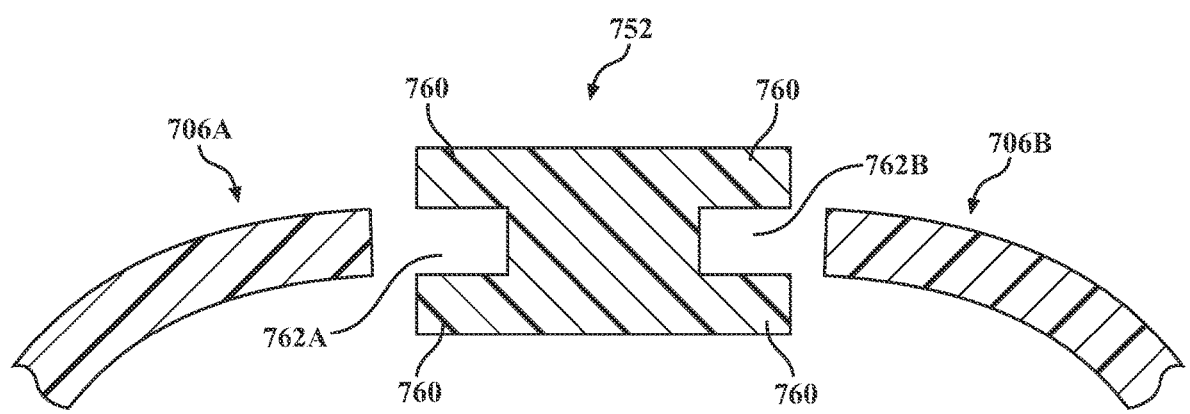
FIG. 16 is a partial, cross-sectional view of the frame seen in FIG. 14 shown with the housing portions of the underwater system.

With reference to FIGS. 14-16, a system 700 is illustrated that includes a housing 702 including discrete first and second housing portions 706A, 706B, respectively, an internal frame 752, and a base 736. The frame 752 is positioned between, and secured to, the housing portions 706A, 706B. It is envisioned that the frame 752 and the housing portions 706A, 706B may be secured together using any method suitable for the intended purpose of creating a watertight connection therebetween, including, for example, the use of an epoxy or ultrasonic welding.

The frame 752 includes a brace 754 that supports external buttons 726, and a foot section 756. In the particular embodiment seen in FIG. 14, the brace 754 supports a first external button 726A that is configured in correspondence with the shutter button 116A on the DICD 100, and a second external button 726B that is configured in correspondence with the mode button 116B on the DICD 100 such that the buttons 116A, 116B can be actuated via the external buttons 726A, 726B, respectively. The frame 752 is configured such that the frame 752 is positioned within the dead zone 130 (FIG. 2) (i.e., outside of the fields-of-view 106A, 106B of the lenses 108A, 108B) upon assembly of the system 700 and the DICD 100 so as not to interfere with image capture. As seen in FIG. 14, the housing portions 706A, 706B include cutouts 758 (e.g., recesses) that are configured to accommodate the external buttons 726 such that the external buttons 726 are manually accessible by the user.

As seen in FIGS. 15 and 16, in certain embodiments, it is envisioned that the frame 752 may include a generally I-shaped cross-sectional configuration that includes extensions 760 defining channels 762 that are configured to receive the housing portions 706A, 706B. More specifically, the frame 752 may define a first channel 762A that is configured to receive the housing portion 706A, and a second channel 762B that is configured to receive the housing portion 706B. Upon assembly of the frame 752 and the housing portions 706A, 706B, the extensions 760 are positionable on opposing (internal and external) surfaces of the housing portions 706A, 706B, as seen in FIG. 16.

The foot section 756 of the frame 752 defines an opening 764 (FIG. 14) that is configured to allow the DICD 100 to pass therethrough during loading of the DICD 100 into the system 700. The foot section 756 intersects the brace 754 and provides one or more sealing surfaces to mitigate the intrusion of unwanted moisture into the housing 402 during use of the system 700 in underwater environments. To enhance sealing between the housing 702, the frame 752, and/or the base 736, it is envisioned that the system 700 may include one or more sealing members (e.g., rubberized gaskets, O-rings, etc.).

To assemble the system 700, it is envisioned that the frame 752 may be connected to the base 736 in any suitable manner. For example, the frame 752 may engage the base 736 in an interference (e.g., snap-fit) arrangement. Alternatively, it is envisioned that the base 736 may be pivotally connected to the frame 752 (e.g., via a hinge or other such structure), and that the base 736 may be secured in relation to the frame 752 and the housing 702 through the use of a clamp, latch, or other such structure.

Figure 18:
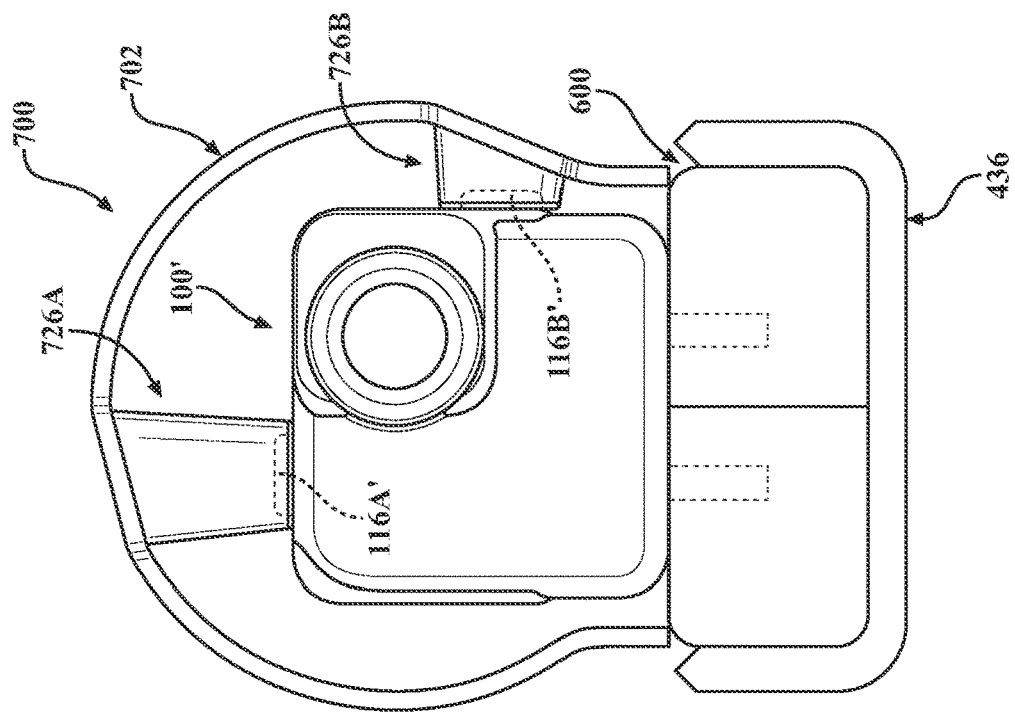
FIG. 18 is a partial, front view of the underwater system seen in FIG. 14 shown connected to an alternate embodiment of the DICD via the adapter seen in FIGS. 12 and 13.
Figure 17:
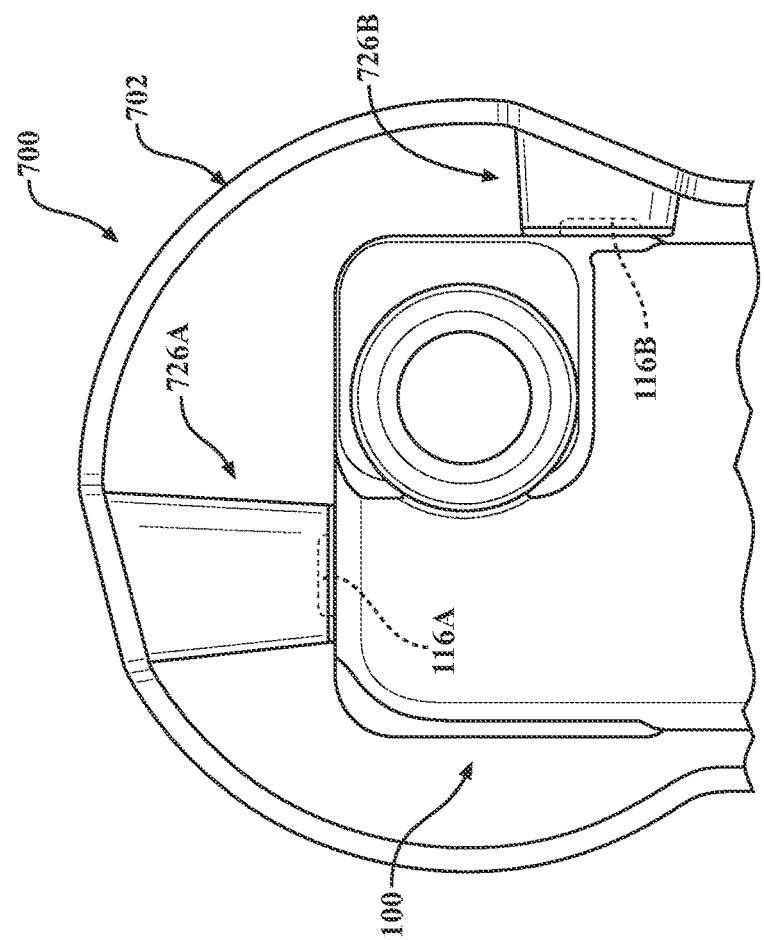
FIG. 17 is a partial, front view of the underwater system seen in FIG. 14 shown with one embodiment of the DICD.
Figure 19:
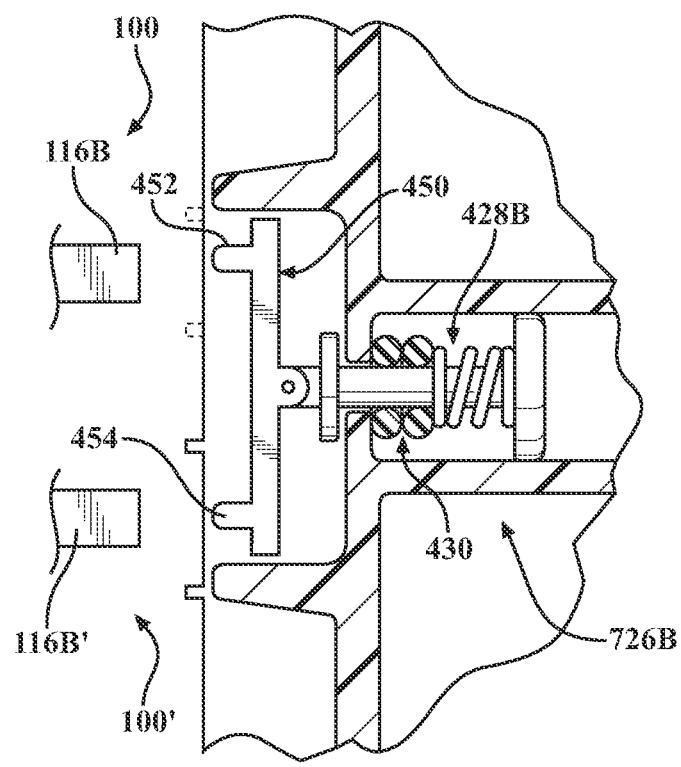
FIG. 19 is a partial, cross-sectional view illustrating an external actuator of the underwater system seen in FIG. 14 showing operation of the DICDs seen in FIGS. 17 and 18.

It is envisioned that the system 700 may be used in connection with a variety of DICDs 100 having different configurations. To facilitate such use, the system 700 may further include the aforementioned adapter 600 (FIGS. 12, 13, 18) to properly position the DICDs 100 within the housing 702 in the manner discussed above. Additionally, it is envisioned that one of the external buttons 726 (e.g., the external button 726B) may include a universal design so as to accommodate for different locations of the buttons 116 on the DICDs 100. For example, as seen in FIGS. 17-19, the DICD 100 may include a button 116B positioned in one location (e.g., at a first height) within the housing 702 (FIG. 17), whereas the aforementioned DICD 100' may include a button 116B' positioned in an alternate location (e.g., at a second, different height) within the housing 702. To facilitate use with the DICDs 100, 100', the external button 726B may include the aforedescribed actuation mechanism 430 such that the plunger 428B is positioned to actuate both the button 116B on the DICD 100 and the button 116B' on the DICD 100'. More specifically, as seen in FIG. 19, the actuation mechanism 430 may include a plate 450 with respective first and second toggles 452, 454 that is pivotally connected to the plunger 428B such that the plate 450 can be displaced (e.g., rocked) to cause contact between the toggle 452 and the button 116B on the DICD 100 and between the toggle 454 and the button 116B' on the DICD 100' such that the external button 726B may be used in connection with either of the DICDs 100, 100'.

Figure 20:
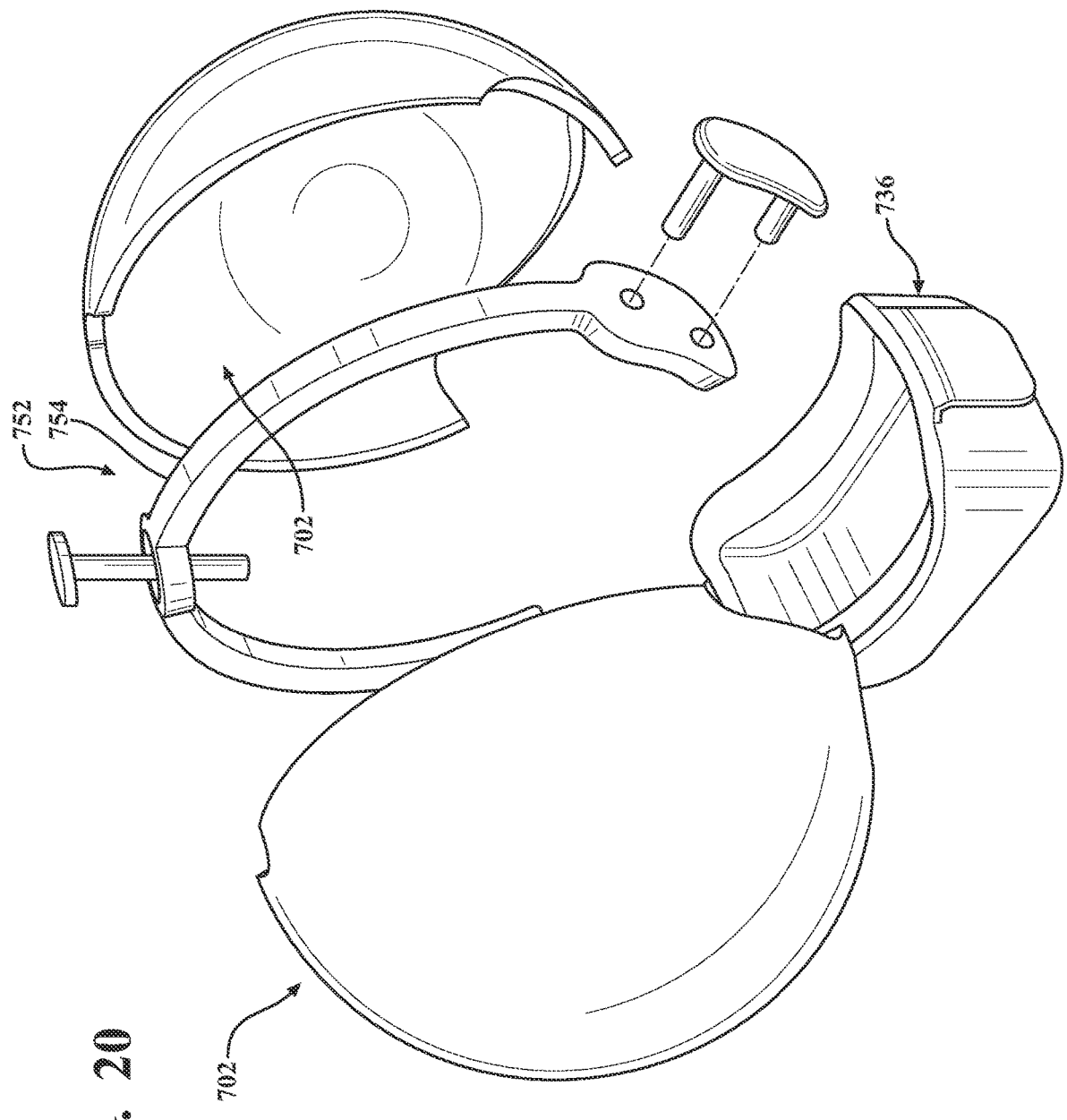
FIG. 20 is a side, perspective view of an alternate embodiment of the underwater system.
Figure 21:
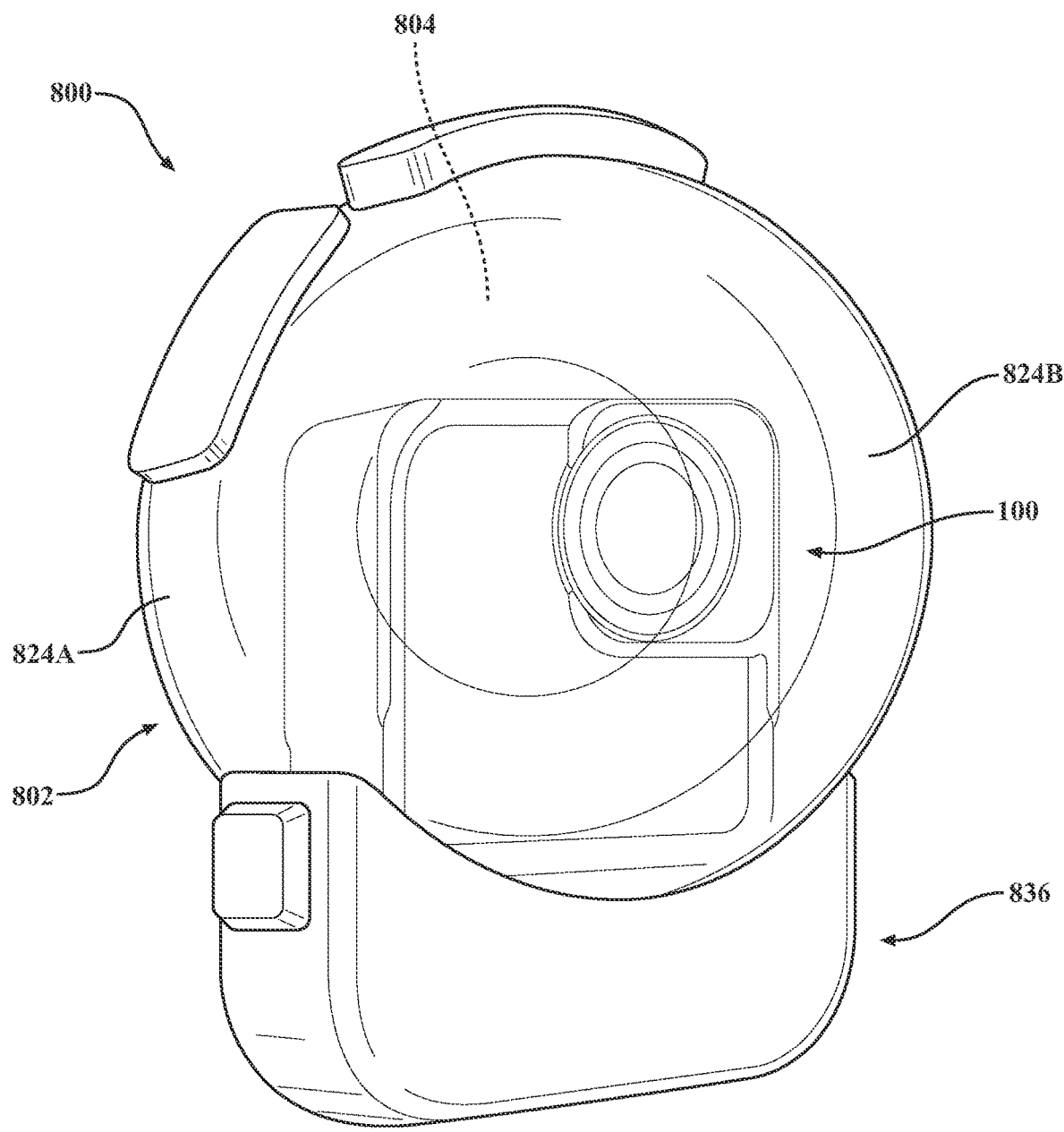
FIG. 21 is a side, perspective view of an alternate embodiment of the underwater system including a base, and a housing with a pair of integrally formed globes.

FIG. 20 illustrates an alternate embodiment of the frame 752, which is devoid of the aforedescribed foot section 756. In such embodiments, it is envisioned that the brace 754 and/or the housing 702 may be directly connected to the base 736.

With reference now to FIGS. 21-25, another embodiment of the system, which is identified by the reference character 800, will be discussed. The system 800 includes a housing 802 with a pair of domes 824A, 824B that are integrally (e.g., monolithically) formed, such as via molding, to define a generally globe-shaped configuration, as well as a base 836. The housing 802 is connected to the base 836 so as to create a watertight cavity 804 therebetween. For example, in various embodiments, it is envisioned that the housing 802 may be inserted into the base 836 so as to form a seal therebetween, that the base 836 may be inserted into the housing 802 so as to form a seal therebetween, or that the housing 802 and the base 836 may be configured for rotational engagement via corresponding structures (such as threads) to allow the base 836 to be rotatably secured to (e.g., screwed onto) the housing 802.

Figure 23:
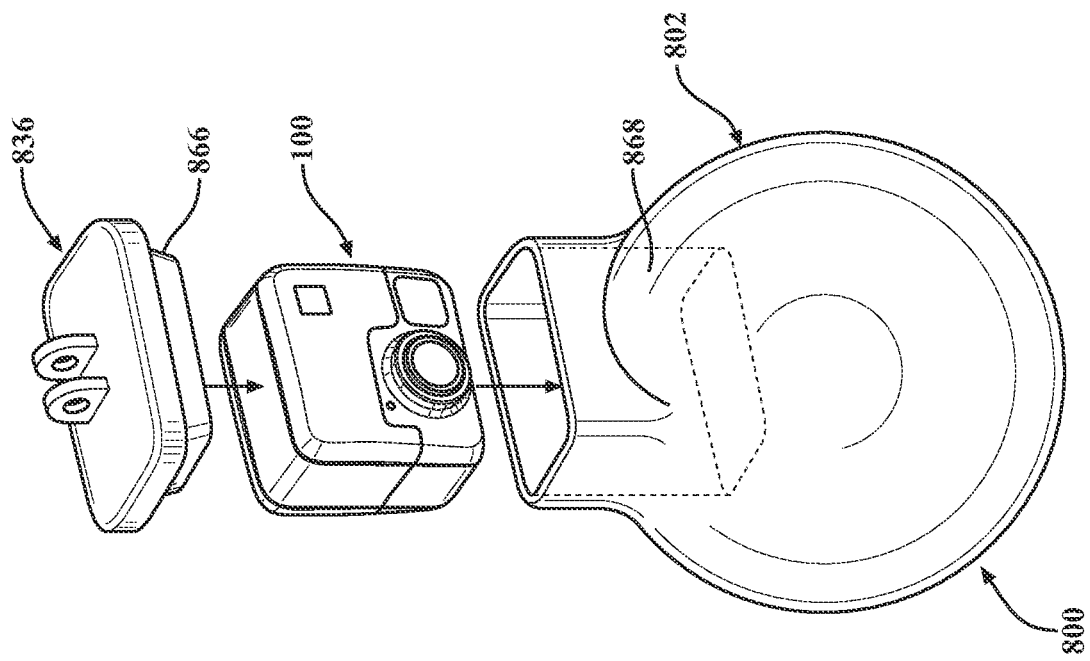
FIG. 23 is a bottom, perspective view of an alternate embodiment of the housing seen in FIGS. 21 and 22 shown separated from the base.
Figure 22:
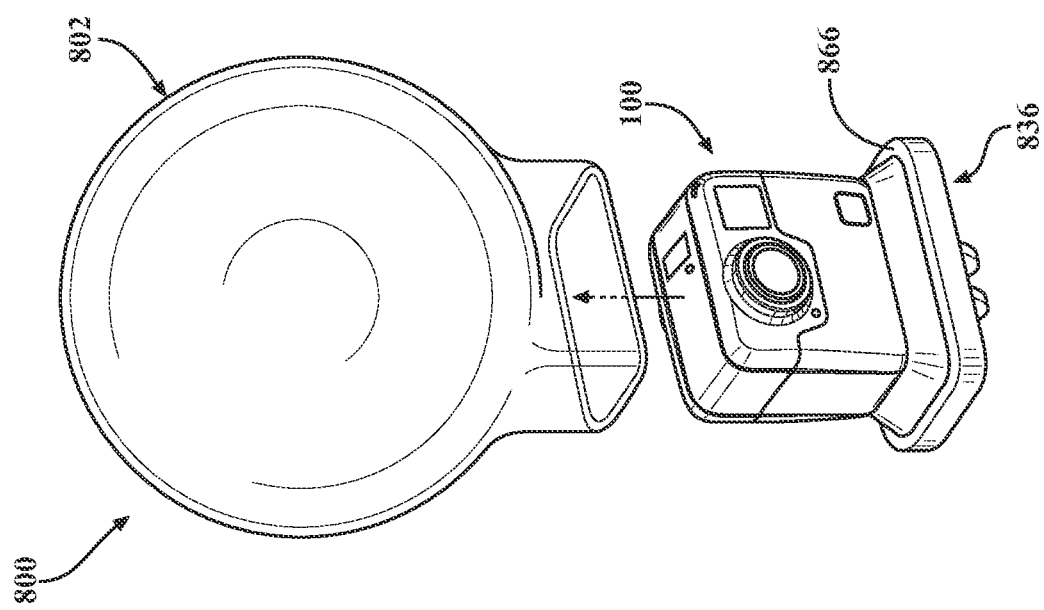
FIG. 22 is a top, perspective view of the underwater system seen in FIG. 21 shown with the housing separated from the base.

With reference to FIGS. 22 and 23, to facilitate the formation of a watertight seal between the housing 802 and the base 836, it is envisioned that the housing 802 and/or the base 836 may include one or more sealing members (e.g., gaskets or the like). For example, the base 836 may include an integral rib 866 that engages an inner surface of the housing 802 in a watertight manner. Following connection of the housing 802 to the base 836, it is envisioned that the engagement between the base 836 and the housing 802 may be further secured through the use of a clamp, latch, or other such mechanism or structure.

To assemble the DICD 100 and the system 800, it is envisioned that the DICD 100 may be connected to the base 836 (in the manner described above), and that the housing 802 may be lowered onto the base 836, as seen in FIG. 22. It is also envisioned that the housing 802 may define an internal compartment 868 that is configured to receive the DICD 100, as seen in FIG. 23, and that the base 836 can be connected to the DICD 100 after the DICD 100 is lowered into the housing 802 (in an inverted orientation).

Figure 25:
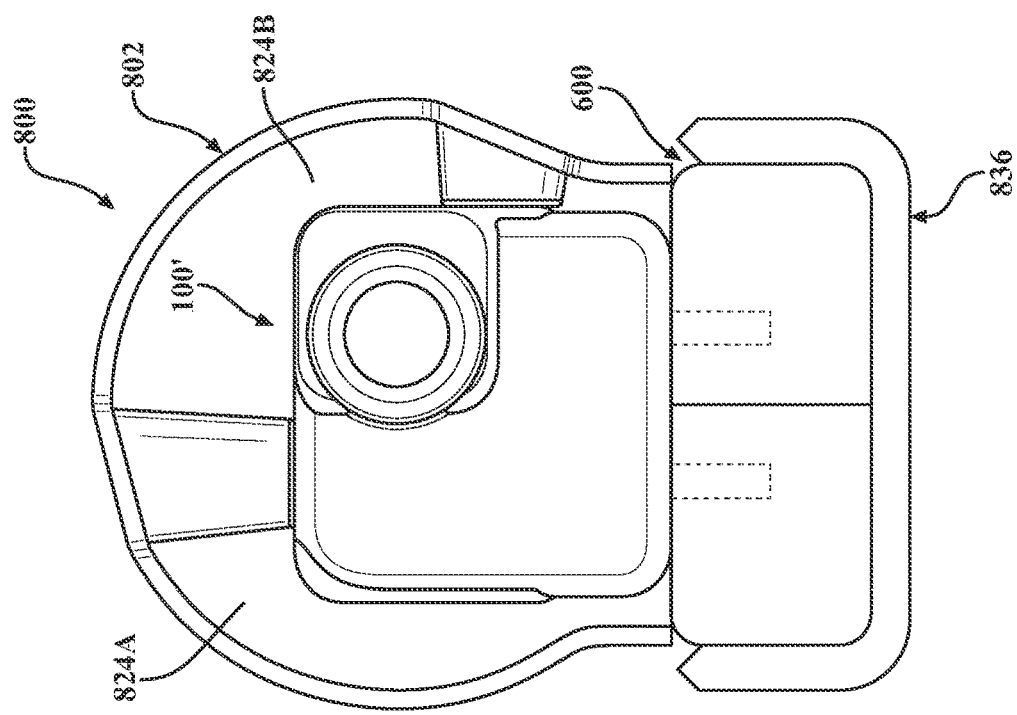
FIG. 25 is a front, plan view of the underwater system seen in FIG. 21 shown connected to an alternate embodiment of the DICD via an adapter.
Figure 24:
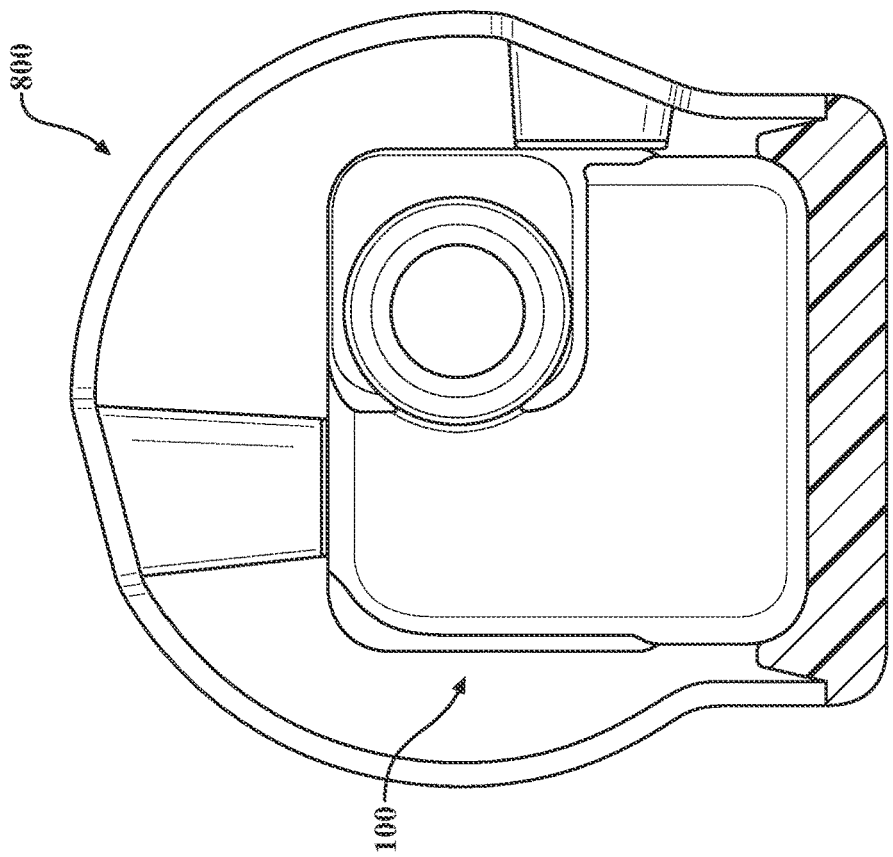
FIG. 24 is a front, plan view of the underwater system seen in FIG. 21 shown with one embodiment of the DICD upon assembly.

As discussed above in connection with preceding embodiments, the system 800 may further include one or more of the aforedescribed adapters 600 (FIGS. 12, 13, 18) to support use with a variety of DICDs. For example, FIGS. 21-24 illustrate use of the system 800 and the DICD 100, which is configured for use with the system 800 without an adapter 600. FIG. 25, however, illustrates the aforementioned DICD 100', which differs in configuration from the DICD 100. To facilitate use of the system 800 with the DICD 100', the adapter 600 is positioned between the DICD 100' and the base 836 such that the DICD 100' is properly positioned within the housing 802 so as not to distort (or otherwise compromise) the quality of the images and/or data captured by the DICD 100' (e.g., such that the DICD 100' is properly aligned with the midlines (e.g., equators) of the domes 824A, 824B in the manner discussed above).

Figure 26:
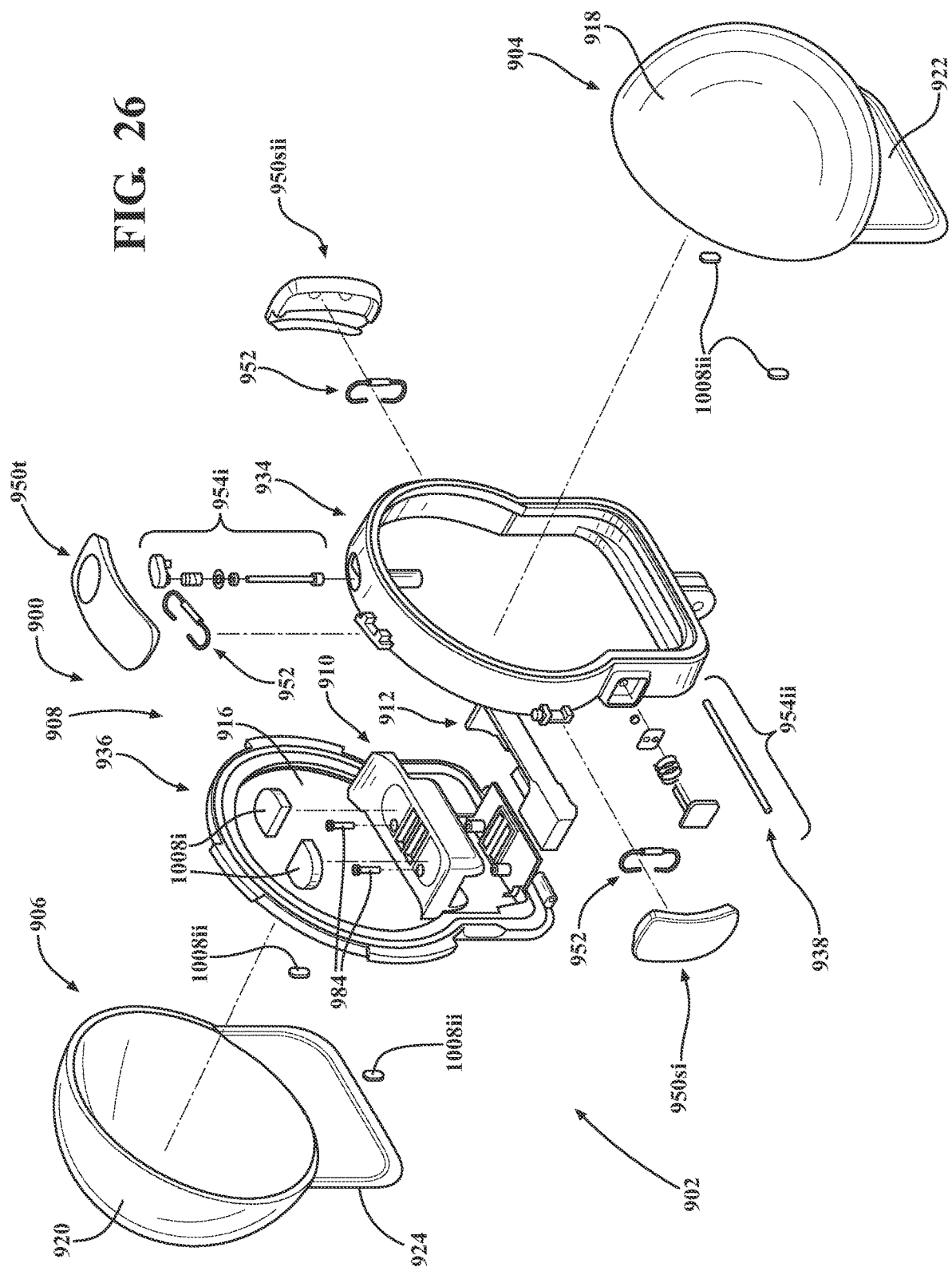
FIG. 26 is an exploded, perspective view of another embodiment of the underwater system.
Figure 27:
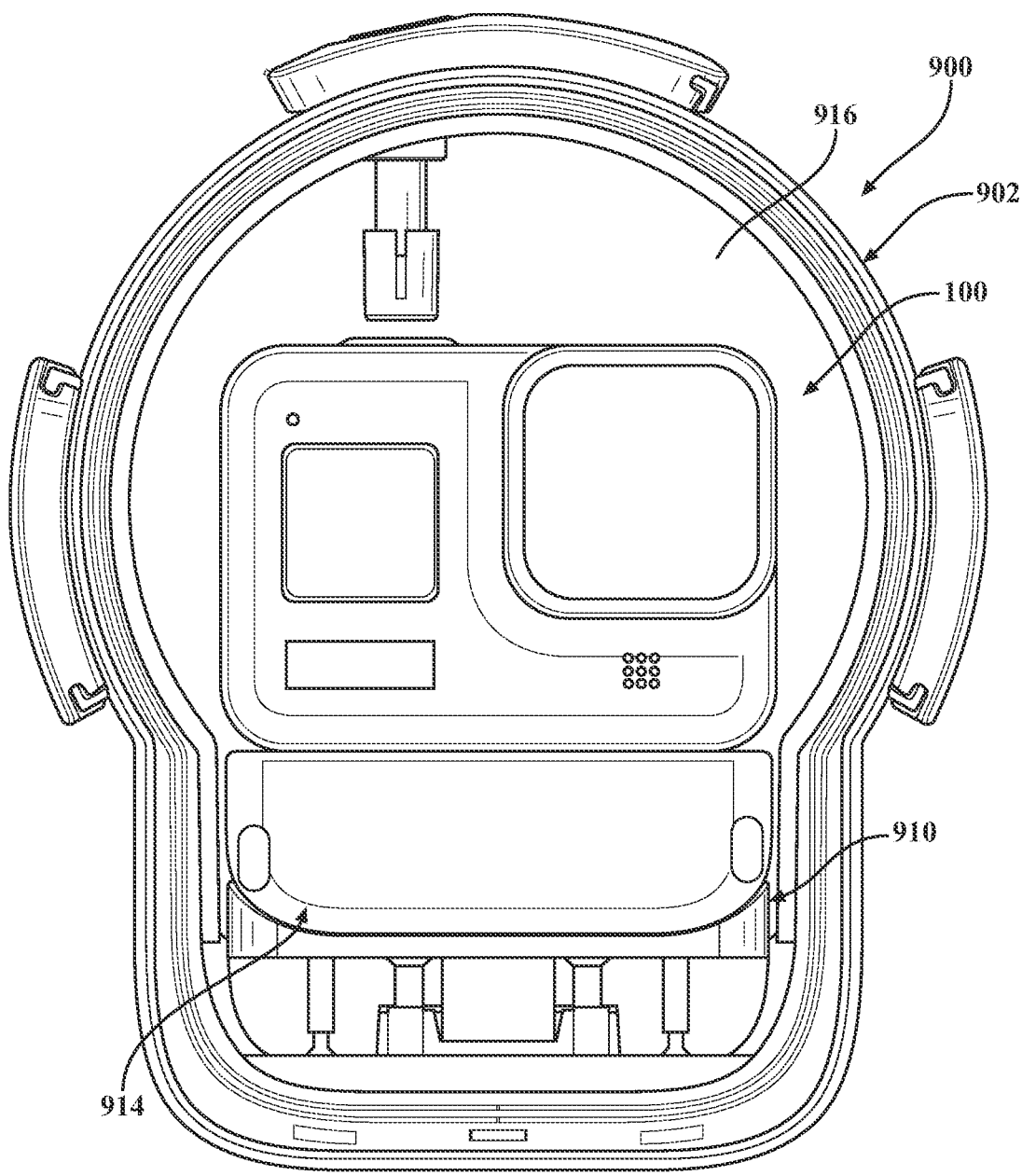
FIG. 27 is a front, plan view illustrating an adapter for use with the underwater system seen in FIG. 26 to facilitate use with different DICDs.

With reference now to FIG. 26, another embodiment of an underwater system for the DICD 100 will be discussed, which is identified by the reference character 900. FIG. 26 provides an exploded, perspective view of the underwater system 900, which encloses and protects a DICD (e.g., the DICD 100) during image/video capture in underwater environments. The underwater system 900 includes a housing 902 with respective front (first) and rear (second) housing portions 904, 906; a center band 908 that supports the housing portions 904, 906; a cradle 910; and a latching mechanism 912. Throughout the discussion that follows, reference will be made to the DICD 100. It should be appreciated, however, that the underwater system 900 may be utilized and adapted for use with any suitable DICD. For example, FIG. 27 provides a front, plan view illustrating that the underwater system 900 may include (or may be used with) an adapter 914 that is configured for reception by (or connection to) the cradle 910 to allow for use of the underwater system 900 with a variety of DICDs 100 having different configurations, profiles, etc.

With reference again to FIG. 26, the housing portions 904, 906 collectively create a pressure vessel for the DICD 100 during underwater image/video capture and collectively define a watertight internal cavity 916 that receives the DICD 100. The housing portions 904, 906 may include (e.g., may be formed partially or entirely from) any material suitable for this intended purpose such as, for example, one or more optically clear plastic materials and may be formed through any suitable manufacturing process (e.g., molding), as discussed above. For example, in one particular embodiment, it is envisioned that the housing portions 904, 906 may include (e.g., may be formed partially or entirely from) polycarbonate. As described in further detail below, the housing portions 904, 906 are configured to allow light to enter the underwater system 900 in a manner that facilitates proper image/video capture so as to inhibit (if not entirely prevent) underwater distortion during use of the DICD 100.

In certain embodiments, such as that shown throughout the figures, the housing portions 904, 906 may be identical in configuration. More specifically, the housing portions 904, 906 respectively include domes 918, 920 and generally planar extensions 922, 924 that extend from the domes 918, 920 so as to conceal and protect the cradle 910, the latching mechanism 912, etc. To reduce (if not entirely prevent) the entry of water and potential leakage paths during underwater use, the housing portions 904, 906 may be unitarily (e.g., monolithically formed) such that the domes 918, 920 are integrally connected to the respective planar extensions 922, 924.

Figure 28:
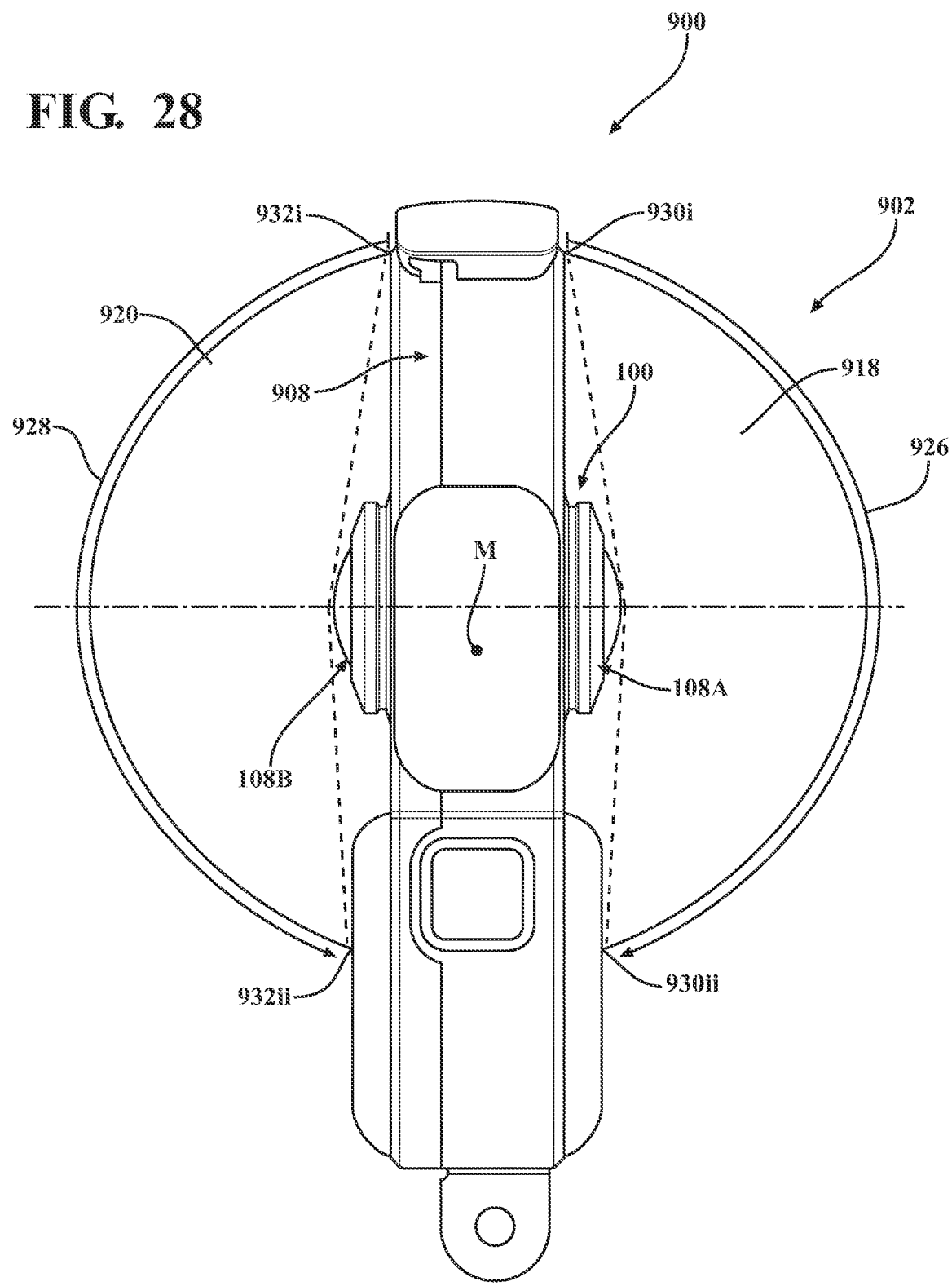
FIG. 28 is a side, plan view of the underwater system seen in FIG. 26.

As seen in FIG. 28, which provides a side, plan view of the underwater system 900 and the DICD 100, the domes 918, 920 define respective fields-of-view 926, 928 each of which spans at least 180° to allow the images/video captured by the DICD 100 (e.g., by the lenses 108A, 108B) to be stitched together. In underwater environments, however, light entering the underwater system 900 is refracted as it transitions from the water to the domes 918, 920 to the air retained within the internal cavity 916 defined by the domes 918, 920, which effectively reduces the fields-of-view 926, 928. To compensate for such refraction, it is envisioned that the respective fields-of-view 926, 928 defined by the domes 918, 920 may be extended beyond 180° to increases the overlap to more than 360°. For example, in the illustrated embodiment, the dome 918 includes opposite ends 930$i$, 930$ii$ that are laterally separated from corresponding opposite ends 932$i$, 932$ii$ of the dome 920 by the center band 908 such that the ends 930$i$, 930$ii$, 932$i$, 932$ii$ of the domes 918, 920 are laterally offset from (i.e., positioned outwardly of) a geometrical midpoint M of the DICD 100. In the particular embodiment shown throughout the figures, for example, the underwater system 900 is configured such that the ends 930$i$, 930$ii$ of the dome 918 are laterally separated from the ends 932$i$, 932$ii$ of the dome 920 by approximately 24 mm. The lateral separation created by the center band 908 allows for less offset between the ends 930$i$, 930$ii$ of the dome 918 and the lens 108A and between the ends 932$i$, 932$ii$ of the dome 920 and the lens 108B and attributes a generally spherocylindrical profile (e.g., an "egg" or "pill" shaped configuration) to the portion of the housing 902 including the domes 918, 920 and the section of the center band 908 therebetween. This geometry individually optimizes the optics of the domes 918, 920 relative to the lenses 108A, 108B, respectively, to thereby reduce bending in any incoming light, which allows the respective fields-of-view 926, 928 defined by the domes 918, 920 to span more than 180°. In the illustrated embodiment, for example, the geometry of the domes 918, 920 allows the respective fields-of-view 926, 928 to span approximately 188°. It should be appreciated, however, that both larger and smaller fields-of-view 926, 928 are contemplated herein which may be realized by varying the particular geometries of the domes 918, 920 and the center band 908 and/or the specific mounting locations of the dome domes 918, 920 to the center band 908.

Figure 29A:
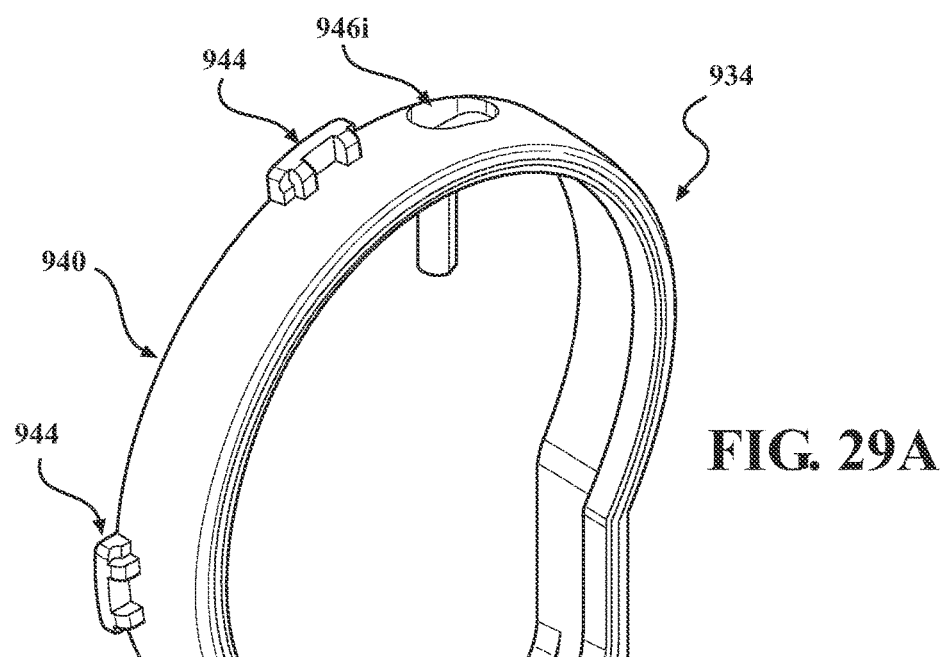
FIG. 29A is a front, perspective view of a front support band of the underwater system seen in FIG. 26.
Figure 29B:
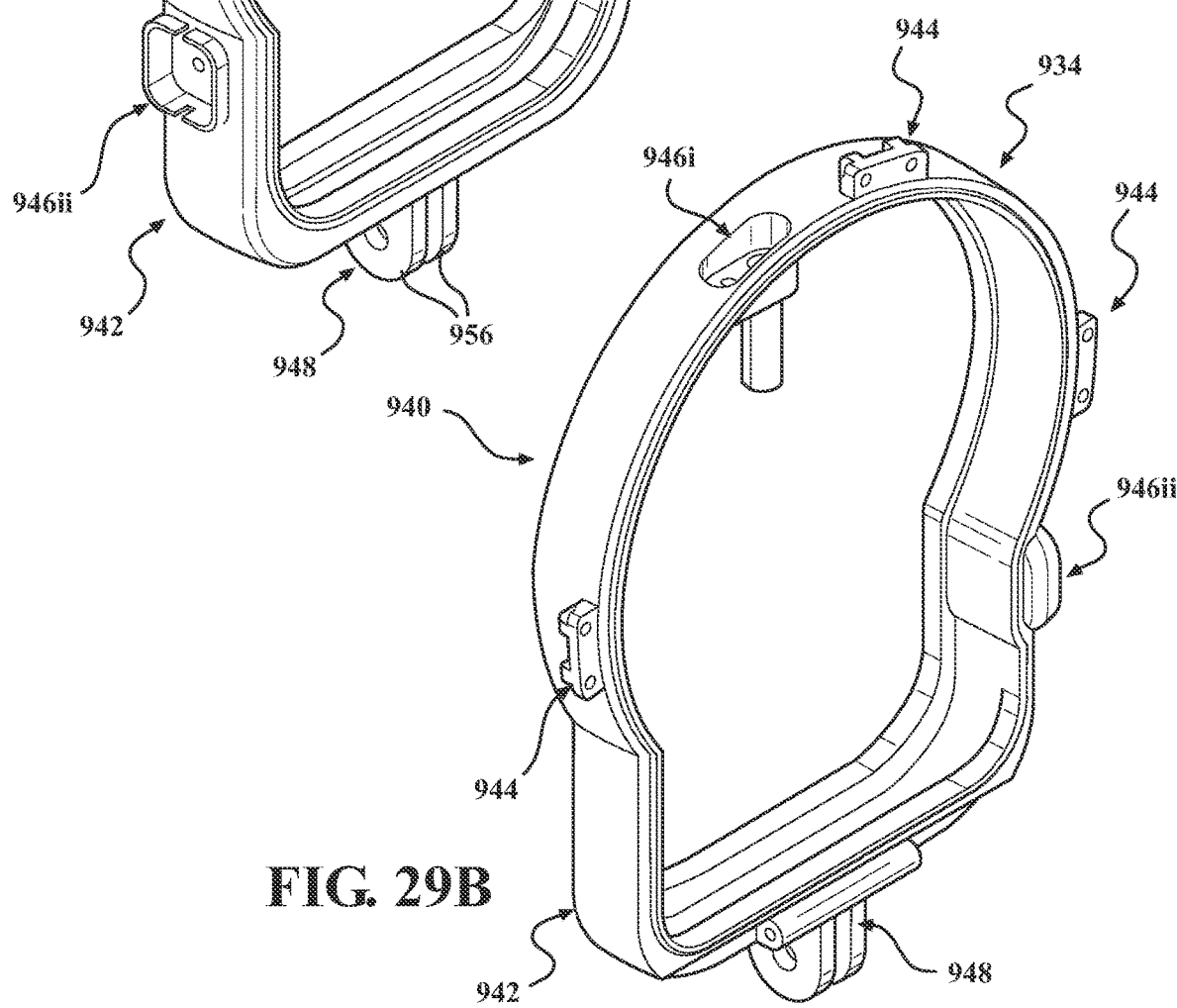
FIG. 29B is a rear, perspective view of the front support band seen in FIG. 29A.
Figure 30A:
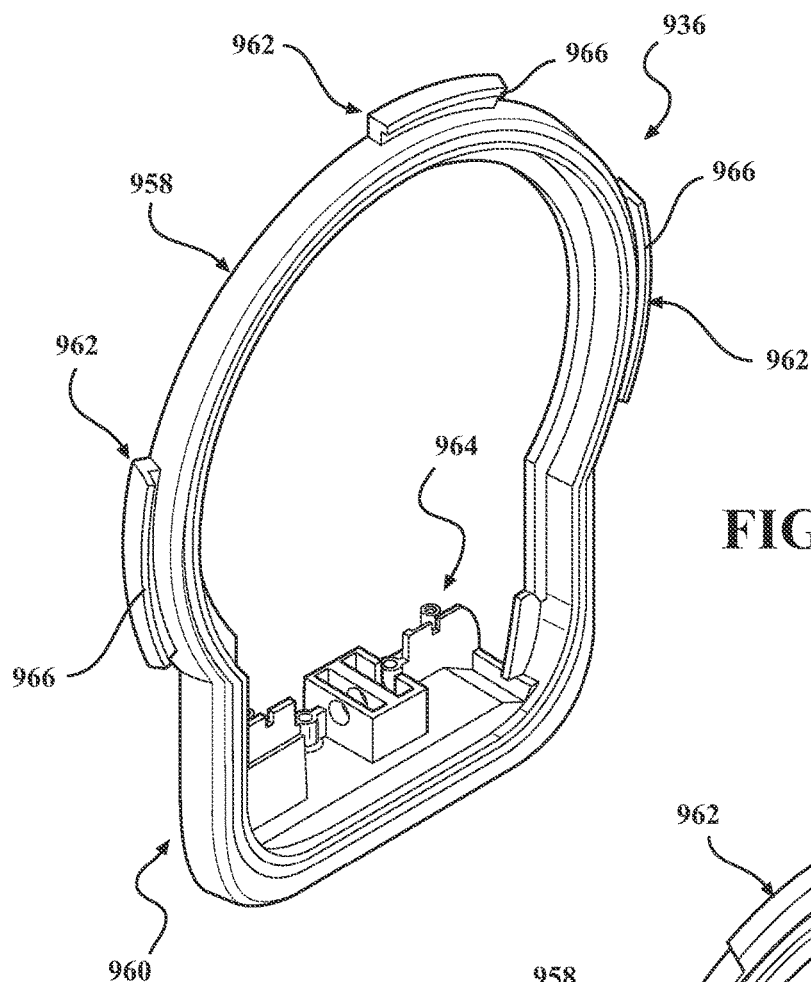
FIG. 30A is a front, perspective views of a rear support band of the underwater system seen in FIG. 26.
Figure 30B:
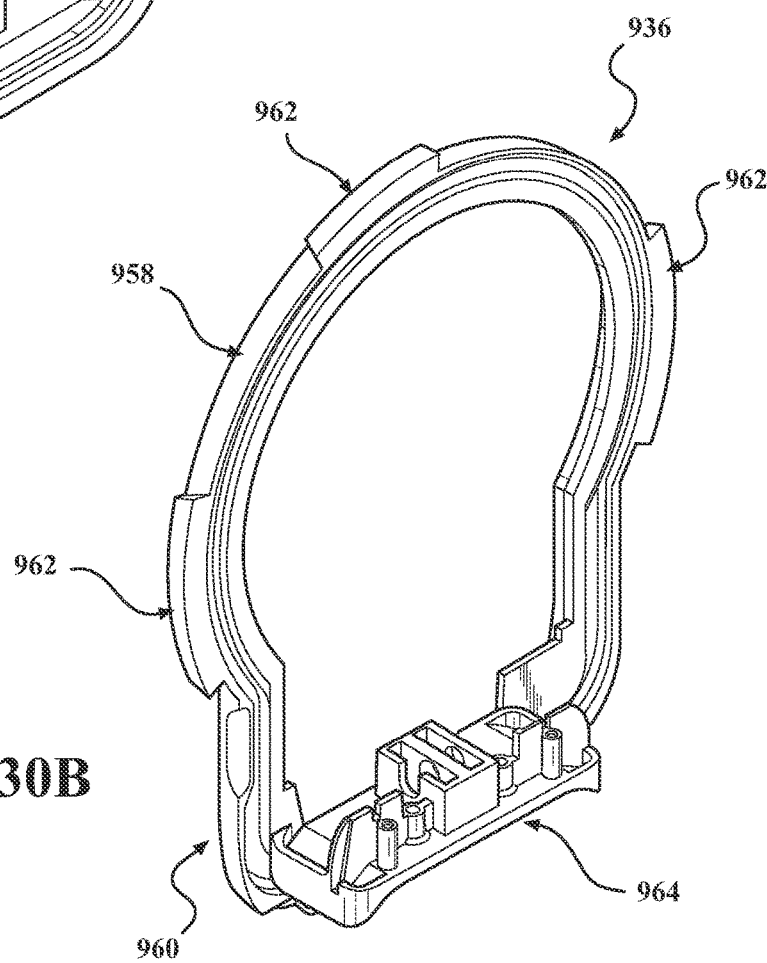
FIG. 30B is a rear, perspective view of the rear support band seen in FIG. 30A.

Referring now to FIGS. 26 and 29A-30B, the center band 908 includes respective front (first) and rear (second) support bands 934, 936. FIGS. 29A and 29B provide front and rear perspective views of the support band 934, respectively, and FIGS. 30A and 30B provide front and rear perspective views of the support band 936, respectively. The support bands 934, 936 provide mounting locations for the domes 918, 920 and may include (e.g., may be formed partially or entirely from) any material suitable for this intended purpose, such as, for example, one or more plastic materials. The support bands 934, 936 are pivotally connected via a hinge pin 938 (FIG. 26), whereby the underwater system 900 is repositionable between open and closed positions, as described in further detail below.

The front support band 934 includes an upper, arcuate section 940 that is configured in correspondence with the 918, 920 of the housing portions 904, 906 and a lower, planar section 942 that extends from the upper section 940 and is configured in correspondence with the extensions 922, 924 of the housing portions 904, 906, respectively. The upper section 940 includes a series of mounts 944 and a series of receptacles 946, and the lower section 942 includes a mounting member 948. In certain embodiments, such as that illustrated throughout the figures, it is envisioned that the front support band 934 may be unitarily (e.g., monolithically) formed, whereby the mounts 944 and the receptacles 946 may be integrally formed with the upper section 940 and the mounting member 948 may be integrally formed with the lower section 942.

Figure 31:
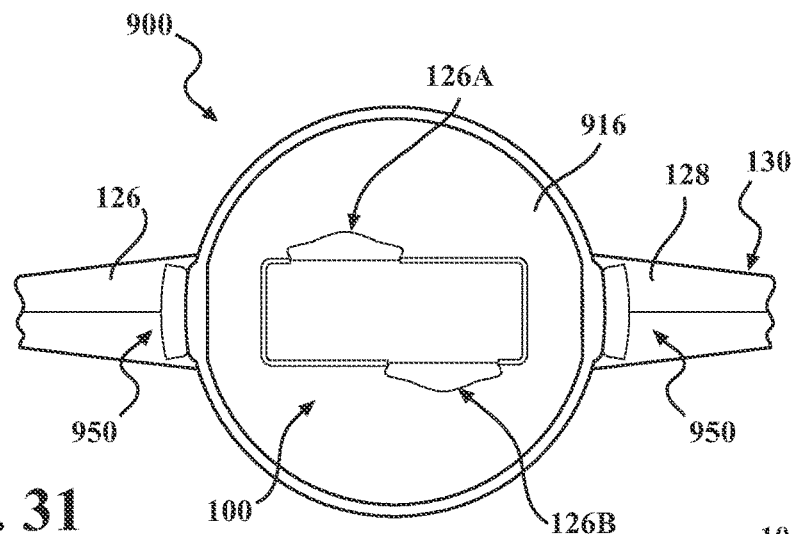
FIG. 31 is a cross-sectional view of the underwater system seen in FIG. 26 shown with a DICD.

The mounts 944 are configured to support the connection of one or more latches 950 to allow for movement of the latches 950 (FIG. 26) between open (unlocked) and closed (locked) positions and, thus, repositioning of the underwater system 900 between the open and closed positions. In the illustrated embodiment, for example, each of the mounts 944 is configured to receive a wireform 952 that pivotally connects the latches 950 to the mounts 944. As seen in FIG. 31, which provides a horizontal, cross-sectional view of the underwater system 900 and the DICD 100, so as not to interfere with image/video capture, the mounts 944 and the latches 950 may be oriented within the blind spots 126, 128, outside of the fields-of-view 106A, 106B of the lenses 108A, 108B, within the "dead zone" 130. Although shown as including three mounts 944 and three latches 950 in the illustrated embodiment (e.g., a top latch 950$t$ and a pair of side latches 950$si$, 950$sii$), it should be appreciated that the particular number and/or orientation of the mounts 944 and the latches 950 may be varied without departing from the scope of the present disclosure. As such, embodiments including both greater and fewer numbers of mounts 944 and latches 950 are contemplated herein.

The receptacles 946 included on the front support band 934 are configured to receive (or otherwise accommodate) one or more actuation mechanisms 954 (FIG. 26), which facilitate the operation of various features on the DICD 100. For example, in the particular embodiment illustrated throughout the figures, the front support band 934 includes a first receptacle 946$i$ that is configured to receive (or otherwise accommodate) a first actuation mechanism 954$i$ that is configured to facilitate operation of the shutter button 116A (FIG. 1A) on the DICD 100 and a second receptacle 946$ii$ that is configured to receive (or otherwise accommodate) a second actuation mechanism 954$ii$ that is configured to facilitate operation of the mode button 116B (FIG. 1A) on the DICD 100, as described in further detail below.

The mounting member 948 (FIGS. 29A, 29B) includes a plurality of fingers 956 and is configured to facilitate use of the underwater system 900 with (and/or connection to) an accessory, such as a stand or a tripod. Additionally, the mounting member 948 is configured for engagement (contact) with the rear support band 936 during movement of the underwater system 900 from the closed position to the open position to define a range of (pivotable) movement for the underwater system 900. In the illustrated embodiment, for example, the mounting member 948 is configured to restrict the range of movement of the underwater system 900 to approximately 60°. It should be appreciated, however, that the configuration of the mounting member 948 may be altered in various embodiments of the disclosure to adjust the range of movement of the underwater system 900 as necessary or desired. Thus, ranges of movement larger and smaller than 60° are also contemplated herein.

The rear support band 936 includes an upper, arcuate section 958 that is configured in correspondence with the domes 918, 920 (FIG. 26) of the housing portions 904, 906 and a lower, planar section 960 that extends from the upper section 958 and is configured in correspondence with the extensions 922, 924 of the housing portions 904, 906, respectively. The upper section 958 includes a series of clasps 962 and the lower section 960 includes a platform 964 that is configured to support the cradle 910. In certain embodiments, such as that illustrated throughout the figures, it is envisioned that the rear support band 936 may be unitarily (e.g., monolithically) formed, whereby the clasps 962 may be integrally formed with the upper section 958 and the platform 964 may be integrally formed with the lower section 960.

The clasps 962 each include an engagement member 966 (FIG. 30A) that is configured for mating contact with the latches 950 to allow for connection and disconnection of the latches 950 and the clasps 962 during movement of the latches 950 between the open (unlocked) and closed (locked) positions, and, thus, repositioning of the underwater system 900 between the open and closed positions. So as not to interfere with image/video capture, in certain embodiments, such as that illustrated in FIGS. 26-31, as discussed with respect to the mounts 944 and the latches 950, the clasps 962 may be oriented within the blind spots 126, 128 (FIG. 31), outside of the fields-of-view 106A, 106B of the lenses 108A, 108B, within the "dead zone" 130.

Figure 32:
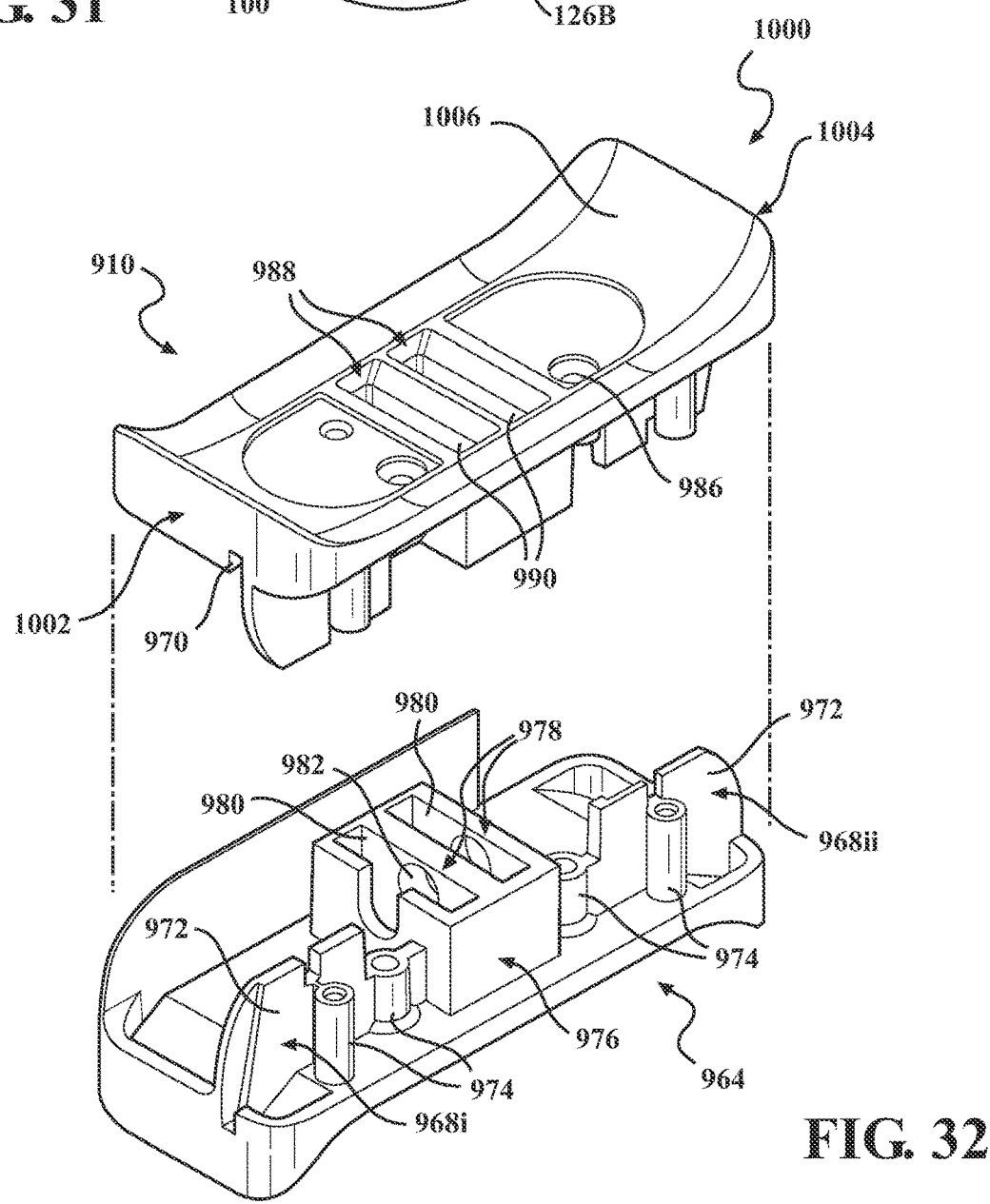
FIG. 32 is a top, perspective view illustrating a cradle and a platform of the underwater system seen in FIG. 26.

With reference to FIG. 32, which provides a top, perspective view of the cradle 910 and the platform 964, to facilitate proper connection and orientation of the cradle 910 with respect to the rear support band 936, the platform 964 includes one or more alignment features 968 that are configured for receipt within corresponding slots 970 (or other such openings) in the cradle 910. More specifically, in the illustrated embodiment, the platform 964 includes a pair of alignment features 968*i*, 968*ii* positioned on opposite sides of the platform 964 that are configured for insertion as upstanding (vertical) ribs 972. It should be appreciated, however, that the particular configuration of the alignment features 968 may be varied in alternate embodiments without departing from the scope of the present disclosure.

As seen in FIG. 32, the platform 964 further includes one or more bosses 974 and a receptacle 976 that defines one or more (vertical) openings 978 (e.g., slots 980) and (transverse) apertures 982 that extend in generally orthogonal relation to the openings 978. The boss(es) 974 are configured to receive one or more corresponding fasteners 984 (FIG. 26) (e.g., screws, pins, rivets, or the like) that extend through corresponding openings 986 in the cradle 910 to secure the cradle 910 to the platform 964. The opening(s) 978 in the receptacle 976 are positioned in alignment with one or more opening(s) 988 (e.g., slots 990) in the cradle 910 to accommodate and receive the engagement structure 136 (FIGS. 10, 11) on the DICD 100 (e.g., the projections 138). In such embodiments, the projections 138 may be inserted through the opening(s) 988 in the cradle 910 and into the opening(s) 978 in the receptacle 976 on the platform 964 to facilitate proper seating of the DICD 100 within the cradle 910 and reception of the DICD 100 by the underwater system 900. As described in further detail below, the aperture(s) 982 in the receptacle 976 are configured to receive and accommodate movement of the latching mechanism 912 during movement between locked and unlocked positions, as described in further detail below.

Figure 33:
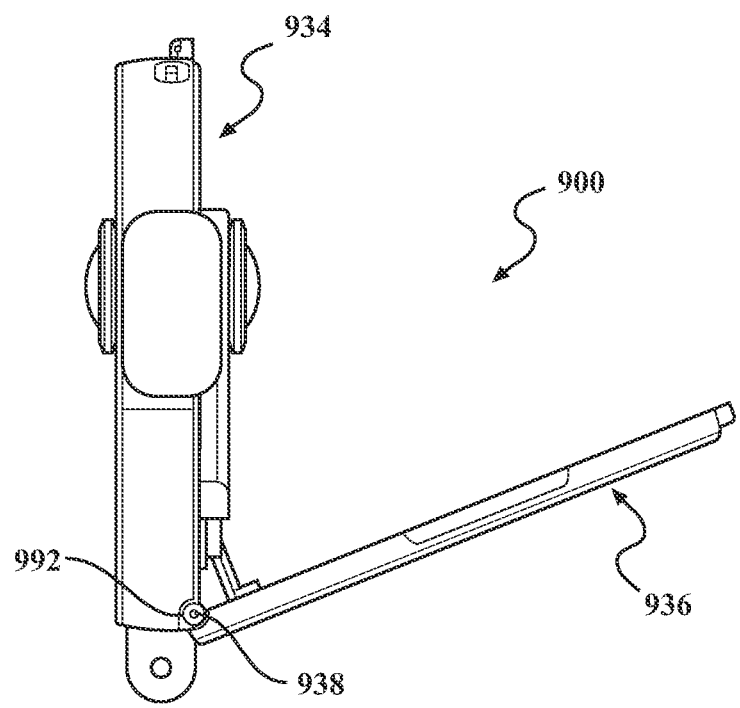
FIG. 33 is a side, plan view of the underwater system seen in FIG. 26 shown in an open position.
Figure 34:
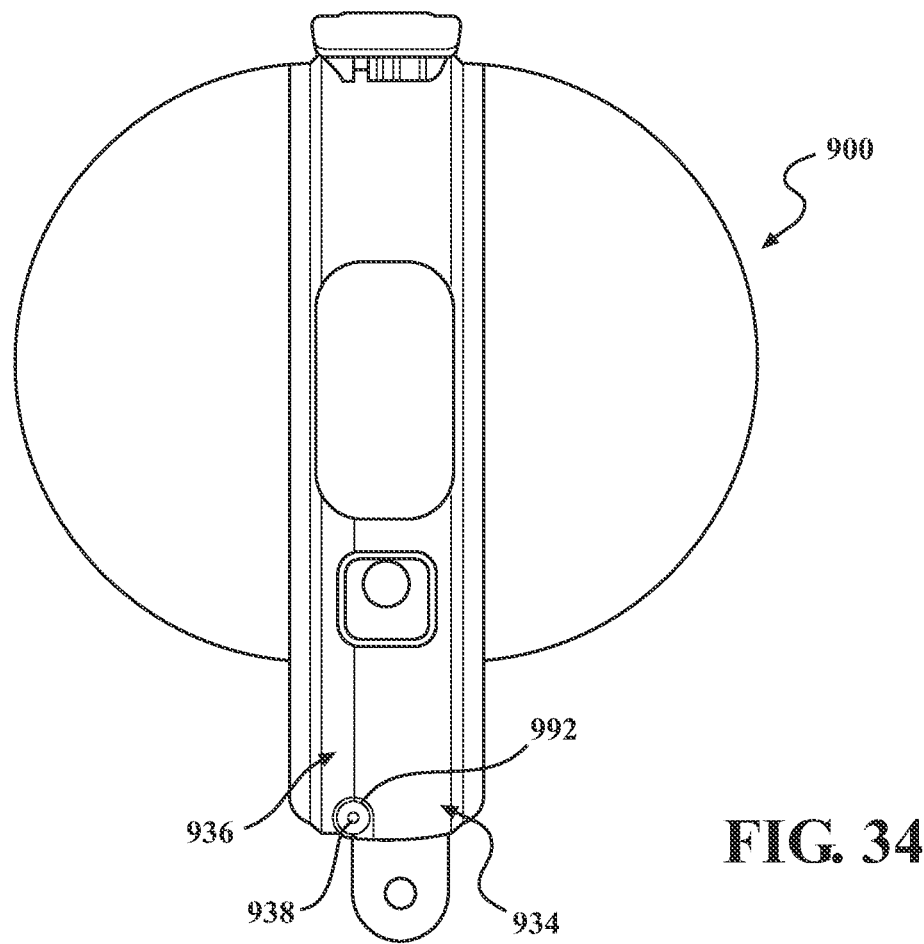
FIG. 34 is a side, plan view of the underwater system seen in FIG. 26 shown in a closed position.

As mentioned above, the respective front and rear support bands 934, 936 are pivotally connected to one another to allow for repositioning of the underwater system 900 between the open and closed positions, as seen in FIGS. 33 and 34, respectively, which provides side, plan views of the underwater system 900. To facilitate such movement, the respective front and rear support bands 934, 936 include a series of corresponding hinge members 992 that are configured to receive the aforementioned hinge pin 938.

Figure 35:
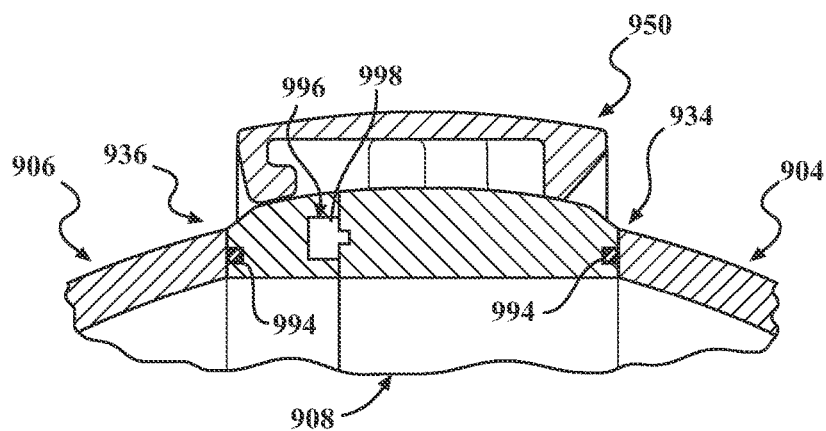
FIG. 35 is a partial, cross-sectional view taken through a latch on a center band of the underwater system seen in FIG. 26.

To maintain the integrity of the watertight internal cavity 916 defined by the housing portions 904, 906, the underwater system 900 includes a series of sealed (or sealable) connections between the housing portions 904, 906 and the center band 908 (i.e., the respective front and rear support bands 934, 936). For example, as seen in FIG. 35, which provides a partial, cross-sectional view of the underwater system 900 taken through one of the latches 950, in the particular embodiment of the disclosure illustrated throughout the figures, the underwater system 900 includes adhesive joints 994 to fixedly and sealingly connect the housing portion 904 to the front support band 934 and the housing portion 906 to the rear support band 936 as well as one or more sealing members 996 (e.g., gaskets 998) to establish and maintain a watertight seal between the support bands 934, 936. It is envisioned that the sealing member(s) 996 may include (e.g., may be formed partially or entirely from) a compressible material, such as, for example, an elastomeric material, to facilitate radial (outward) expansion of the sealing member(s) 996 upon movement of the underwater system 900 into the closed position (e.g., upon locking of the latches 950).

With reference now to FIGS. 26 and 32, the cradle 910 will be discussed. The cradle 910 is configured to support the DICD 100 within the underwater system 900 and may include (e.g., may be formed from) any suitable material or combination of materials. To facilitate reception of the DICD 100, the cradle 910 includes a body portion 1000 defining opposite first and second ends 1002, 1004, respectively, and a seat 1006 that is configured in correspondence with the body 102 of the DICD 100.

In certain embodiments, the underwater system 900 may include one or more dampeners 1008 (e.g., bumpers, cushions, or the like) to facilitate proper location of the DICD 100 within the underwater system 900 and further stabilize the DICD 100 to reduce (if not entirely eliminate) undesirable movement of the DICD 100 within the underwater system 900. In the particular embodiment illustrated throughout the figures, for example, the underwater system 900 includes one more first dampeners 1008*i* that are positioned adjacent to the seat 1006 defined by the cradle 910 (e.g., to vertically stabilize the DICD 100) and one or more second dampeners 1008*ii* that are positioned adjacent to inner surfaces of the housing portions 904, 906 for contact with the faces 102A, 102B (FIG. 1A) of the DICD 100 (e.g., to laterally stabilize the DICD 100).

Figure 36:
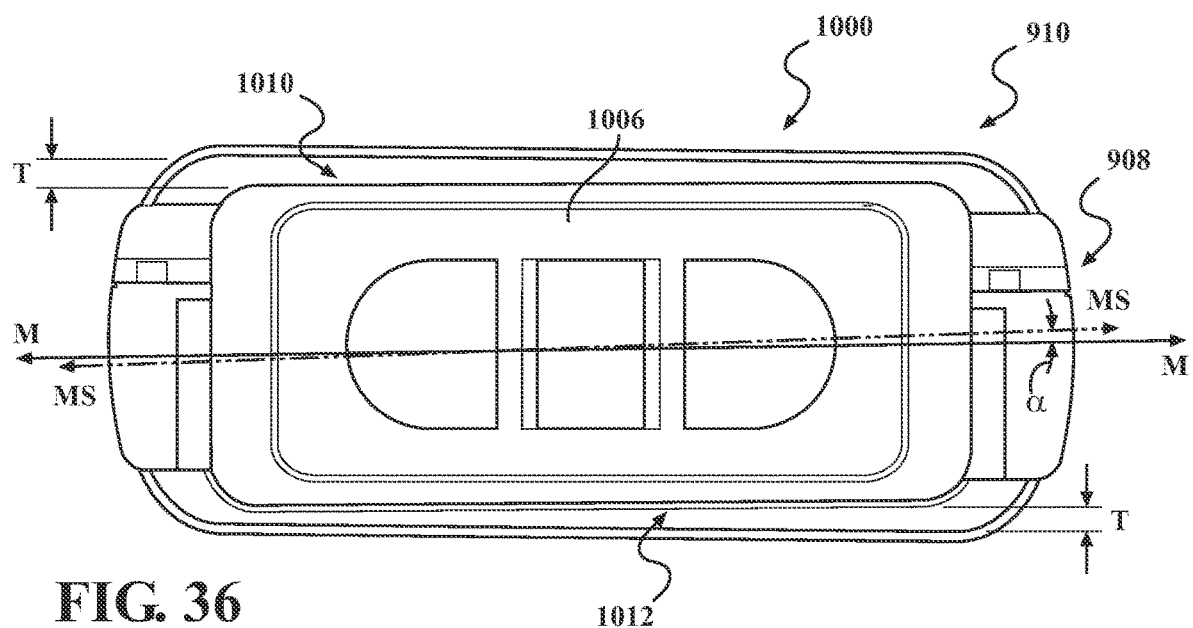
FIG. 36 is a top, plan view of the cradle of the underwater system seen in FIG. 26.

The cradle 910 is fixedly connected to the rear support 936 (e.g., to the platform 964) via the fasteners 984. In certain embodiments, to increase clearance of the latches 950 with respect to the fields-of-view 106A, 106B (FIG. 31) of the lenses 108A, 108B, the seat 1006 of the cradle 910 may be positioned eccentrically relative to the body portion 1000 and the center band 908. More specifically, as seen in FIG. 36, which provides a top, perspective view of the cradle 910, the cradle 910 may be configured such that a midline MS (shown in a dashed line) extending through the seat 1006 is angularly offset from a midline M (shown in a solid line) extending through the body portion 1000 of the cradle 910 and the center band 908 by an angle α. In the particular embodiment illustrated, the cradle 910 is configured such that the angle α is approximately 1°. It should be appreciated, however, that the configuration of the cradle 910 may be varied in alternate embodiments to increase or decrease the angle α as necessary or desired (e.g., based upon the particular dimensions of the DICD 100, the latches 950, etc.). As seen in FIG. 36, the angular offset of the seat 1006 may be achieved by varying the thickness T of respective front and rear walls 1010, 1012 of the cradle 910. To further accommodate the eccentric orientation of the seat 1006 and, thus, the eccentric orientation of the DICD 100 within the underwater system 900, it is envisioned that the thicknesses of the extensions 922, 924 (FIG. 26) of the housing portions 904, 906 may also be varied, whereby the thickness at one lateral end of the extensions 922, 924 may exceed the thickness as an opposing lateral end of the extensions 922, 924 (e.g., by approximately 1 mm).

In an alternate embodiment, it is envisioned that the aforedescribed angular offset of the seat 1006 and the DICD 100 may be achieved by varying the orientation of the cradle 910 itself. More specifically, it is envisioned that the cradle 910 may be angularly offset from the midline M by the angle α such that the midlines M, MS are colinear and each extend through the body portion 1000 of the cradle and the seat 1006, thereby obviating the need to vary the thickness T of the respective front and rear walls 1010, 1012 of the cradle 910.

Figure 37:
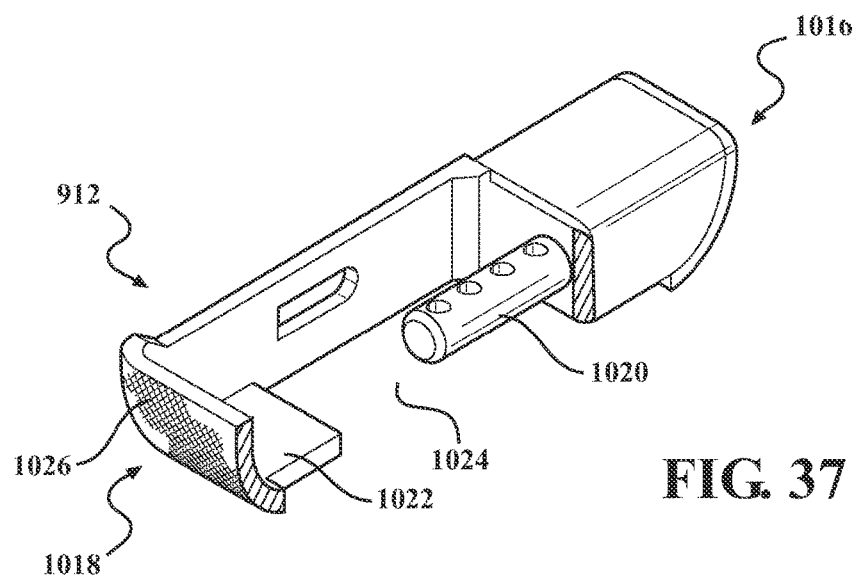
FIG. 37 is a perspective view of a latching mechanism of the underwater system seen in FIG. 26.
Figure 38:
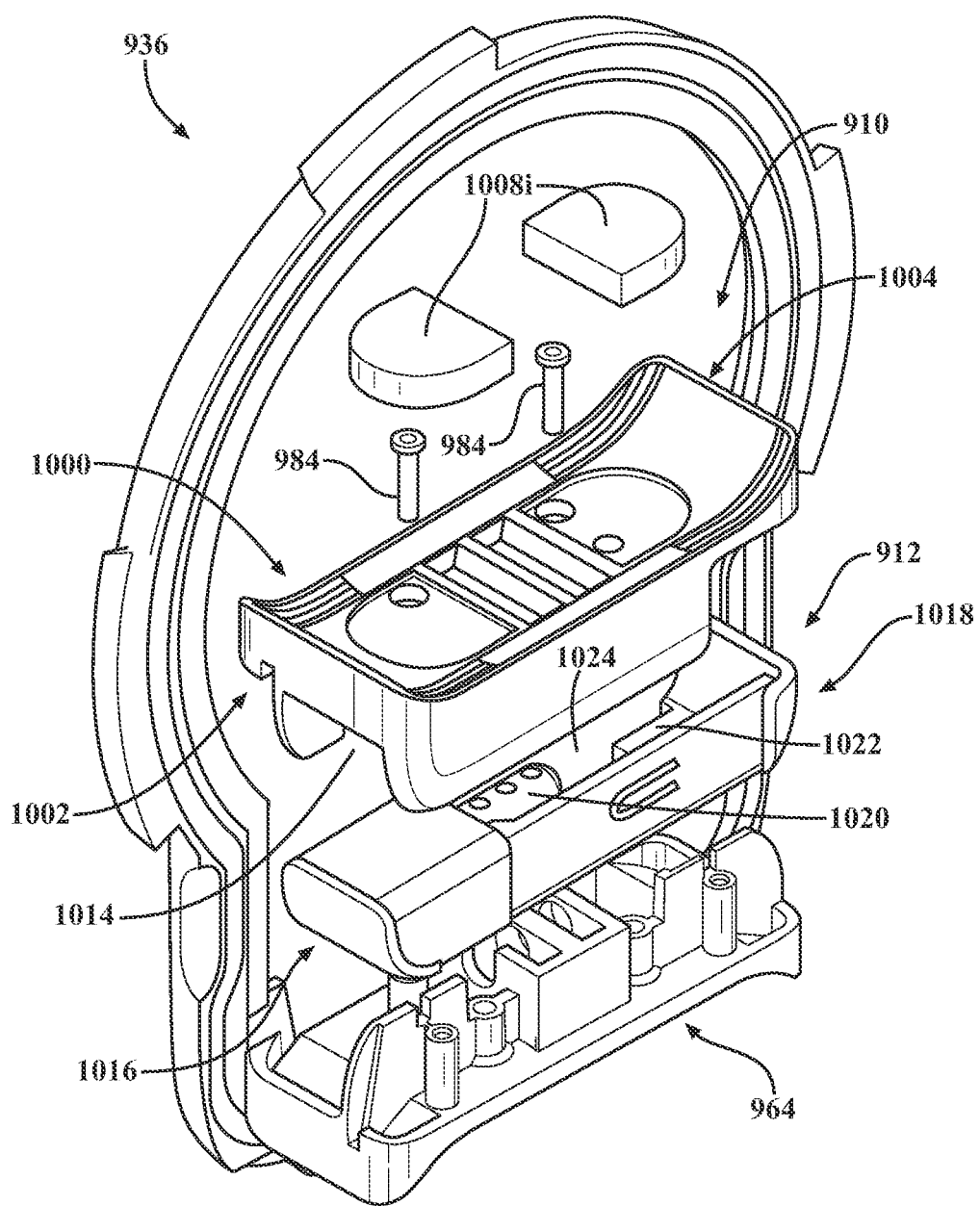
FIG. 38 is an exploded, perspective view of the rear support band of the underwater system seen in FIG. 26.
Figure 39B:
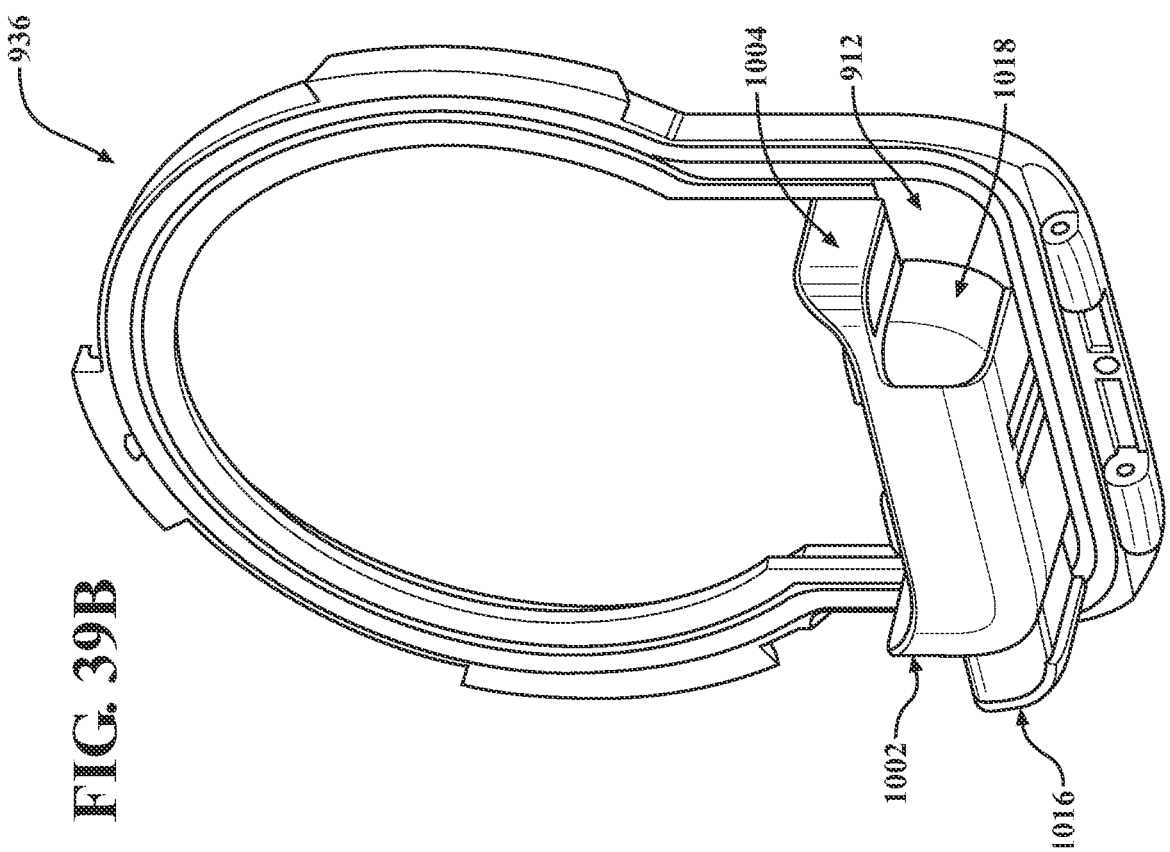
FIG. 39B is a rear, perspective view of the rear support band of the underwater system seen in FIG. 26 illustrating the latching mechanism in an unlocked position.
Figure 39A:
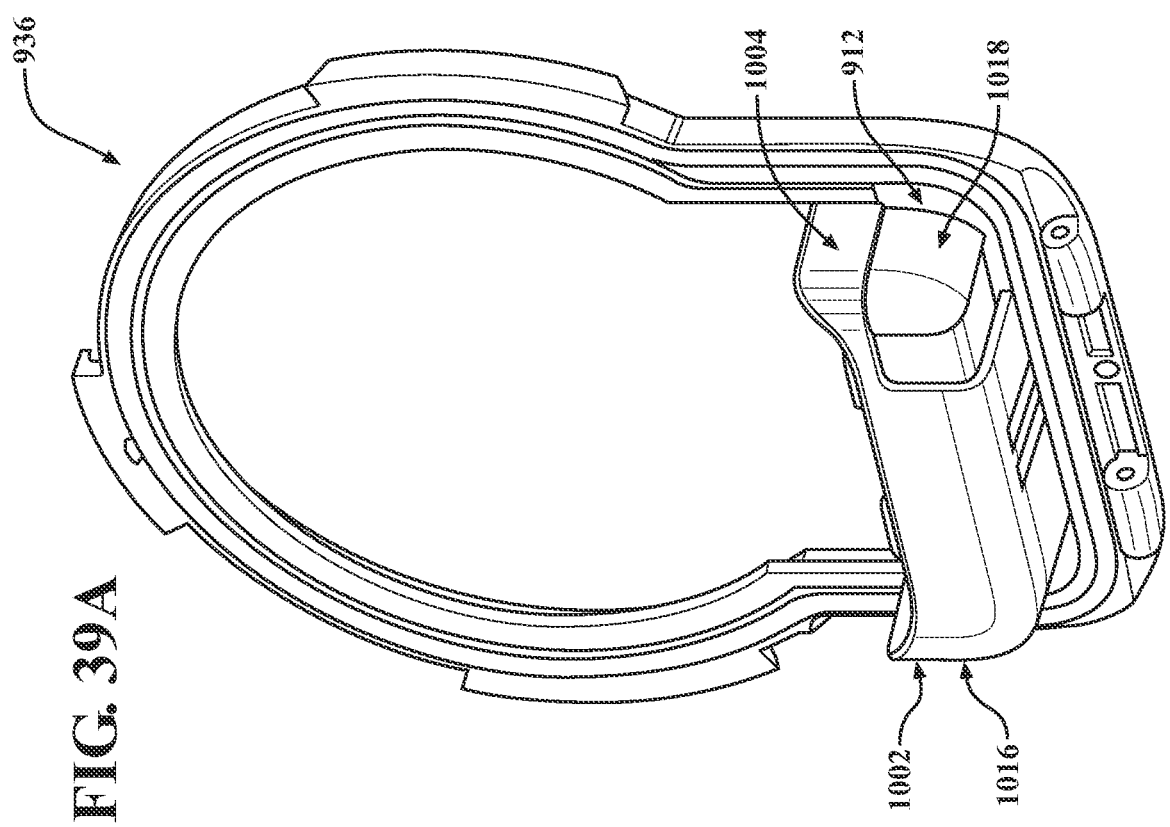
FIG. 39A is a rear, perspective view of the rear support band of the underwater system seen in FIG. 26 illustrating the latching mechanism in a locked position.

With reference now to FIGS. 26 and 37-39B, the latching mechanism 912 will be discussed. More specifically, FIG. 37 provides a perspective view of the latching mechanism 912; FIG. 38 provides an exploded, perspective view of rear support band 936 illustrating positioning of the latching mechanism 912 between the cradle 910 and the platform 964; FIG. 39A provides a rear, perspective view of the rear support band 936 illustrating the latching mechanism 912 in the locked position; and FIG. 39B provides a rear, perspective view of the rear support band 936 illustrating the latching mechanism 912 in the unlocked position.

The latching mechanism 912 is received in an undercut 1014 (e.g., a recess, a chamber, etc.) defined by the body portion 1000 of the cradle 910 and includes opposite first and second ends 1016, 1018, respectively, as well as a locking pin 1020 and a stop 1022 that define a gap 1024 therebetween. The locking pin 1020 is configured for insertion into and removal from the transverse aperture(s) 982 (FIG. 32) in the receptacle 976 of the platform 964 during movement of the latching mechanism 912 between the locked position (FIG. 39A) and the unlocked position (FIG. 39B). More specifically, when the latching mechanism 912 is in the locked position, the ends 1016, 1018 of the latching mechanism 912 are generally aligned with the ends 1002, 1004 of the cradle 910, respectively, and the locking pin 1020 extends through the transverse aperture(s) 982 and the apertures 140 (FIGS. 10, 11) formed in the engagement structure 136 on the DICD 100 to thereby securely connect the DICD 100 to the underwater system 900. When removal of the DICD 100 from the underwater system 900 is necessary or desired, the latching mechanism 912 can be moved in to the unlocked position via lateral movement (sliding) relative to the cradle 910 and the platform 964, whereby the locking pin 1020 is removed from the transverse aperture(s) 982 and from the engagement structure 136 on the DICD 100. In the unlocked position, the gap 1024 defined between the locking pin 1020 and the stop 1022 is generally aligned with the receptacle 976 and the opening(s) 988 in the cradle 910, which allows the engagement structure 136 on the DICD 100 to be removed from the receptacle 976, from the latching mechanism 912 via the gap 1024, and from the cradle 910, thus allowing for separation of the DICD 100 from the underwater system 900. As seen in FIG. 39B, in the unlocked position, the latching mechanism 912 is laterally offset from the cradle 910 such that the ends 1016, 1018 of the latching mechanism 912 are spaced laterally (horizontally) from the ends 1002, 1004 of the cradle 910, respectively. When so positioned, the latching mechanism 912 extends laterally outward from the cradle 910 such that the end 1016 of the latching mechanism 912 is positioned between the support bands 934, 936 to interfere with (inhibit, block) closure of the underwater system 900, thereby preventing use of the underwater system 900 until the DICD 100 is secured in place via the latching mechanism 912. In certain embodiments, it is envisioned that the end 1016 of the latching mechanism 912 may include a visual indicator 1026 (FIG. 37) (e.g., color variation, different texturing, etc.) to identify the latching mechanism 912 as being in the unlocked position.

The range of motion for the latching mechanism 912 is defined by the stop 1022, which is configured for engagement (contact) with corresponding structure on the cradle 910. More specifically, during movement of the latching mechanism 912 from the locked position to the unlocked position, the stop 1022 is brought into engagement (contact) with a wall of the cradle 910 to thereby restrict continued movement of the latching mechanism 912 and maintain the assembly of the platform 964, the latching mechanism 912, and the cradle 910.

Figure 40:
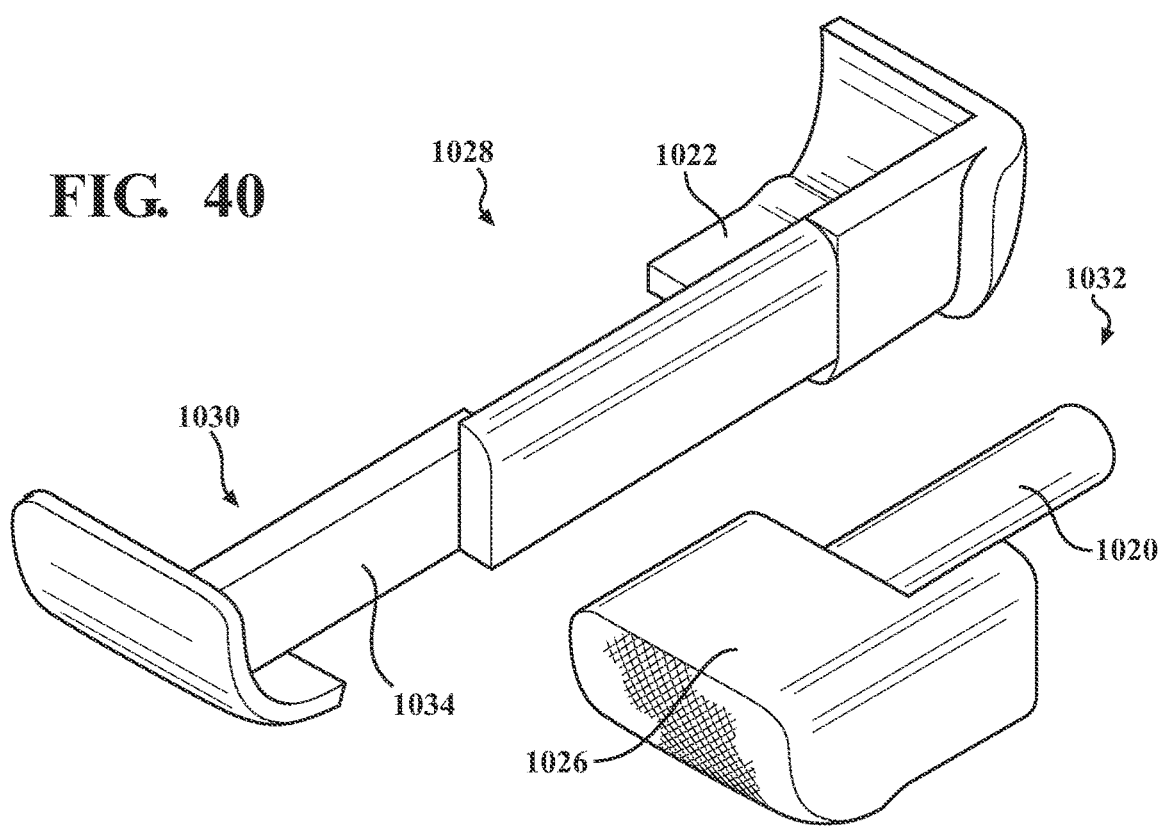
FIG. 40 is a top, perspective view of an alternate embodiment of the latching mechanism for the underwater system seen in FIG. 26 shown with parts separated.
Figure 41:
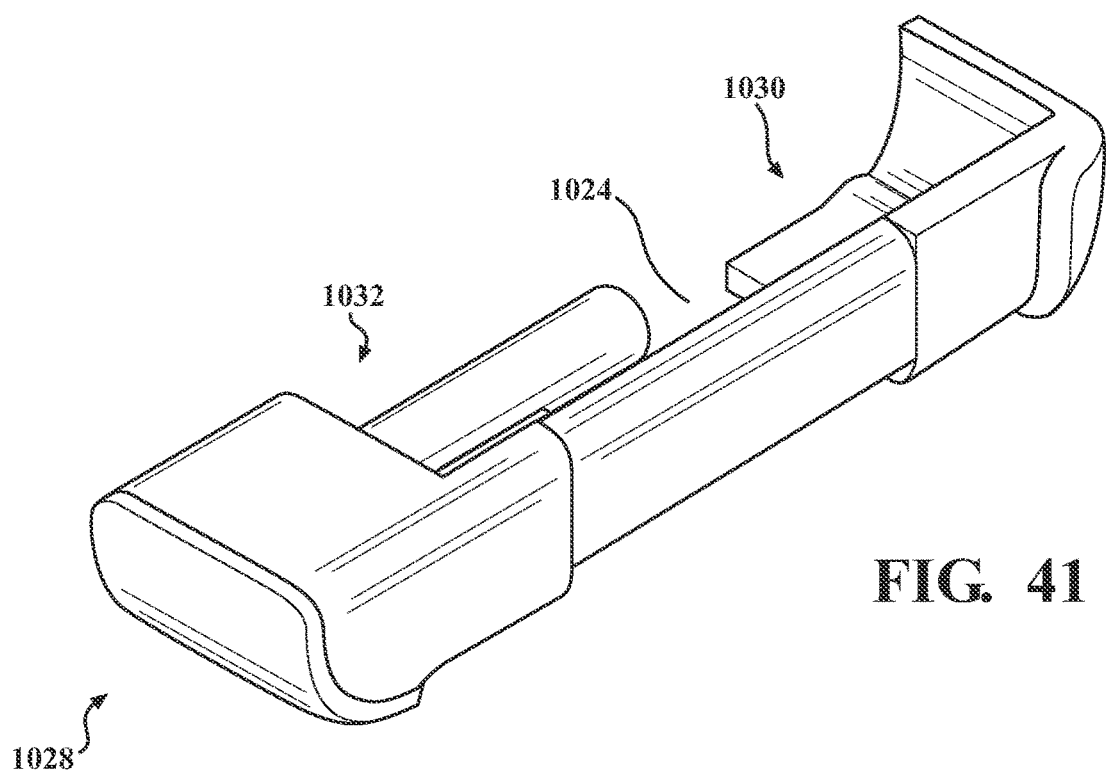
FIG. 41 is a top, perspective view of the latching mechanism seen in FIG. 40 upon assembly.

Although shown as being unitarily (e.g., monolithically) formed in FIGS. 26 and 37-39B (for example), in alternate embodiments of the disclosure, it is envisioned that the latching mechanism 912 may include a multi-piece construction. For example, FIG. 40 provides a top, perspective view of an alternate embodiment of the latching mechanism, which is identified by the reference character 1028 shown with parts separated, and FIG. 41 provides a top, perspective view of the latching mechanism 1028 upon assembly. The latching mechanism 1028 includes respective first and second body portions 1030, 1032 that are configured for releasable connection (e.g., in a snap-fit arrangement). The first body portion 1030 includes the aforedescribed stop 1022 and defines a receiving space 1034 that is configured to receive the second body portion 1032. The second body portion 1032 includes the aforedescribed locking pin 1020 and is positionable within the receiving space 1034 defined by the first body portion 1030 such that the aforedescribed gap 1024 is defined between the locking pin 1020 and the stop 1022 to support functionality in the manner discussed above. To facilitate connection of the respective first and second body portions 1030, 1032, it is envisioned that the second body portion 1032 may include an undercut (or other such recess or opening) that is configured to receive the first body portion 1030. In the illustrated embodiment, the aforementioned visual indicator 1026 is included on the second body portion 1032, which may include coloration or texturing that differs from that of the first body portion 1030.

Figure 42:
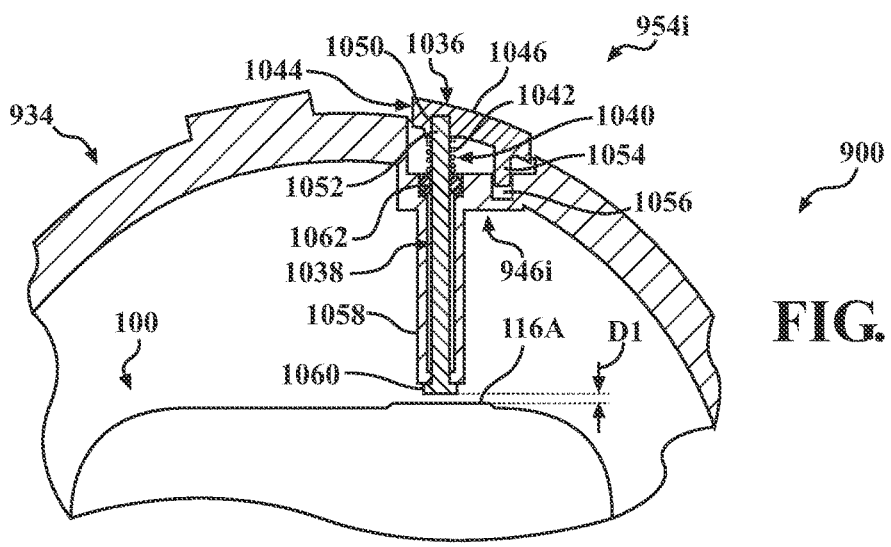
FIG. 42 is a partial, cross-sectional view of a (first) actuation mechanism of the underwater system seen in FIG. 26 used to operate a first button on the DICD shown prior to closure of the underwater system and in an inactive position.
Figure 43:
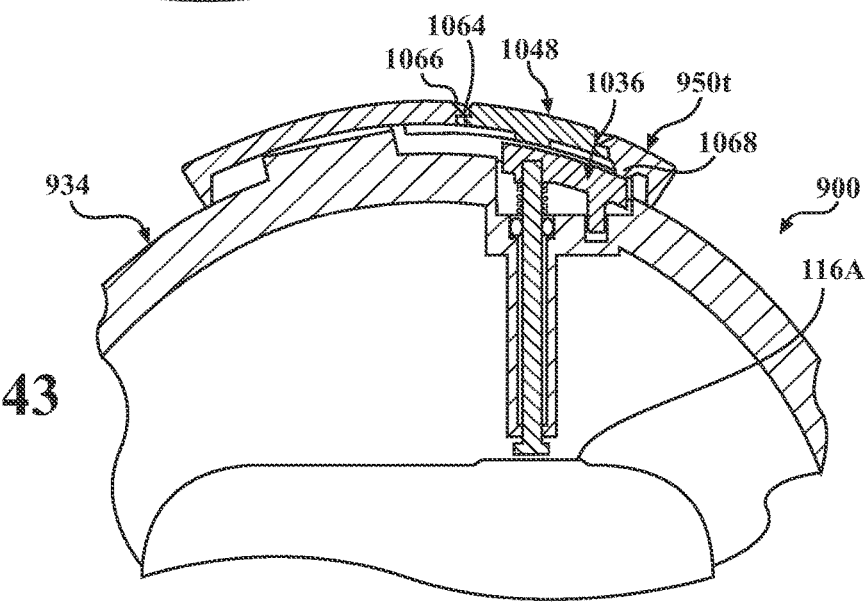
FIG. 43 is a cross-sectional view of the actuation mechanism seen in FIG. 42 upon closure of the underwater system seen in FIG. 26 and shown in an intermediate (pre-loaded) position.
Figure 44:
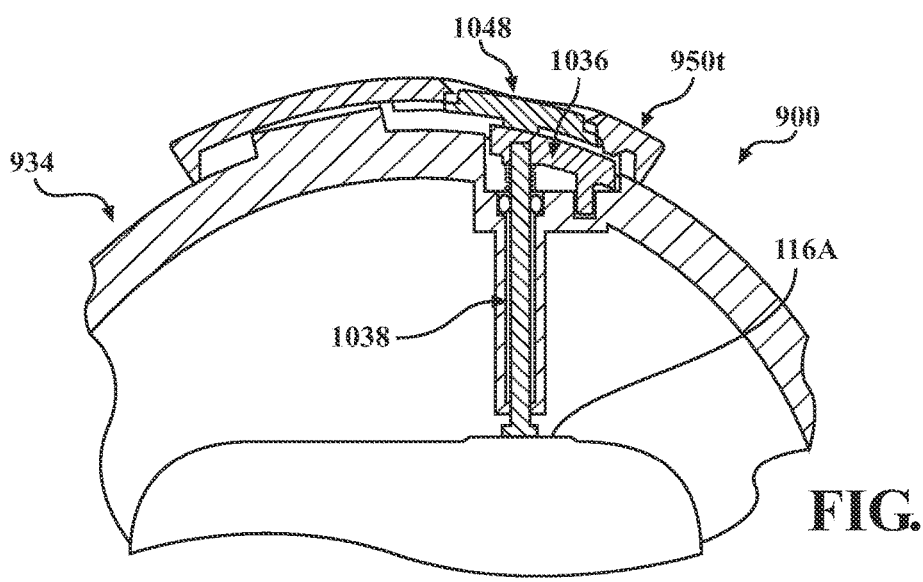
FIG. 44 is a cross-sectional view of the actuation mechanism seen in FIG. 42 upon closure of the underwater system seen in FIG. 26 and shown in an active position.
Figure 45:
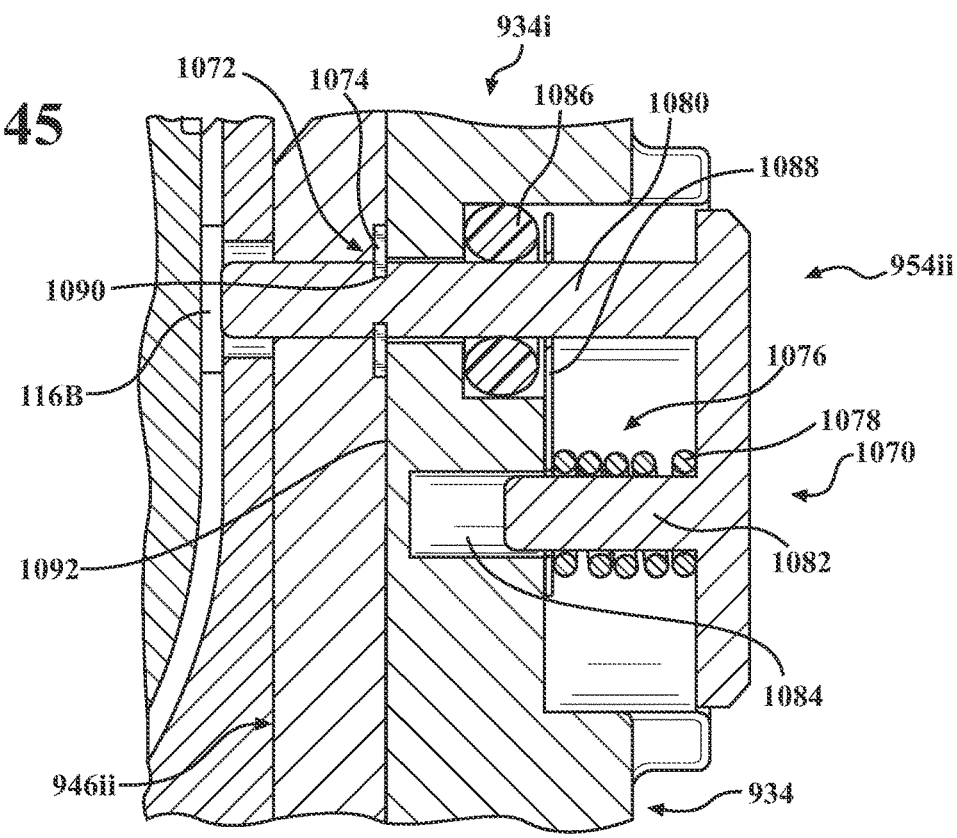
FIG. 45 is a cross-sectional view of a (second) actuation mechanism of the underwater system seen in FIG. 26 used to operate a second button on the DICD shown in an inactive position.

With reference now to FIGS. 42-45, use and operation of the actuation mechanisms 954i, 954ii in connection with operation of the shutter button 116A and the mode button 116B on the DICD 100. More specifically, FIG. 42 provides a (vertical) cross-sectional view of the actuation mechanism 954*i* prior to closure of the underwater system 900 and shown in an inactive position; FIG. 43 provides a (vertical) cross-sectional view of the actuation mechanism 954*i* upon closure of the underwater system 900 and shown in an intermediate (pre-loaded) position; FIG. 44 provides a (vertical) cross-sectional view of the actuation mechanism 954*i* upon closure of the underwater system 900 and shown in an active position; and FIG. 45 provides a (vertical) cross-sectional view of the actuation mechanism 954*ii* shown in an inactive position.

As mentioned above, the actuation mechanism 954*i* is accommodated within the receptacle 946*i* of the front support band 934. The actuation mechanism 954*i* includes an actuator 1036; a post 1038 that is operatively connected to the actuator 1036 (e.g., via a threaded connection); and a biasing member 1040 (e.g., a spring 1042).

The actuator 1036 includes a body portion 1044 defining outer (bearing) surface 1046 that is configured for engagement (contact) with a depressible actuation button 1048 included in the top latch 950*t*. The body portion 1044 includes a threaded aperture 1050 that is configured to receive a threaded end 1052 of the post 1038 to secure the post 1038 to the actuator 1036 such that linear (e.g., vertical) movement of the actuator 1036 causes corresponding linear (e.g., vertical) movement of the post 1038. To stabilize the actuator 1036 relative to the front support band 934, in certain embodiments, such as that shown throughout the figures, the actuator 1036 may include a leg 1054 that is configured for receipt within a corresponding opening 1056 defined in the receptacle 946*i* to reduce (if not entirely eliminate) undesirable movement (e.g., rocking, wobbling, etc.) of the actuator 1036.

The post 1038 is received within a channel 1058 defined by the receptacle 946*i* and is elongate (e.g., generally tubular) in configuration. The post 1038 includes a foot 1060 that is positioned opposite to the threaded end 1052 of the post 1038. The foot 1060 defines a transverse cross-sectional dimension (e.g., a width) greater than that defined by an end of the channel 1058 to prevent inadvertent removal (withdrawal) of the post 1038 from the channel 1058. To guard against water intrusion, in certain embodiments, such as that seen in FIGS. 42-44, the actuation mechanism 954*i* may include a sealing member 1062 (e.g., a washer, an O-ring, etc.) that is positioned about the post 1038 to inhibit (if not entirely prevent) the entry of water into the underwater system 900 through the actuation mechanism 954*i* and the receptacle 946*i* (e.g., via the channel 1058).

When the underwater system 900 is in the open position, the actuation mechanism 954*i* is in the inactive (extended) position (FIG. 42), in which, the post 1038 is spaced axially from the shutter button 116A by a distance D1, which provides sufficient clearance for insertion of the DICD 100 into the underwater system 900 and positioning of the shutter button 116A beneath the post 1038. Subsequent to closure of the underwater system 900, upon depression of the actuation button 1048 in the top latch 950*t*, the actuation mechanism 954*i* is moved from the inactive position into the active (depressed) position (FIG. 44), during which, the post 1038 is brought into engagement (contact) with the shutter button 116A via (vertical) depression of the actuator 1036 to operate the shutter button 116A. The biasing member 1040 is positioned about the post 1038 within the receptacle 946*i* so as to bias the actuation mechanism 954*i* towards the inactive position. Upon the application of sufficient force to the actuation button 1048, the bias applied by the biasing member 1040 is overcome and the actuation mechanism 954*i* is moved into the active position. Upon release of the actuation button 1048, the biasing member 1040 returns the actuation mechanism 954*i* to the inactive position via outward (vertical) movement of the actuator 1036, which is limited via contact between the foot 1060 and the end of the channel 1058 and via contact between the actuator 1036 and the actuation button 1048. To restrict outward (vertical) movement of the actuation button 1048 and resist force applied by the biasing member 1040, in certain embodiments, the actuation button 1048 may define a flange 1064 (FIG. 43) that is received beneath a shoulder 1066 defined by the top latch 950*t*.

As seen in FIGS. 43 and 44, in certain embodiment, the top latch 950*t* may include a detent 1068 (FIG. 43) that extends inwardly towards the actuator 1036. The detent 1068 is configured for engagement (contact) with the actuator 1036 during closure of the top latch 950*t* so as to pre-load the actuation mechanism 954*i* via movement to an intermediate (partially depressed) position, seen in FIG. 43, between the inactive position (FIG. 42) and the active position (FIG. 44). More specifically, as the top latch 950*t* is closed, the detent 1068 is brought into engagement (contact) with the bearing surface 1046 of the actuator 1036 to partially depress the actuator 1036 and, thus, the post 1038, to reduce the distance D1. By pre-loading the actuation mechanism 954*i*, the overall amount of travel required to actuate the shutter button 116A can be reduced. In such embodiments, the actuation mechanism 954*i* is thus movable between three discrete positions: the inactive position (FIG. 42); the intermediate (pre-loaded) position (FIG. 43); and the active position (FIG. 44).

With reference now to FIG. 45, the actuation mechanism 954*ii* will be discussed, which, as indicated above, is accommodated within the receptacle 946*ii* of the front support band 934*i*. The actuation mechanism 954*ii* includes an actuator 1070; a retainer 1072 (e.g., an E-clip 1074); and a biasing member 1076 (e.g., a spring 1078).

The actuator 1070 includes a first leg 1080 that is configured for engagement (contact) with the mode button 116B such that linear (e.g., horizontal) movement of the actuator 1070 causes corresponding linear (e.g., horizontal) movement of the mode button 116B. As seen in FIG. 45, in certain embodiments, the first leg 1080 may be eccentrically positioned, which allows the actuation mechanism 954*ii* to be (vertically) offset from the mode button 116B so as to increase clearance with the side latch 950*si* (FIG. 26). In such embodiments, to stabilize the actuator 1070 relative to the front support band 934, the actuator 1070 may further include a second leg 1082 that is configured for receipt within a corresponding opening 1084 defined in the receptacle 946*ii* to reduce (if not entirely eliminate) undesirable movement (e.g., rocking, wobbling, etc.) of the actuator 1070.

To guard against water intrusion, in certain embodiments, such as that seen in FIG. 45, the actuation mechanism 954*ii* may include a sealing member 1086 (e.g., a washer, an O-ring, etc.) that is positioned about the first leg 1080 to inhibit (if not entirely prevent) the entry of water into the underwater system 900 through the actuation mechanism 954*ii*. To maintain assembly and positioning of the sealing member 1086, it is envisioned that the sealing member 1086 may be retained in place by a cap 1088 that is secured with the receptacle 946*ii*.

The retainer 1072 is fixedly connected to the first leg 1080 of the actuator 1070 such that movement of the actuator 1070 causes corresponding movement of the retainer 1072. For example, in the illustrated embodiment, the retainer 1072 is received within a corresponding (annular) channel 1090 formed in the first leg 1080. The retainer 1072 extends outwardly from the first leg 1080 and is configured for engagement with a stop 1092 defined by the receptacle 946*ii* so as to limit outward linear (e.g., horizontal) travel of the actuator 1070 away from the DICD 100 to thereby maintain assembly of the actuation mechanism 954*ii* within the receptacle 946*ii* and limit the range of motion of the actuation mechanism 954*ii*, as described in further detail below.

The actuation mechanism 954*ii* is movable between an inactive (extended) position (FIG. 45) and an active (depressed) position via the application of force to the actuator 1070 through the receptacle 946*ii*. In the inactive position, the first leg 1080 is spaced axially from the mode button 116B, which provides sufficient clearance for insertion of the DICD 100 into the underwater system 900 and positioning of the mode button 116B inwardly of the first leg 1080. In the active position, the first leg 1080 is brought into engagement (contact) with the mode button 116B to control operation thereof by depression of the actuator 1070. As seen in FIG. 45, the biasing member 1076 is positioned in engagement (contact) with the receptacle 946*ii* so as to bias the actuation mechanism 954*ii* towards the inactive position. More specifically, in the illustrated embodiment, the biasing member 1076 is positioned about the second leg 1082. Upon the application of sufficient force to the actuator 1070, the biasing force applied by the biasing member 1076 is overcome and the actuation mechanism 954*ii* is moved into the active position, whereby the retainer 1072 is moved inwardly and separated from the stop 1092. Upon release of the actuator 1070, the biasing member 1076 returns the actuation mechanism 954*ii* to the inactive position via outward movement of the actuator 1070, which is limited via contact between the retainer 1072 and the stop 1092.

Figure 46:
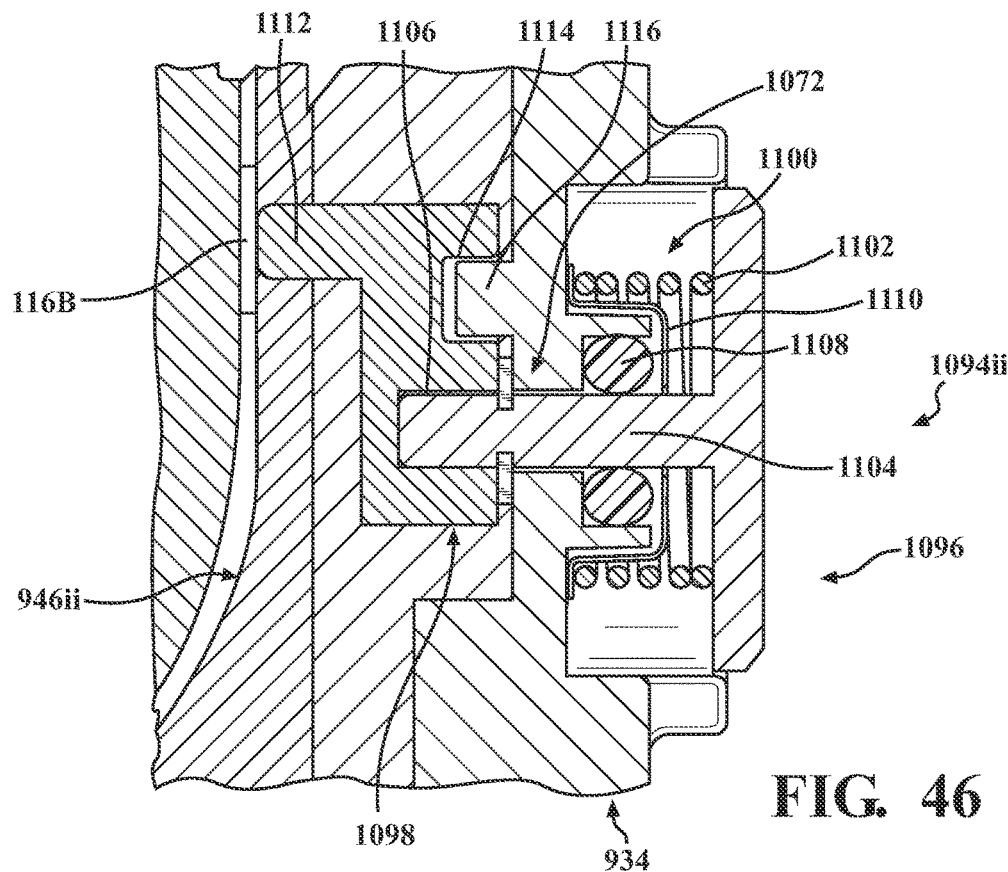
FIG. 46 is a cross-sectional view of an alternate embodiment of the (second) actuation mechanism seen in FIG. 45.

FIG. 46 illustrates an alternate embodiment of the actuation mechanism 954*ii*, which is identified by the reference character 1094*ii*. The actuation mechanism 1094*ii* is substantially similar to the actuation mechanism 954*ii* and, accordingly, will only be discussed with respect to any differences therefrom in the interest of brevity. The actuation mechanism 1094*ii* includes an actuator 1096; a trigger 1098 that is operatively connected to the actuator 1096, the aforedescribed retainer 1072; and a biasing member 1100 (e.g., a spring 1102).

The actuator 1096 includes a leg 1104 that extends into (and is secured within) an opening 1106 defined by the trigger 1098 so as to operatively connect the actuator 1096 and the trigger 1098 such that such that linear (e.g., horizontal) movement of the actuator 1096 causes corresponding linear (e.g., horizontal) movement of the trigger 1098 and, thus, the mode button 116B. It is envisioned that the actuator 1096 and the trigger 1098 may be connected in any manner suitable for the intended purpose of facilitating such corresponding movement. For example, it is envisioned that the leg 1104 may be received by the opening 1106 in the trigger 1098 in an interference fit, that the leg 1104 may me adhesively and/or mechanically connected to the trigger 1098 (e.g., via a set screw or other such fastener), or that the actuator 1096 and the trigger 1098 may be unitarily (e.g., monolithically) formed. As seen in FIG. 46, the leg 1104 is centrally positioned within the receptacle 946*ii*, but is (vertically) offset from the mode button 116B. The leg 1104 supports the retainer 1072 such that movement of the actuator 1096 causes corresponding movement of the retainer 1072, as discussed in connection with the aforedescribed actuation mechanism 954*ii*.

To guard against water intrusion, in certain embodiments, such as that seen in FIG. 46, the actuation mechanism 1094*ii* may include a sealing member 1108 (e.g., a washer, an O-ring, etc.) that is positioned about the leg 1104 of the actuator 1096 to inhibit (if not entirely prevent) the entry of water into the underwater system 900 through the actuation mechanism 1094*ii*. To maintain assembly and positioning of the sealing member 1108, it is envisioned that the sealing member 1108 may be retained in place by a cap 1110 that is secured with the receptacle 946*ii*.

The leg 1112 of the trigger 1098 is offset from (eccentrically positioned relative to) both the opening 1106 and the receptacle 946*ii*, which allows the actuation mechanism 1094*ii* to be (vertically) offset from the mode button 116B so as to increase clearance with the side latch 950*si* (FIG. 26). In certain embodiments, such as that seen in FIG. 46, for example, to stabilize the trigger 1098 relative to the front support band 934, the trigger 1098 may define a recess 1114 that is configured to receive a corresponding detent 1116 defined by the front support band 934 within the receptacle 946*ii*. Reception of the detent 1116 by the recess 1114 reduces (if not entirely eliminates) undesirable movement (e.g., rocking, wobbling, etc.) of the trigger 1098.

The actuation mechanism 1094*ii* is movable between an inactive (extended) position (FIG. 46) and an active (depressed) position via the application of force to the actuator 1096. In the inactive position, the leg 1112 of the trigger 1098 is spaced axially from the mode button 116B, which provides sufficient clearance for insertion of the DICD 100 into the underwater system 900 and positioning of the mode button 116B inwardly of the trigger 1098. In the active position, the leg 1112 of the trigger 1098 is brought into engagement (contact) with the mode button 116B to control operation thereof by depression of the actuator 1096. As seen in FIG. 46, the biasing member 1100 is positioned in engagement (contact) with the receptacle 946*ii* so as to bias the actuation mechanism 1094*ii* towards the inactive position. More specifically, in the illustrated embodiment, the biasing member 1100 is positioned about the leg 1104 of the actuator 1096.

Figure 47:
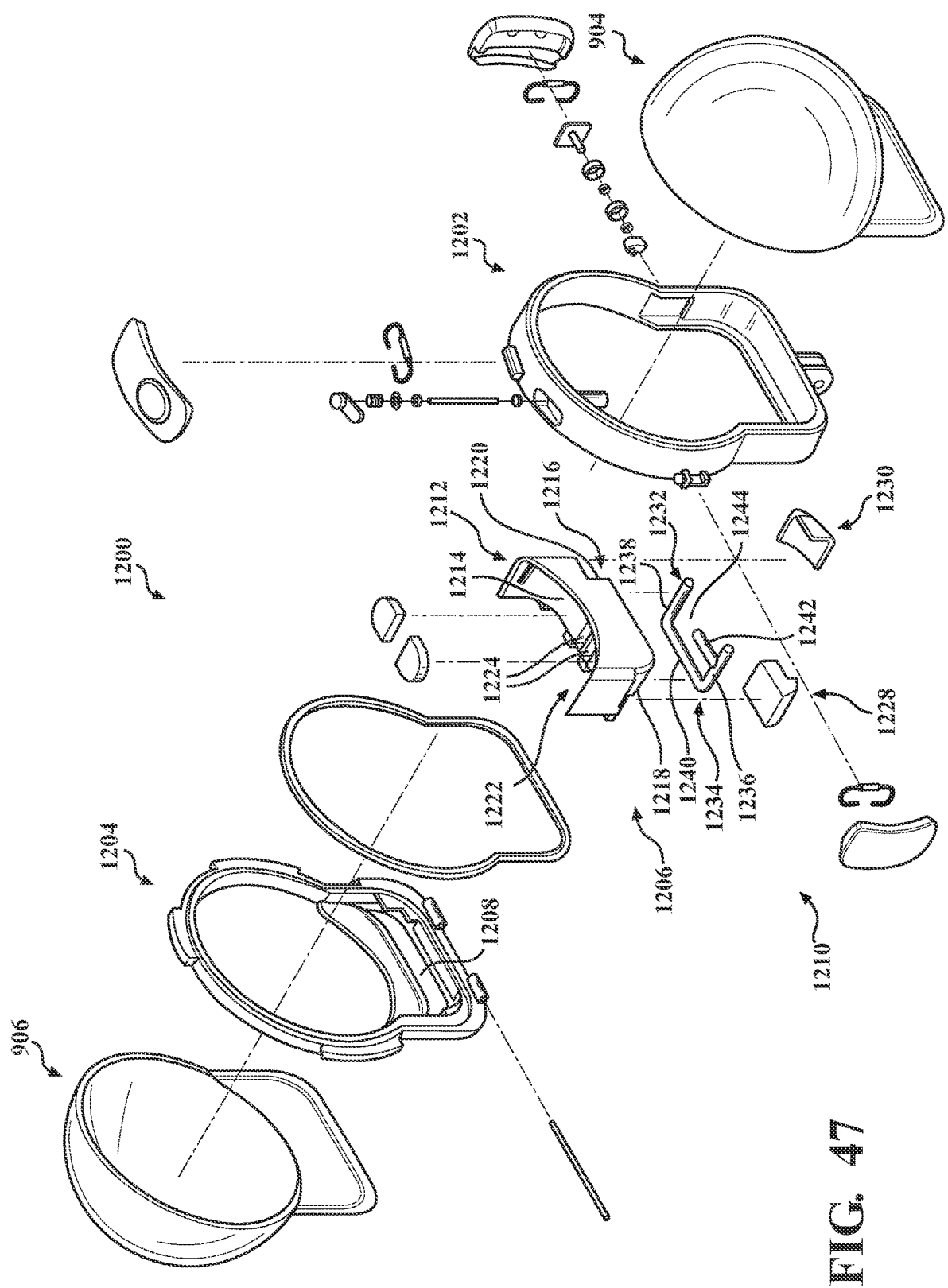
FIG. 47 is an exploded, perspective view of another embodiment of the underwater system.
Figure 48:
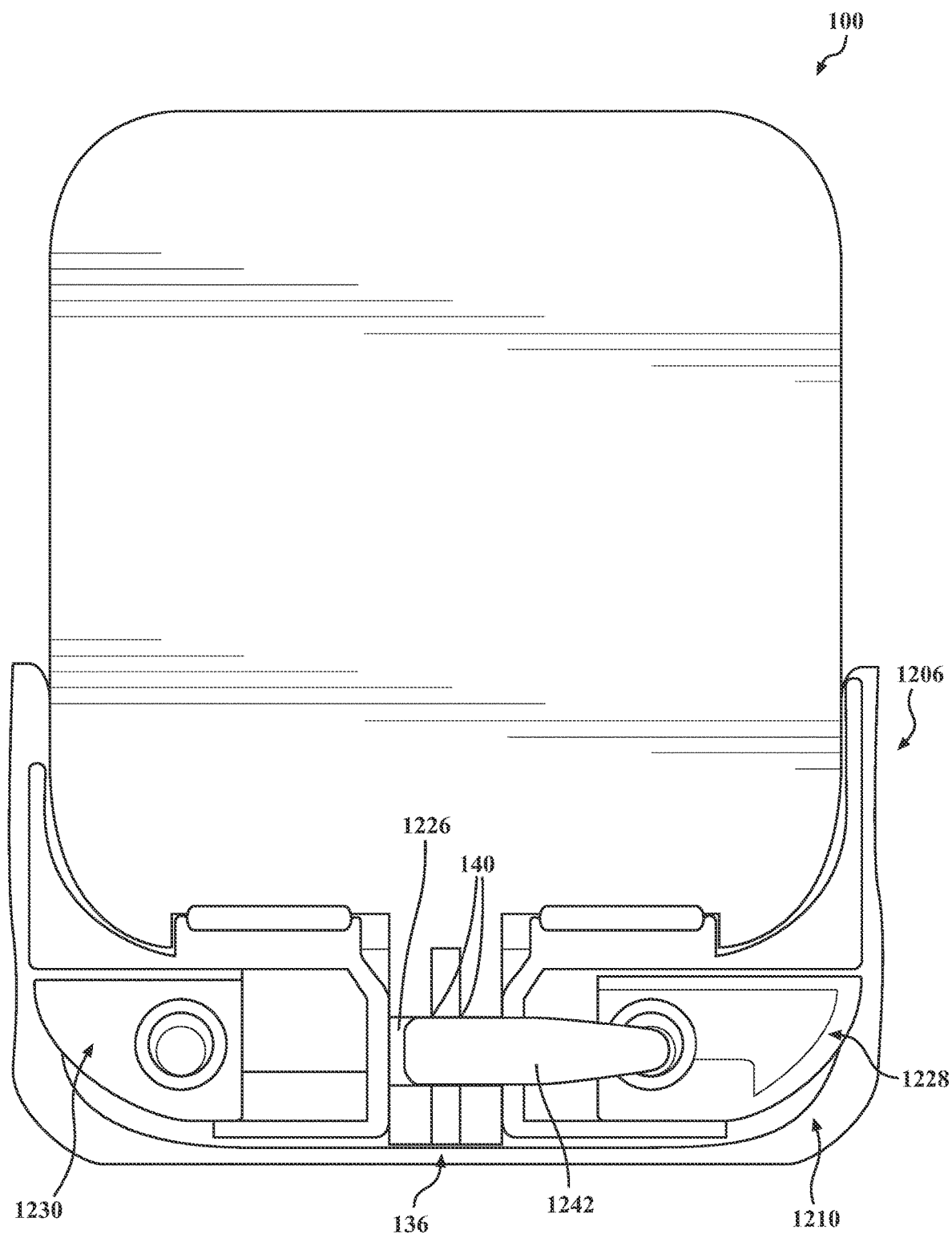
FIG. 48 is a partial, cross-sectional view of the underwater system seen in FIG. 47 shown with a DICD.

Referring now to FIGS. 47 and 48, an alternate embodiment of the underwater system will be described, which is identified by the reference character 1200. More specifically, FIG. 47 provides an exploded, perspective view of the underwater system 1200 and FIG. 48 provides a partial, (vertical) cross-sectional view of the underwater system 1200 shown with the DICD 100. The underwater system 1200 is substantially similar to the aforedescribed underwater system 900 and, accordingly, will only be discussed with respect to any differences therefrom in the interest of brevity. Throughout the discussion that follows, reference will again be made to the DICD 100. It should be appreciated, however, that the underwater system 1200 may be utilized and adapted for use with any suitable DICD.

The underwater system 1200 includes a front support band 1202 that is connected to the housing portion 904; a rear support band 1204 that is connected to the housing portion 906; a cradle 1206 that is received within a cavity 1208 defined by the rear support band 1204; and a latching mechanism 1210. Throughout the discussion that follows, reference will again be made to the DICD 100. It should be appreciated, however, that the underwater system 1200 may be utilized and adapted for use with any suitable DICD.

The cradle 1206 includes an upper body portion 1212 defining a seat 1214 for the DICD 100 and a lower body portion 1216 defining a pair of lateral cutouts 1218, 1220 that are configured to accommodate lateral (sliding) movement of the latching mechanism 1210. The cradle 1206 defines one or more opening(s) 1222 (e.g., slots 1224) that are configured to receive the engagement structure 136 on the DICD 100 as well as one or more (transverse) apertures 1226 that extend in generally orthogonal relation to the openings 1222. As discussed in connection with the underwater system 900, the aperture(s) 1226 are configured to receive and accommodate movement of the latching mechanism 1210 during locking and unlocking thereof.

The latching mechanism 1210 includes a pair of opposing lateral members 1228, 1230 that are configured for reception (and movement) within the cutouts 1218, 1220 defined by the lower body portion 1216 of the cradle 1206, respectively, as well as a locking member 1232 that extends between the lateral members 1228, 1230. In the illustrated embodiment, the lateral members 1228, 1230 and the locking member 1232 are illustrated as discrete structures. It should be appreciated, however, that the latching mechanism 1210 may be unitarily (e.g., monolithically) formed in alternate embodiments of the disclosure such that the lateral members 1228, 1230 and the locking member 1232 are integrally connected.

The locking member 1232 includes a body 1234 with pair of struts 1236, 1238 that are connected by a transverse crossbar 1240 that extends between the struts 1236, 1238 from end portions thereof such that the body 1234 includes a generally U-shaped configuration. The locking member 1232 further includes a locking pin 1242 that extends from the strut 1236 towards the strut 1238 in generally parallel relation to the crossbar 1240. The struts 1236, 1238, the crossbar 1240, and the locking pin 1242 are unitarily (e.g., monolithically) formed and may be manufactured using any suitable method. Embodiments in which one or more of the struts 1236, 1238, the crossbar 1240, and the locking pin 1242 are formed as separate, discrete components, however, would not be beyond the scope of the present disclosure.

The locking pin 1242 is configured for insertion into and removal from the aperture(s) 1226 in the cradle 1206 and the apertures 140 (FIG. 48) formed in the engagement structure 136 on the DICD 100 during movement of the locking member 1232 between locked and unlocked positions to thereby securely connect the DICD 100 to the cradle 1206 and, thus, the underwater system 1200. The locking pin 1242 defines a gap 1244 with the strut 1238 that is configured in correspondence with the engagement structure 136 on the DICD 100 to allow for separation of the DICD 100 from the locking member 1232 and the cradle 1206 when the locking member 1232 is in the unlocked position.

Figure 49:
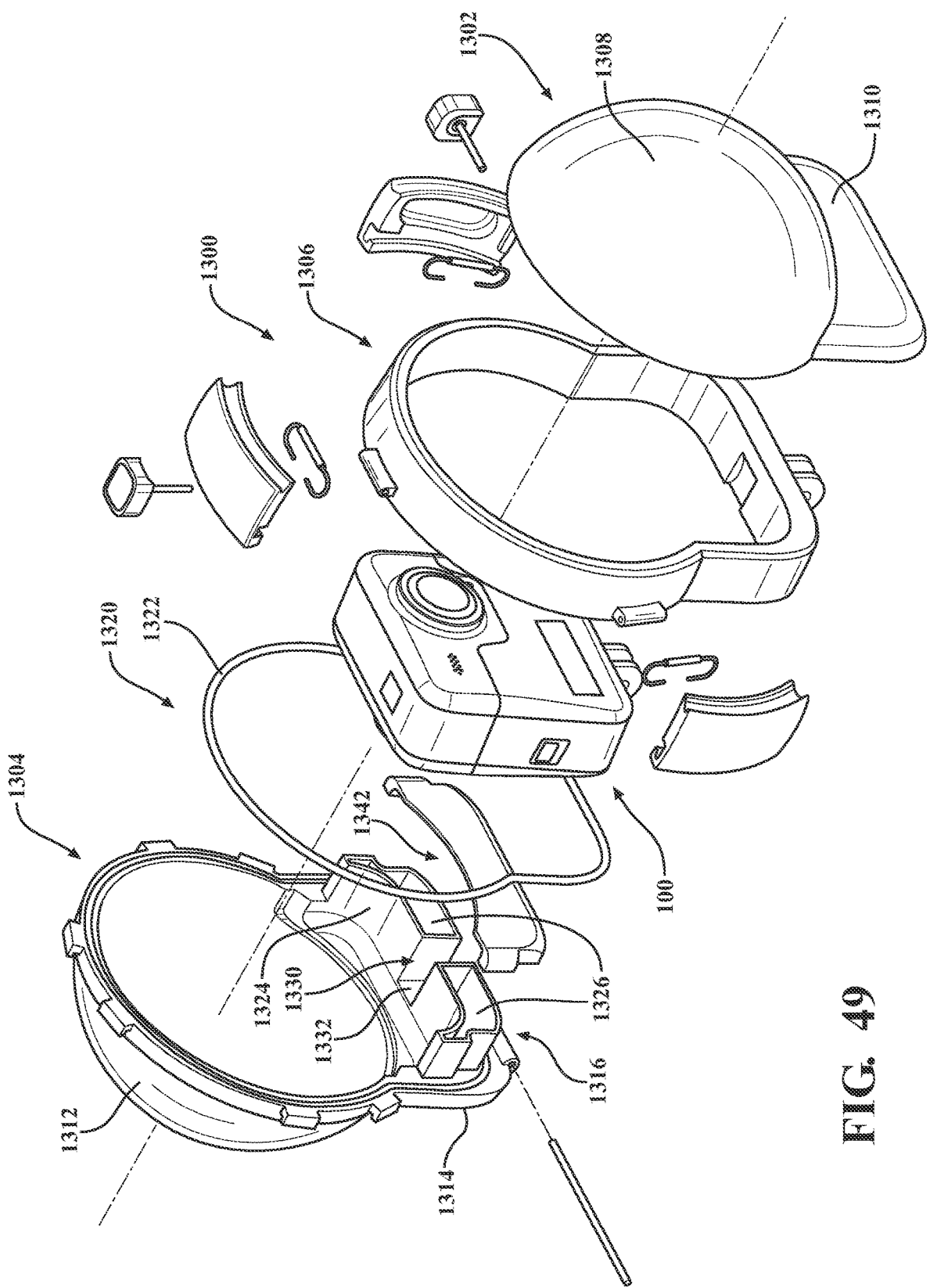
FIG. 49 is an exploded, perspective view of another embodiment of the underwater system.
Figure 50:
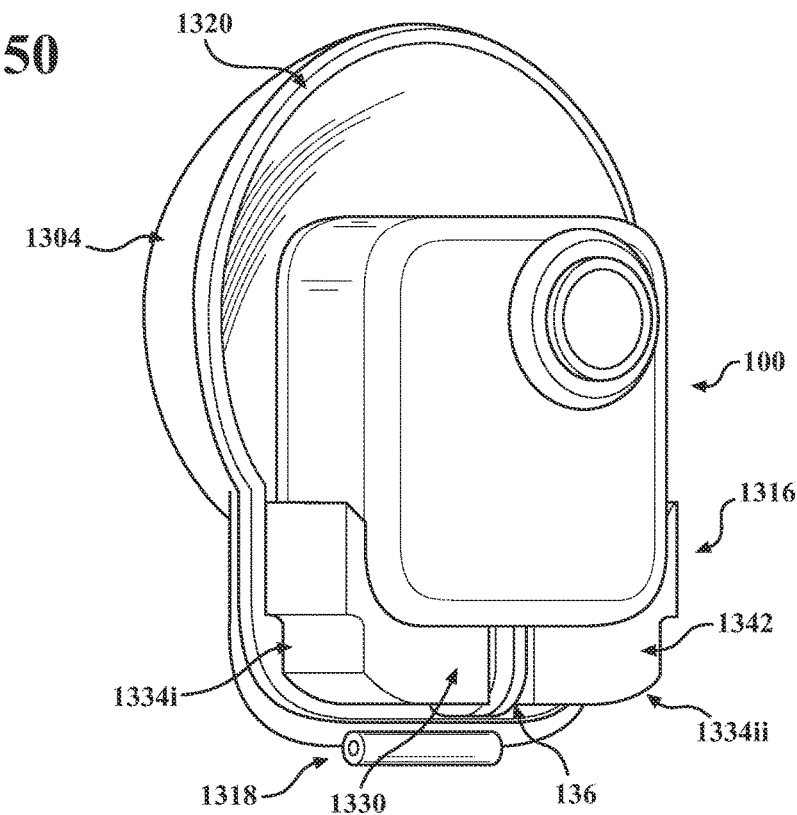
FIG. 50 is a rear, perspective view of a rear housing portion of the underwater system seen in FIG. 49 shown with a DICD.

Referring now to FIGS. 49 and 50, an alternate embodiment of the underwater system will be described, which is identified by the reference character 1300. More specifically, FIG. 49 provides an exploded, perspective view of the underwater system 1300 and FIG. 50 provides a partial, rear perspective view of the underwater system 1300 shown with the DICD 100. The underwater system 1300 is substantially similar to the aforedescribed underwater systems 900, 1200 and, accordingly, will only be discussed with respect to any differences therefrom in the interest of brevity. Throughout the discussion that follows, reference will again be made to the DICD 100. It should be appreciated, however, that the underwater system 1300 may be utilized and adapted for use with any suitable DICD.

The underwater system 1300 includes respective front and rear housing portions 1302, 1304 and a center support band 1306 that is connected to the housing portions 1302, 1304. In contrast to the underwater system 900, the housing portions 1302, 1304 include dissimilar configurations. More specifically, the front housing portion 1302 includes a dome 1308 and a generally planar extension 1310 that extends from the dome 1308 and the rear housing portion 1304 includes a dome 1312; a generally planar extension 1314 that extends from the dome 1312; and a cradle 1316.

The housing portions 1302, 1304 are pivotably connected via a hinge mechanism 1318 in a clamshell-style arrangement such that the housing portions 1302, 1304 are relatively moveable (pivotable) during opening and closure of the underwater system 1300. Whereas the front housing portion 1302 is fixedly connected to the support band 1306, the rear housing portion 1304 is movable relative to the support band 1306 via the hinge mechanism 1318. To reduce (if not entirely prevent) the entry of water and potential leakage paths during underwater use, the underwater system 1300 includes one or more sealing members 1320 (e.g., gaskets 1322) that are positioned between, and configured in correspondence with, the rear housing portion 1304 and the support band 1306.

The cradle 1316 is formed integrally (e.g., monolithically) with the rear housing portion 1304 adjacent to the planar extension 1314 and defines a seat 1324 that is configured to accommodate the DICD 100. The cradle 1316 defines one or more internal chambers (cavities) 1326 arranged below the seat 1324 that are configured to receive a locking mechanism 1328 (FIG. 51), which is described below, as well as one or more opening(s) 1330 (e.g., slots 1332) that are configured to receive the corresponding engagement structure 136 on the DICD 100.

Figure 51:
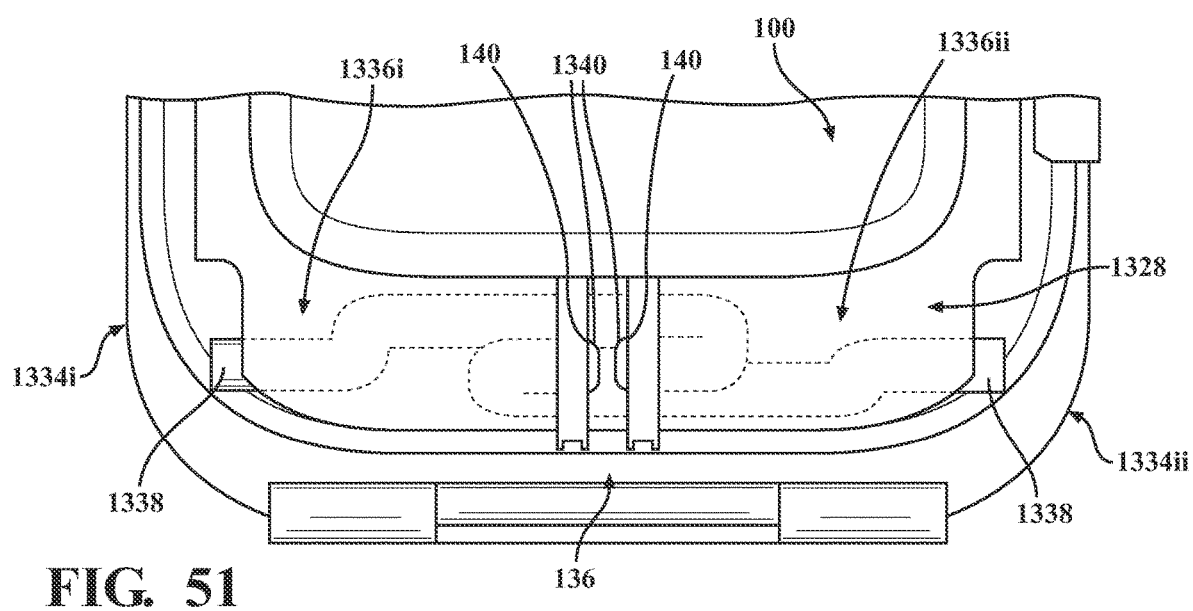
FIG. 51 is a partial, plan view of the rear housing portion of the underwater system seen in FIG. 49.
Figure 52:
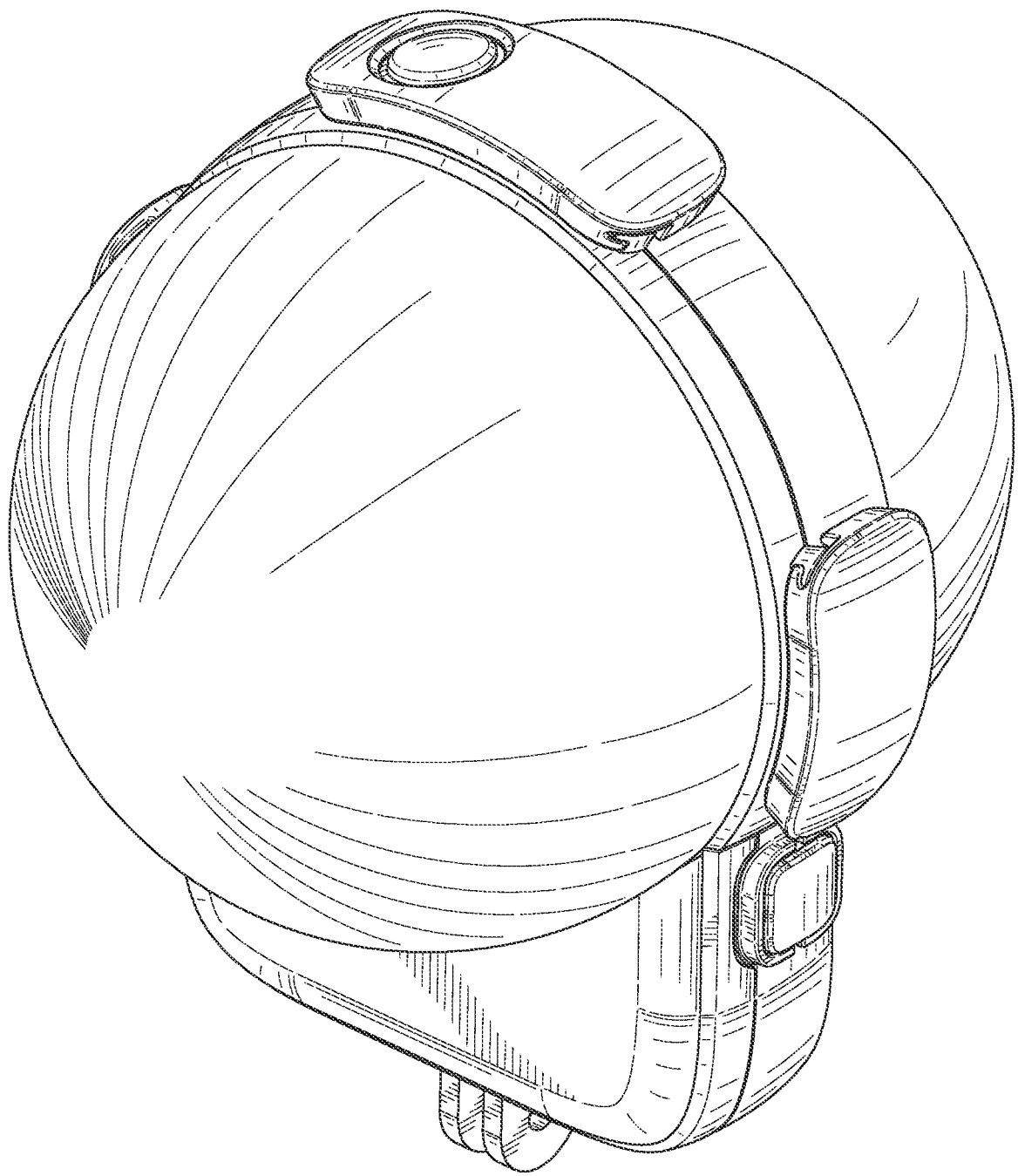
FIGS. 52-58 and 59-65 disclose two embodiments of the underwater systems, or camera housings, described herein.
Figure 53:
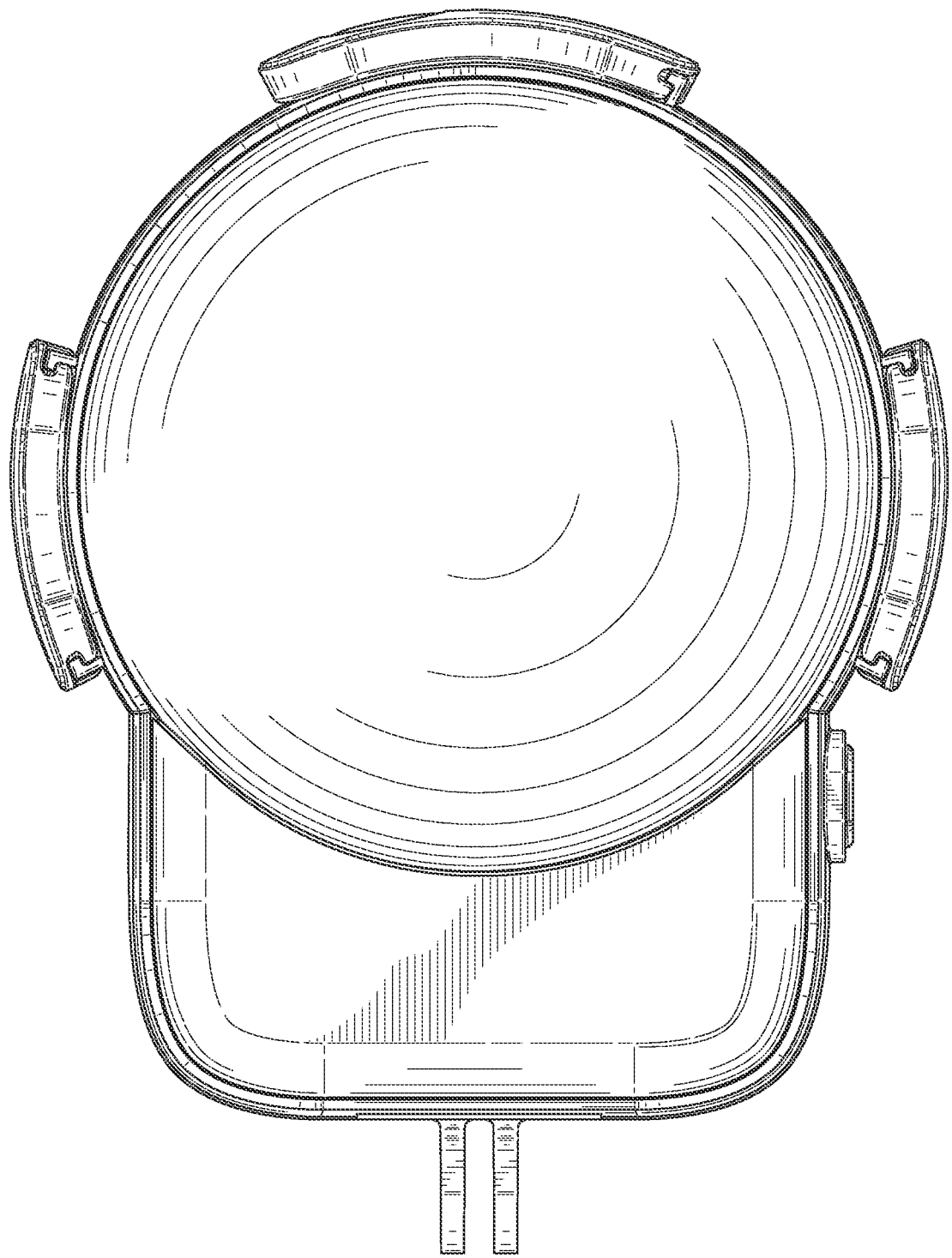
Figure 54:
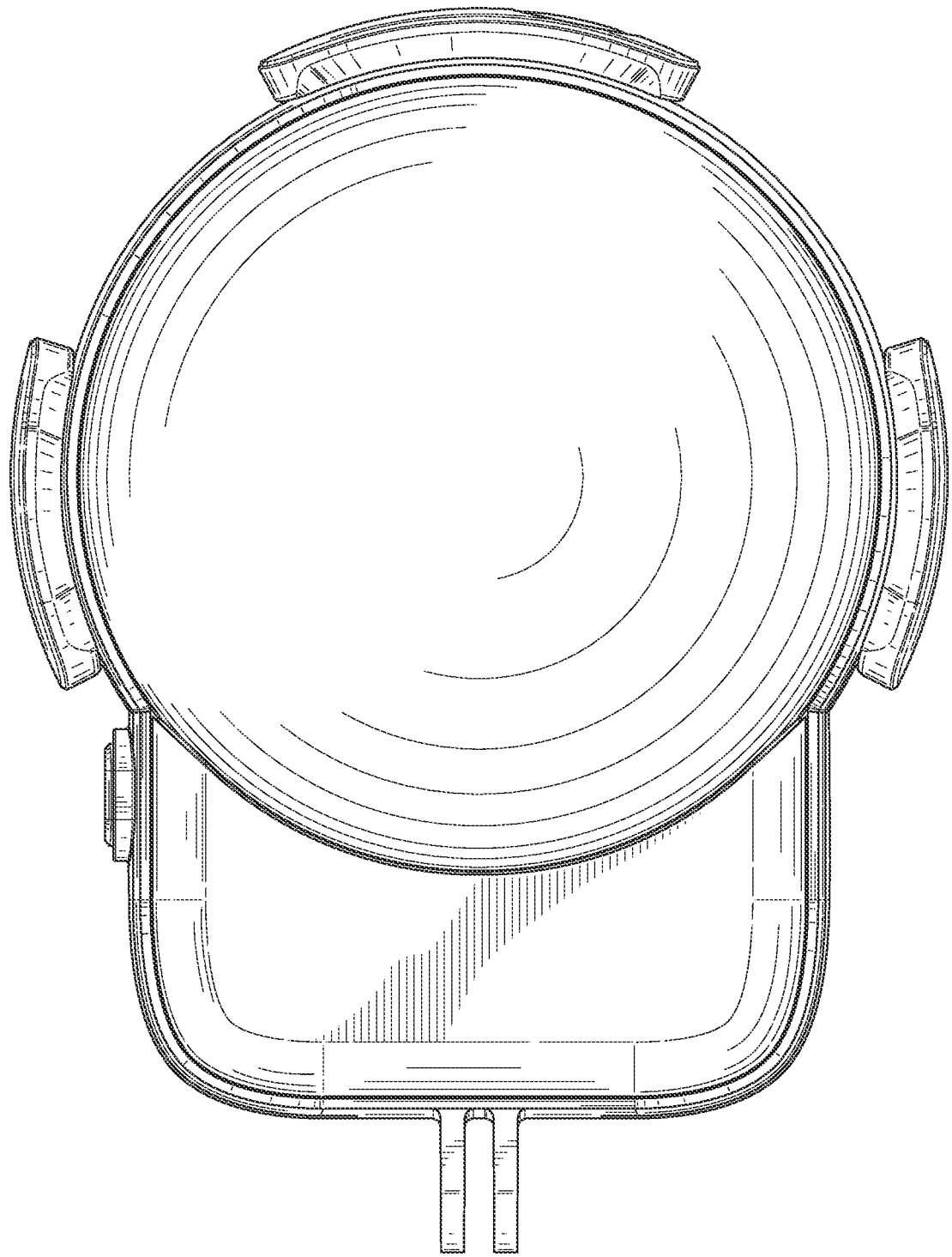
Figure 55:
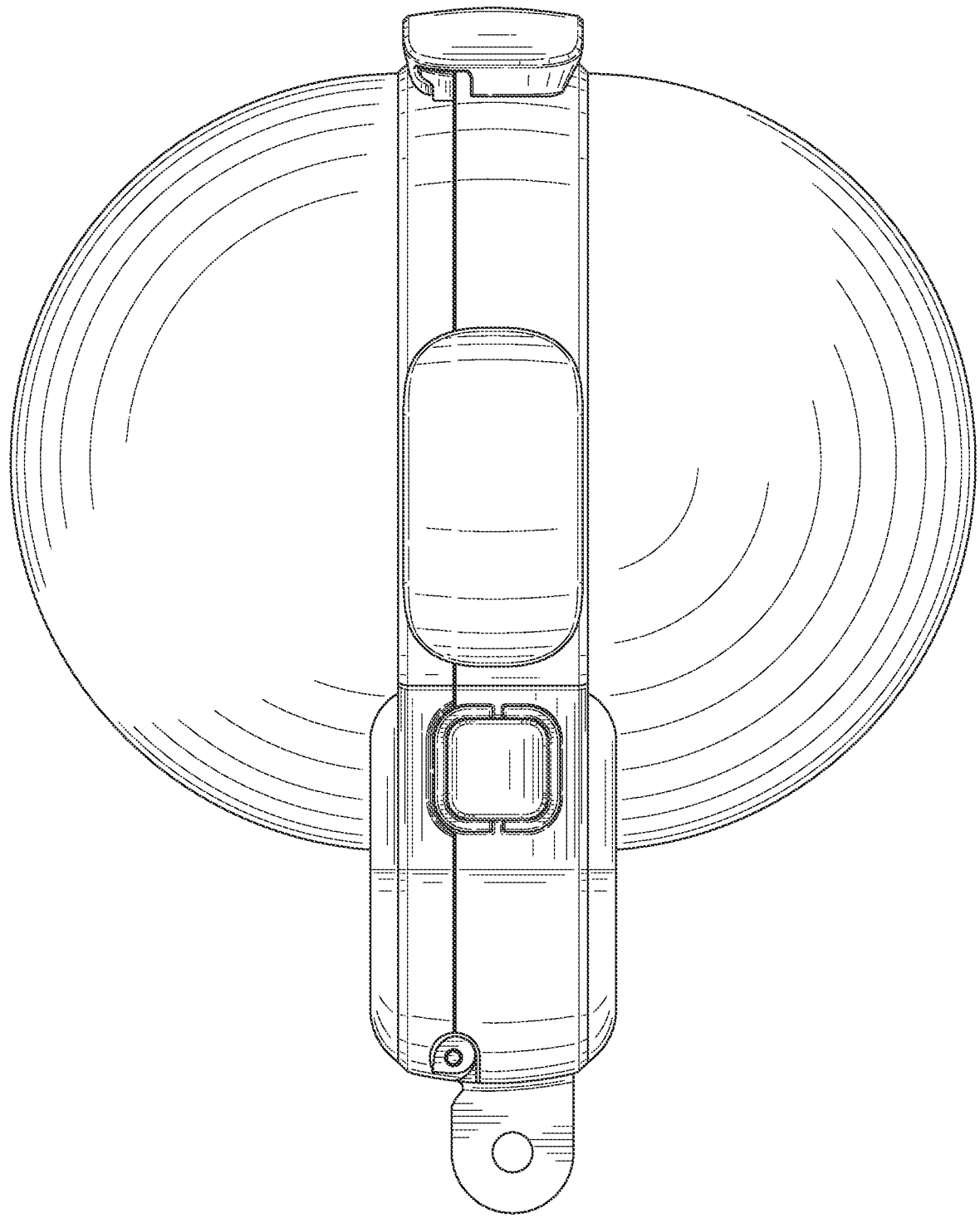
Figure 56:
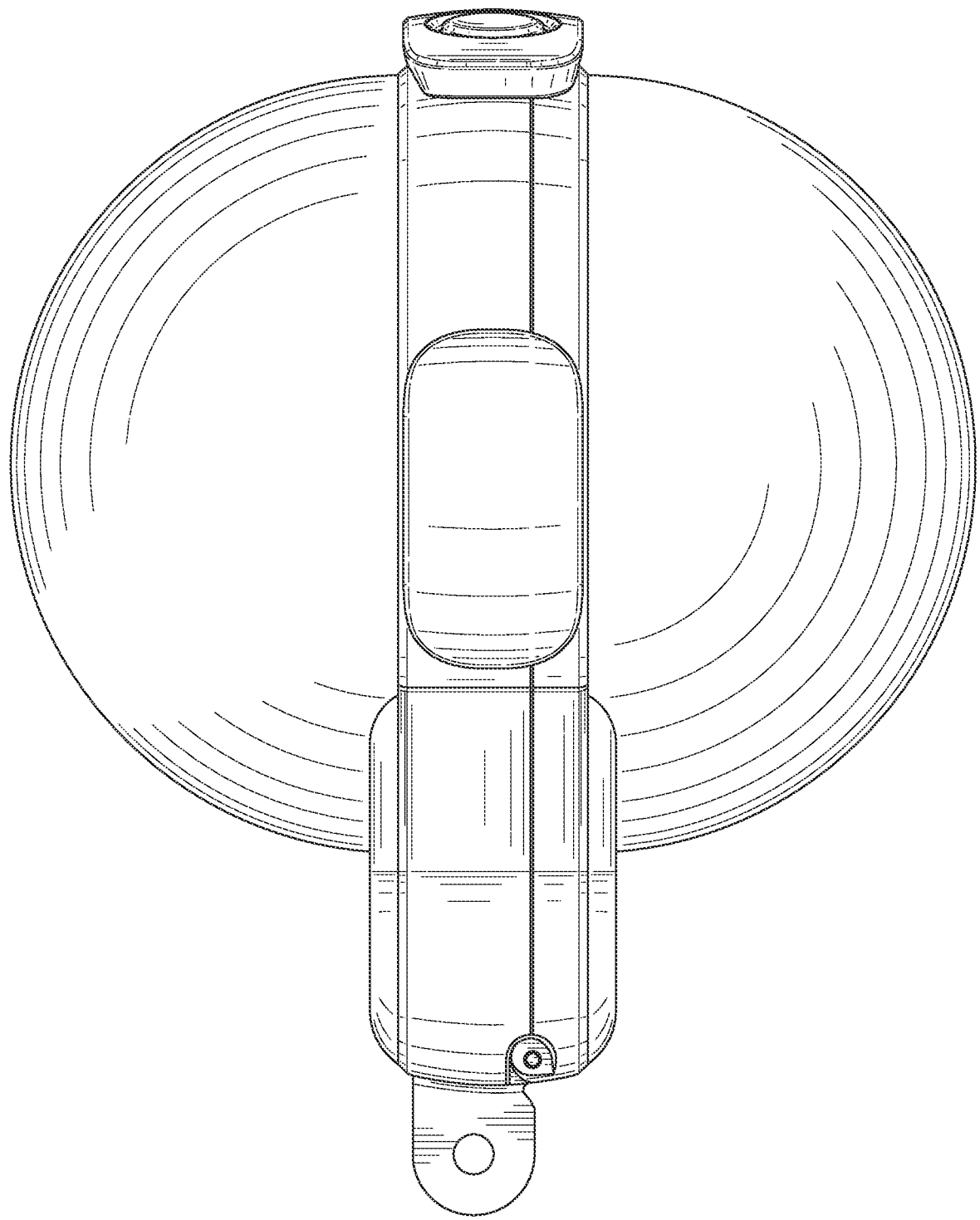
Figure 57:
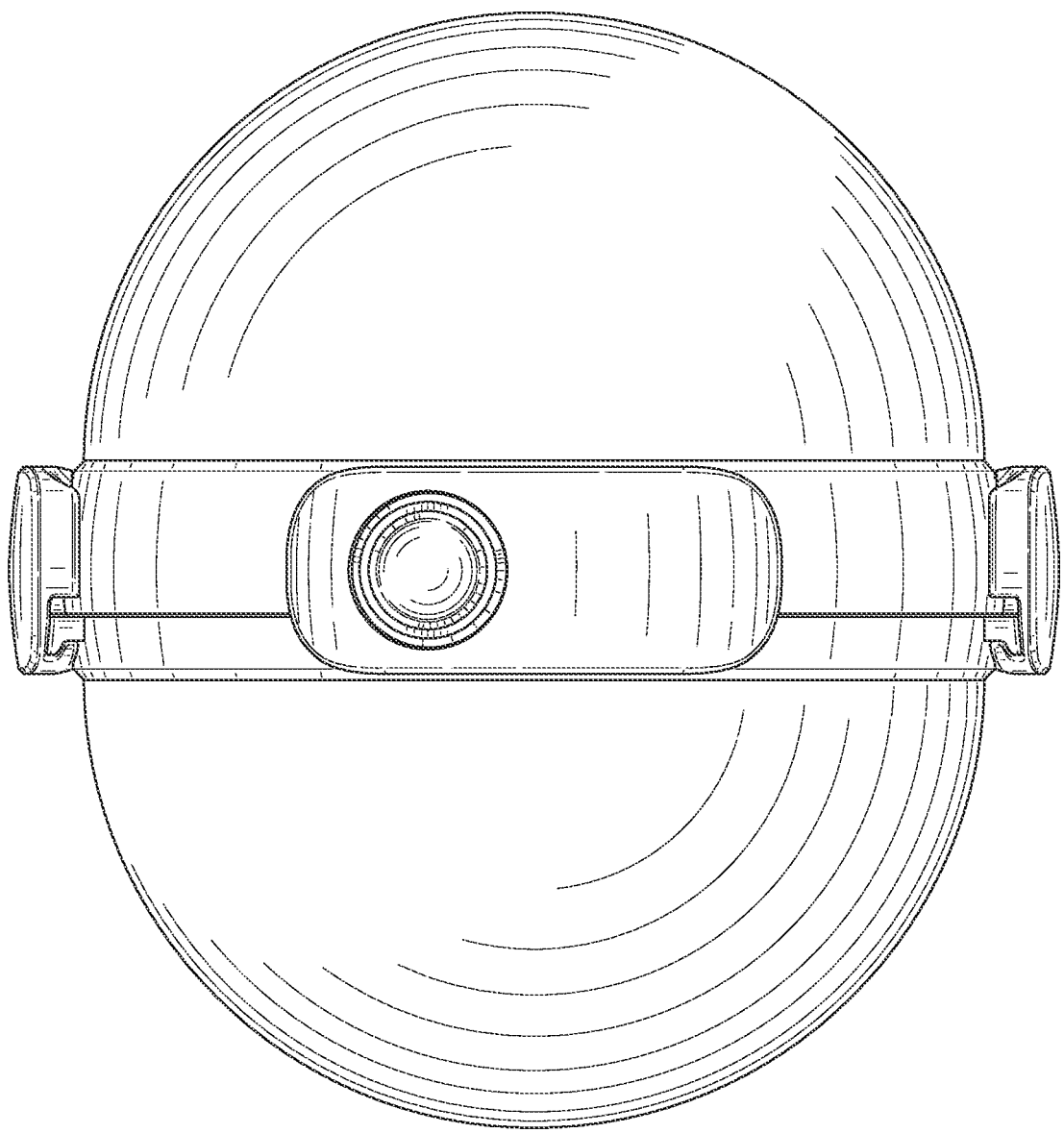
Figure 58:
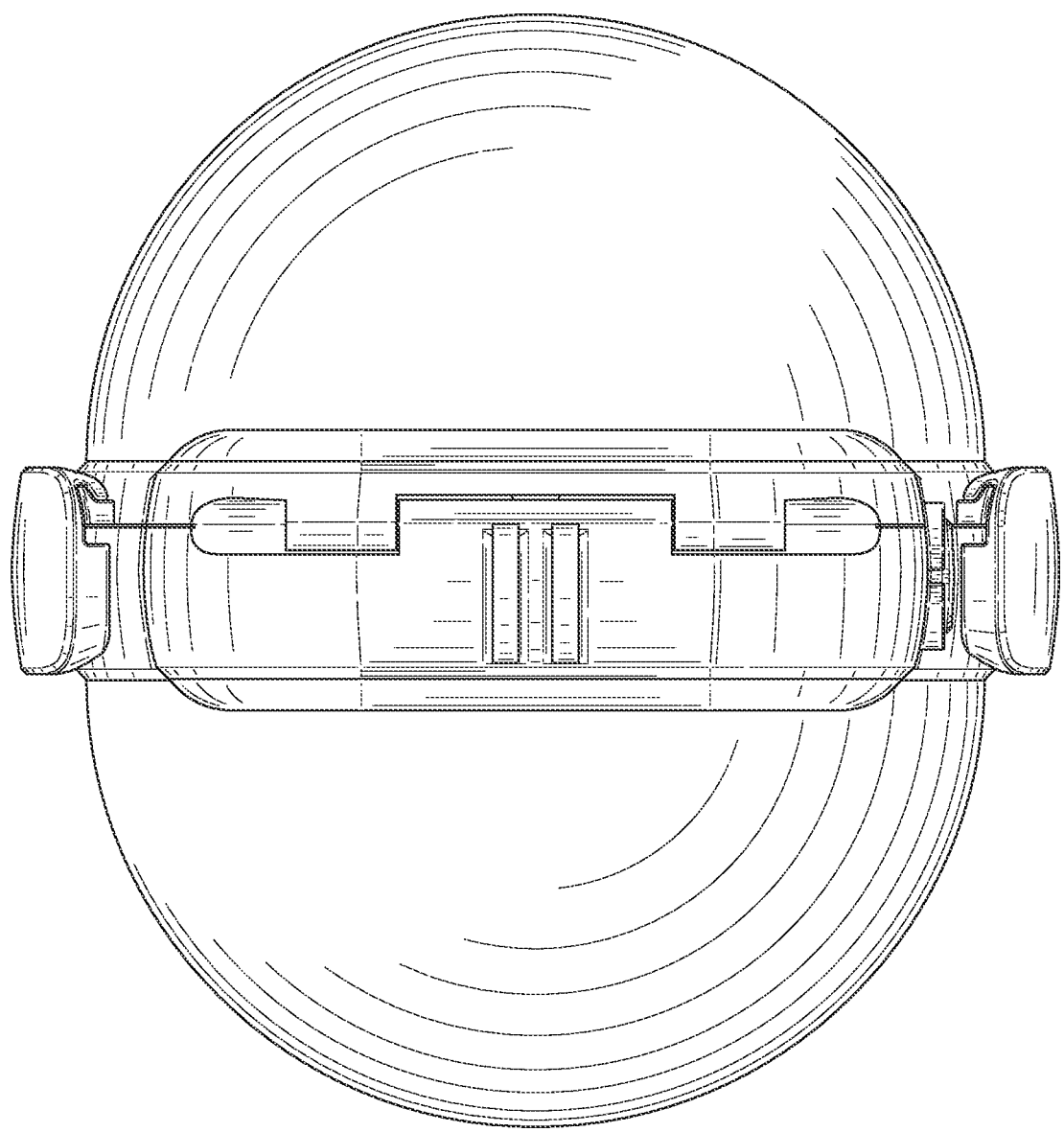
Figure 59:
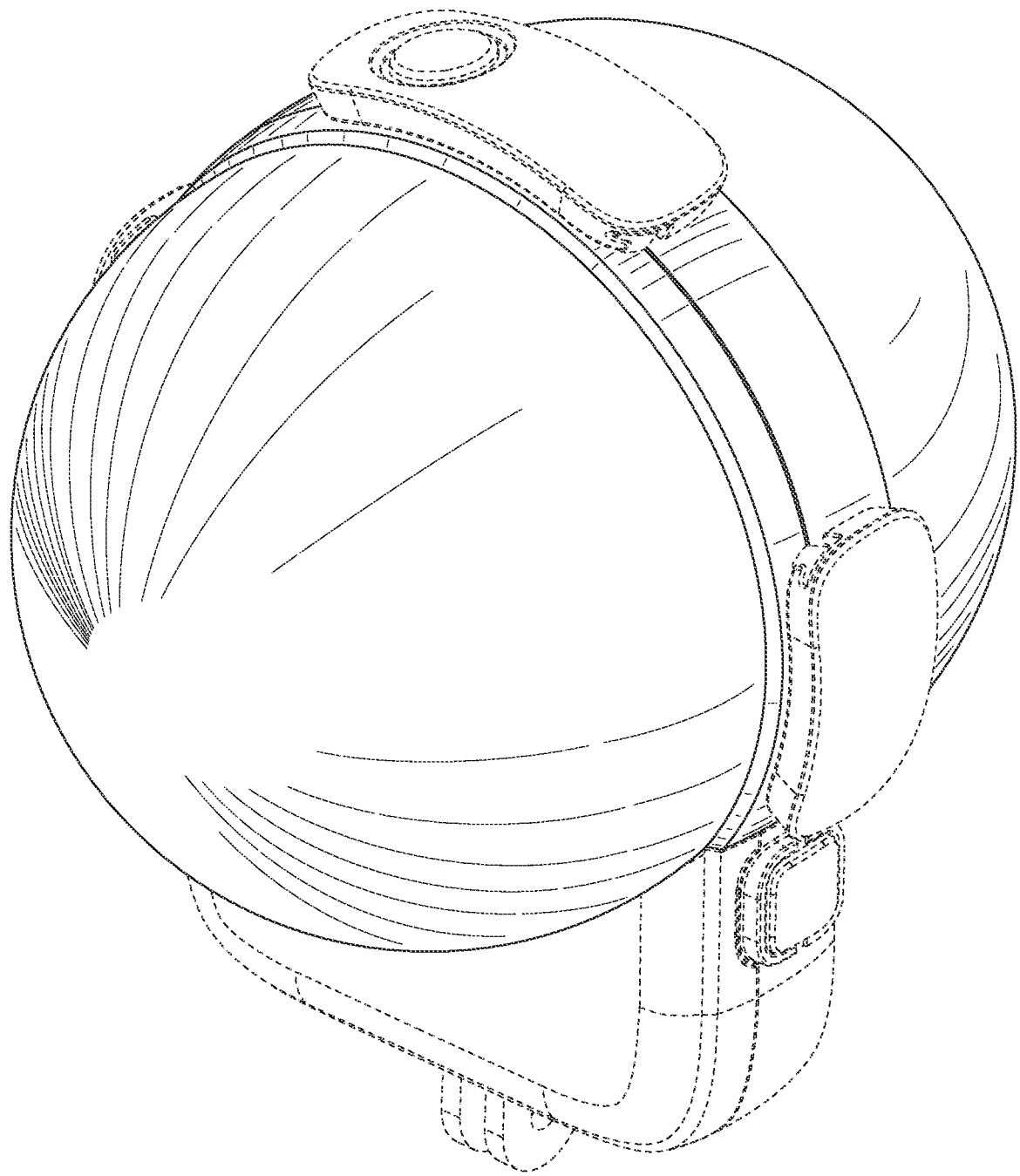
Figure 60:
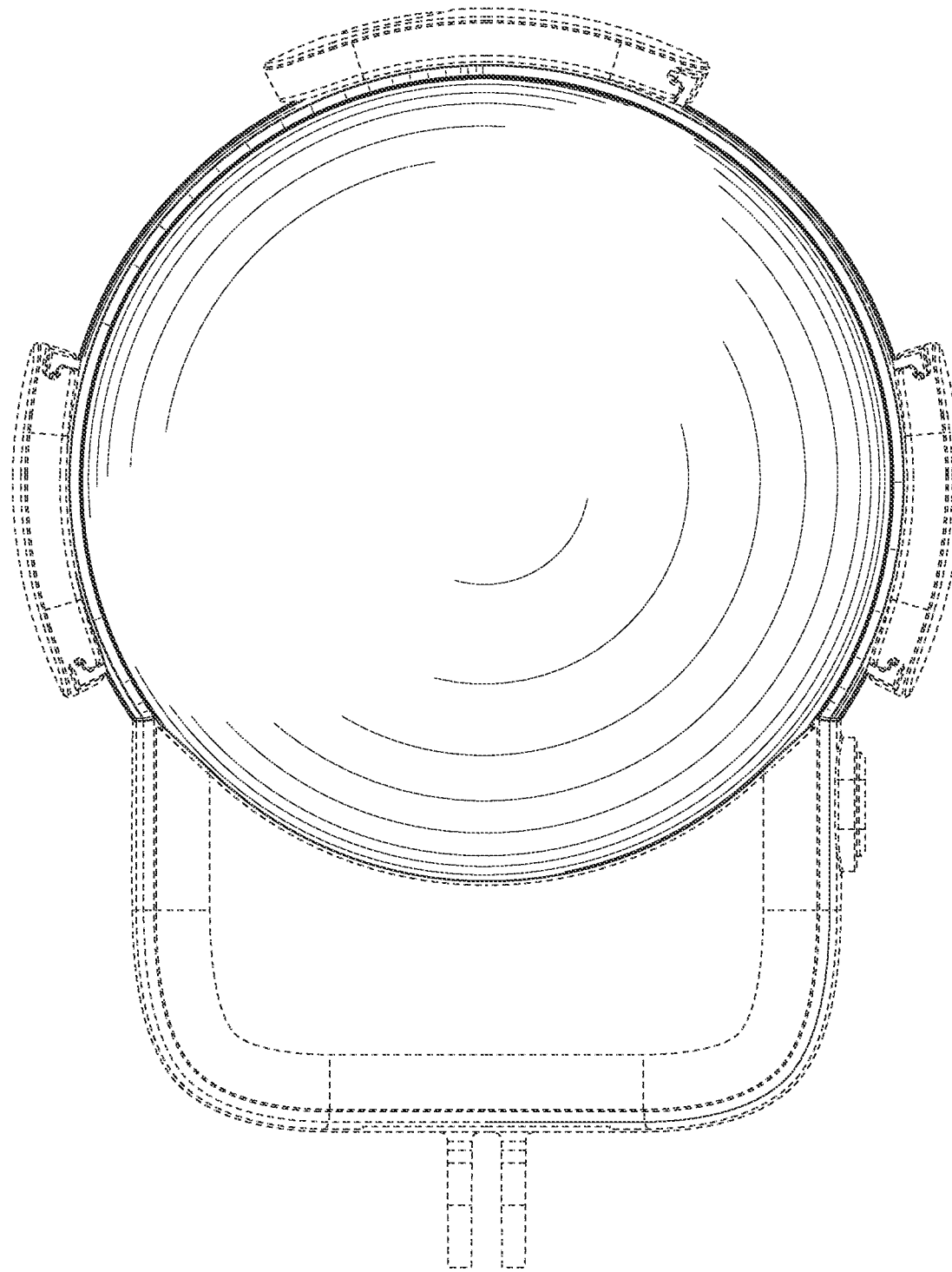
Figure 61:
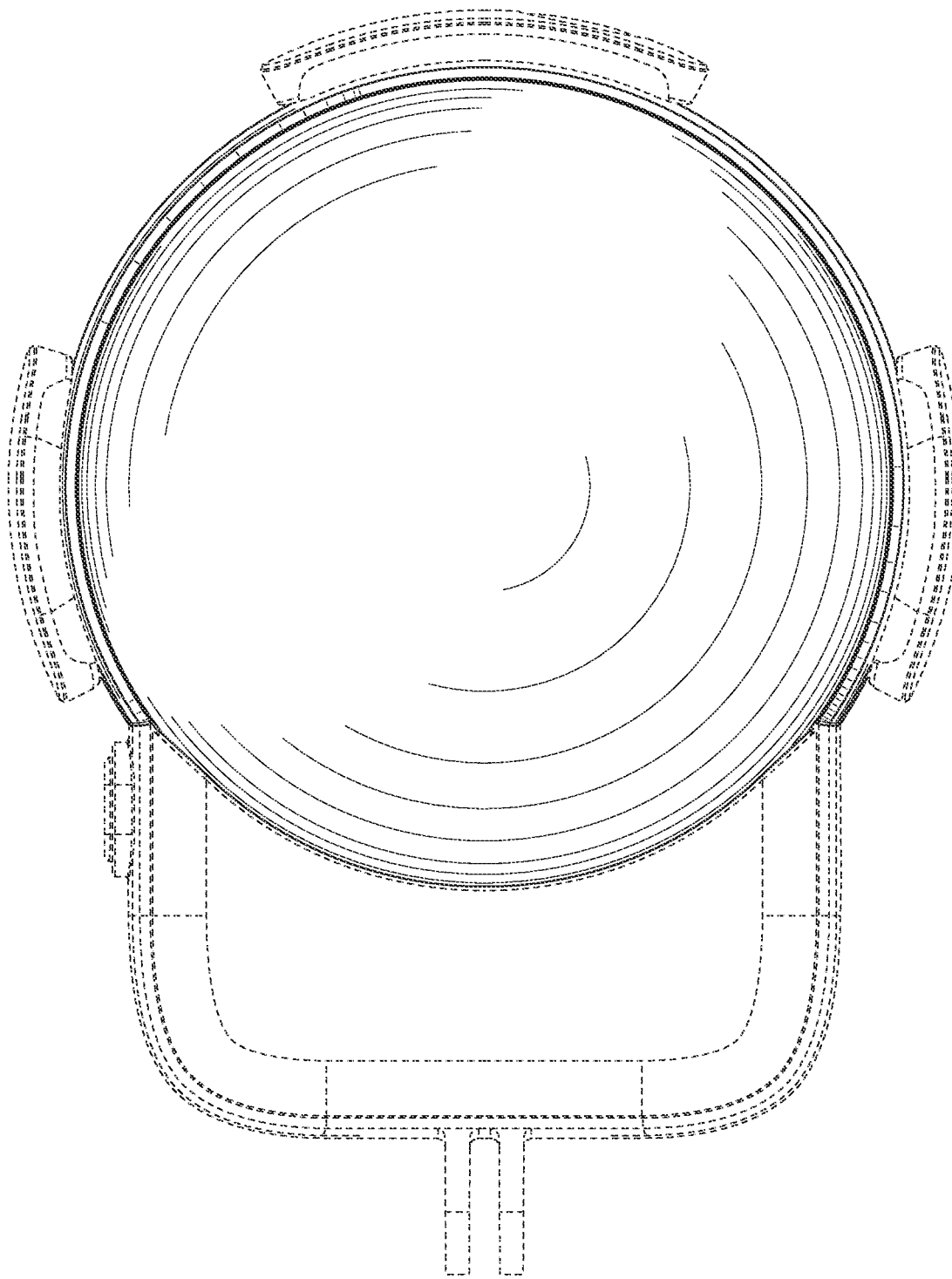
Figure 62:
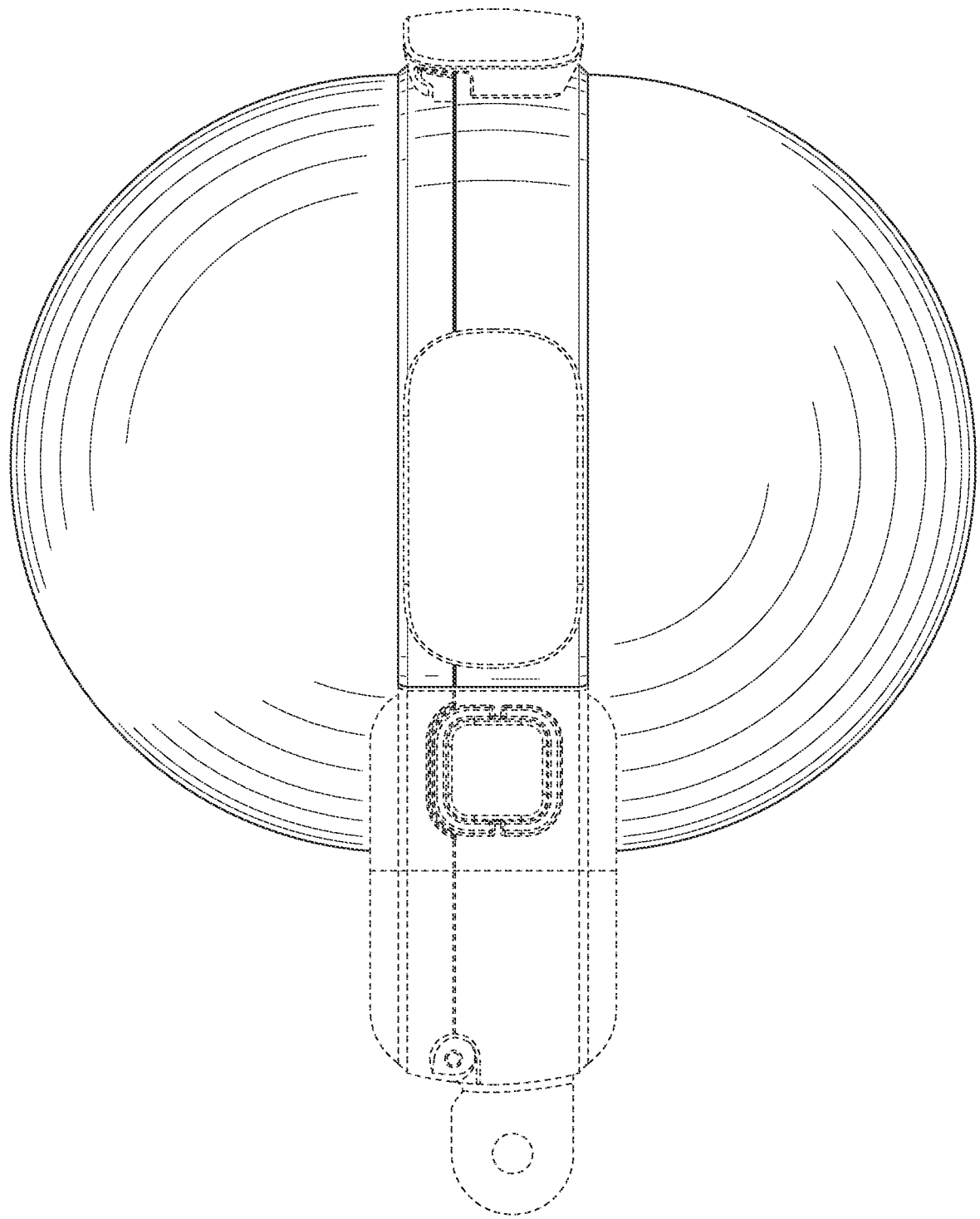
Figure 63:
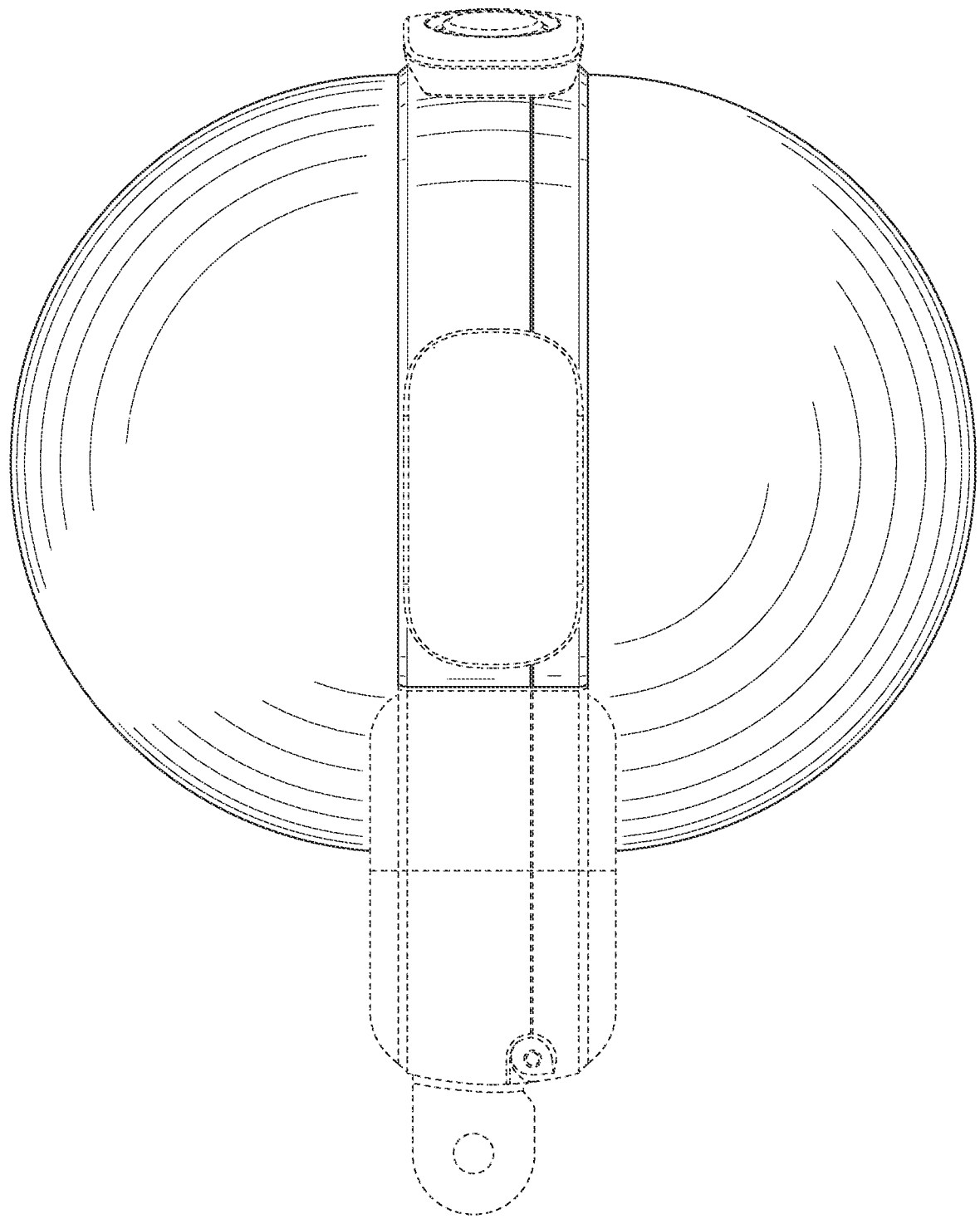
Figure 64:
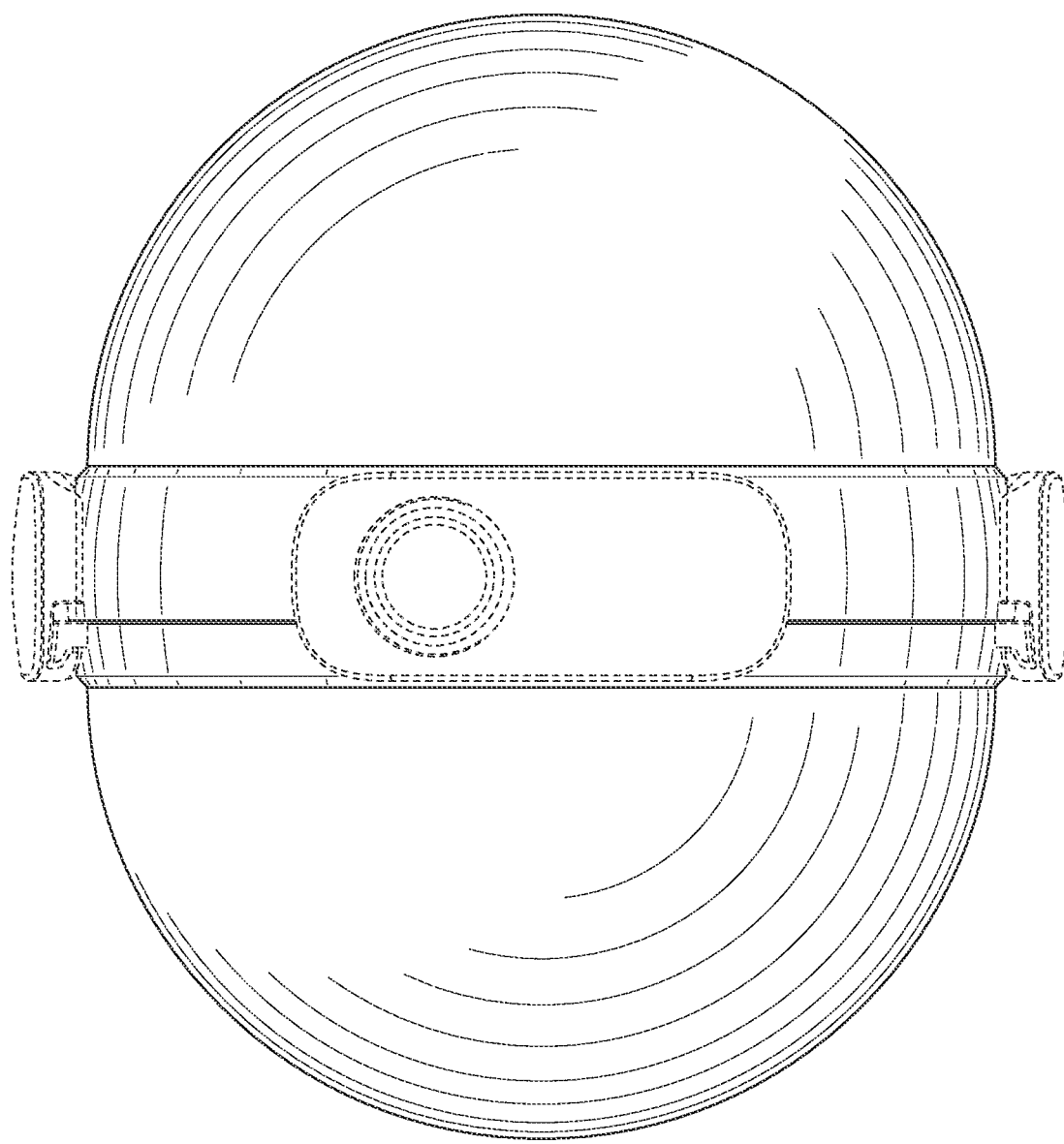
Figure 65:
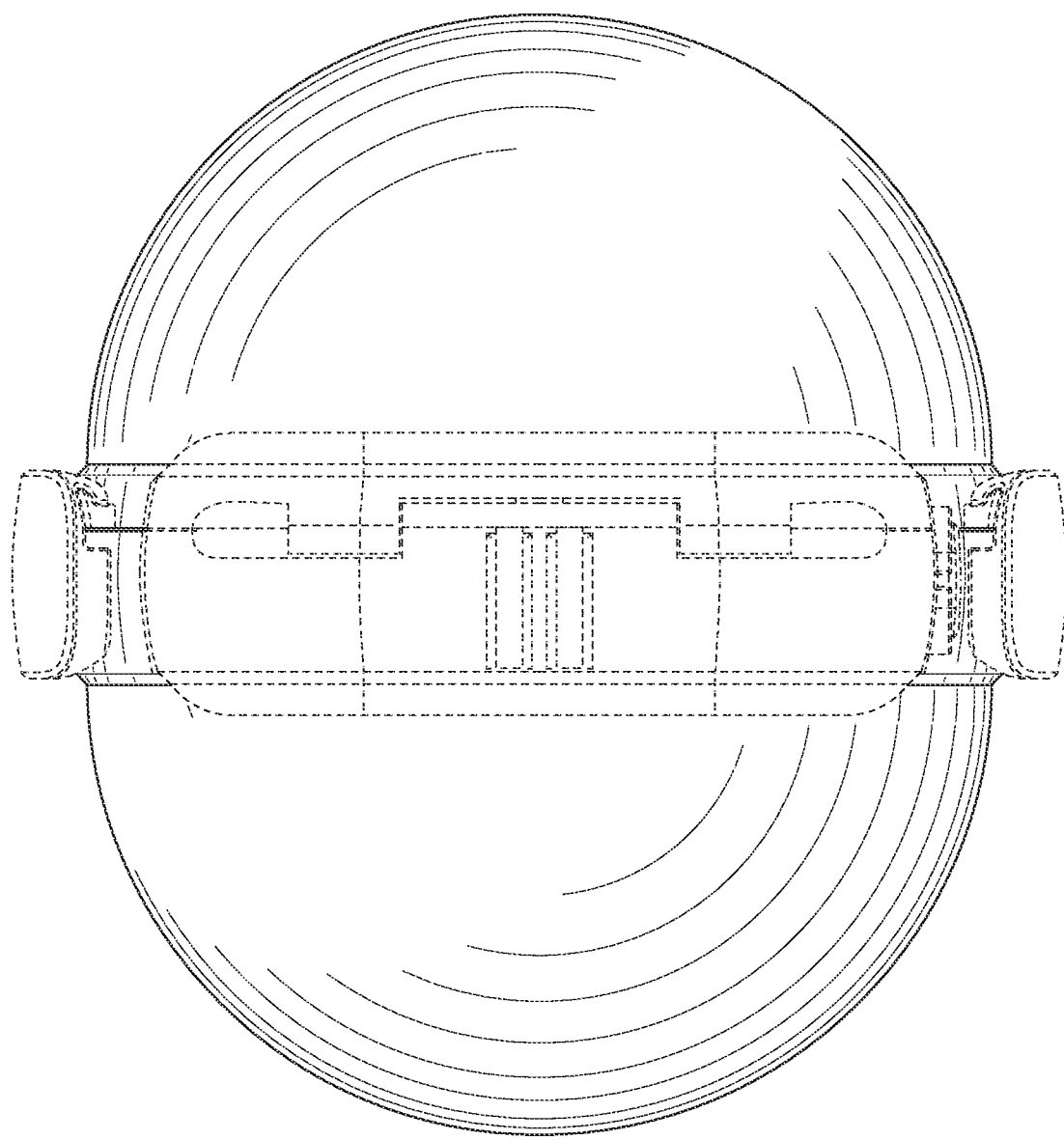

Referring now to FIG. 51 as well, which provides a partial, plan view of the rear housing portion 1304, the locking mechanism 1328 includes one or more buttons 1334 that are connected to one or more locking members 1336 such that inward displacement (sliding movement) of the button(s) 1334 causes corresponding movement of the locking member(s) 1336. Although shown as including a pair of buttons 1334i, 1334ii that are respectively connected to a pair of locking members 1336i, 1336ii in FIG. 51, in alternate embodiments of the disclosure, it is envisioned that the underwater system 1300 may instead include a single button 1334 and a single locking member 1336.

The buttons 1334 and the locking members 1336 are accommodated by the internal chambers 1326 defined by the cradle 1316. Each of the locking members 1336 includes a first end 1338 that is fixedly connected to a corresponding button 1334 and a (free) second end 1340 that is configured for releasable engagement (contact) with the engagement structure 136 on the DICD 100 during locking and unlocking of the locking mechanism 1328. More specifically, via movement of the buttons 1334, the locking members 1336 are movable between a locked (first) position (FIG. 51), in which the locking members 1336 extends through the apertures 140 formed in the engagement structure 136 on the DICD 100 to thereby securely connect the DICD 100 to the underwater system 1300, and a unlocked (second) position, in which the locking members 1336 are separated from the engagement structure 136 on the DICD 100 to allow for separation of the DICD 100 from the cradle 1316 and removal of the DICD 100 from the underwater system 1300. In certain embodiments, it is envisioned that the locking mechanism 1328 may include a biasing member (not shown) (e.g., a spring) that is configured to bias the locking mechanism 1328 towards the locked position.

In the illustrated embodiment, the locking mechanism 1328 is configured such that the locking members 1336 are disengaged from the engagement structure 136 on the DICD 100 upon inwardly displacement of the buttons 1334 and movement of the locking members 1336 towards each other.

To facilitate such operation, the locking members 1336 each include a generally J-shaped configuration, as seen in FIG. 51.

To protect the locking mechanism 1328 and inhibit the collection of dust, debris, etc., in certain embodiments, the underwater system 1300 may include a cover plate 1342 (FIGS. 49, 50) that is configured for connection to the cradle 1316 to conceal the locking mechanism 1328. It is envisioned that the cover plate 1342 and the cradle 1316 may be configured for releasable connection to allow for cleaning, component repair and/or replacement, etc.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein are also within the abilities of a person having ordinary skill in the art, and, thus, are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationships between the various structures illustrated in the accompanying drawings, and to the spatial orientations of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various steps, operations, elements, components, regions, and/or sections, these steps, operations, elements, components, regions, and/or sections should not be limited by the use of these terms in that these terms are used to distinguish one step, operation, element, component, region, or section from another. Thus, unless expressly stated otherwise, a first step, operation, element, component, region, or section could be termed a second step, operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An underwater system for a digital image capturing device (DICD) to facilitate use in underwater environments, the underwater system comprising:
    a housing including:
        a pair of domes integrally formed together to define a generally globe-shaped configuration; and
        a neck extending from the pair of domes such that the neck is positioned externally thereof, wherein the neck defines an internal compartment configured to receive the DICD and defines a polygonal horizontal cross-sectional configuration;
    a base configured for connection to the housing so as to create a watertight cavity therebetween for reception of the DICD, the base configured for insertion into the housing; and
    a sealing member supported by the base such that the sealing member is engageable with an inner surface of the housing.

2. The underwater system of claim 1, wherein the pair of domes are molded together.

3. The underwater system of claim 1, wherein the base includes a first finger and a second finger extending therefrom to facilitate connection of the underwater system to an accessory.

4. The underwater system of claim 1, wherein the housing is formed from an optically clear material.

5. The underwater system of claim 1, wherein the pair of domes and the neck are immovably connected together.

6. The underwater system of claim 5, wherein the pair of domes and the neck are molded.

7. An underwater system for a digital image capturing device (DICD) including first and second lenses, the underwater system facilitating use in underwater environments and comprising:
    a globe defining an internal compartment;
    an external neck extending from the globe and defining a polygonal horizontal cross-sectional configuration;
    a base configured for insertion into the external neck so as to create a watertight cavity for the DICD collectively defined by the globe, the external neck, and the base; and
    a mount extending from the base and configured to facilitate connection of the underwater system to an accessory.

8. The underwater system of claim 7, wherein the globe and the external neck are each formed from an optically clear material.

9. The underwater system of claim 8, wherein the globe and the external neck are immovably connected together.

10. The underwater system of claim 9, wherein the globe and the external neck are molded together in a unitary construction.

11. The underwater system of claim 7, wherein the base defines a receptacle configured to receive the DICD.

12. The underwater system of claim 11, wherein the base includes an external button.

13. The underwater system of claim 7, wherein the mount includes a first finger and a second finger.

14. The underwater system of claim 13, wherein the mount is located outside of fields-of-view defined by the first and second lenses so as not to interfere with image capture.

15. An underwater system for a digital image capturing device (DICD) including first and second lenses, the underwater system facilitating use in underwater environments and comprising:
- a housing defining an internal compartment configured to receive the DICD, wherein the housing includes:
  - a globe; and
  - a neck extending vertically from the globe and defining a polygonal horizontal cross-sectional configuration;
- a base configured for insertion into the housing, wherein the base includes:
  - a block;
  - an external button supported by the block; and
  - a flange extending from the block, wherein the flange is configured for insertion into the neck;
- a sealing member supported by the base such that the sealing member is engageable with an inner surface of the housing so as to create a watertight seal therebetween; and
- a mount extending from the base and configured to facilitate connection of the underwater system to an accessory, wherein the mount includes a first finger and a second finger.

16. The underwater system of claim 15, wherein the globe includes a pair of domes integrally formed together.

17. The underwater system of claim 16, wherein the globe and the neck are each formed from an optically clear material.

18. The underwater system of claim 17, wherein the globe and the neck are molded together in a unitary construction.

19. The underwater system of claim 18, wherein the base defines a receptacle configured to receive the DICD.

20. The underwater system of claim 19, wherein the mount is located outside of fields-of-view defined by the first and second lenses so as not to interfere with image capture.

* * * * *